(12) United States Patent
Funayama et al.

(10) Patent No.: US 12,487,560 B2
(45) Date of Patent: Dec. 2, 2025

(54) LIGHT GUIDE PLATE FOR IMAGE DISPLAY

(71) Applicant: Mitsubishi Chemical Corporation, Tokyo (JP)

(72) Inventors: Katsuya Funayama, Tokyo (JP); Tatsushi Baba, Tokyo (JP); Masahiko Ono, Tokyo (JP); Yoshio Wakayama, Tokyo (JP); Shuichi Kubo, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 210 days.

(21) Appl. No.: 17/372,639

(22) Filed: Jul. 12, 2021

(65) Prior Publication Data

US 2021/0341877 A1  Nov. 4, 2021

Related U.S. Application Data

(63) Continuation of application No. PCT/JP2020/004237, filed on Feb. 5, 2020.

(30) Foreign Application Priority Data

Feb. 5, 2019 (JP) ................................. 2019-018943
Feb. 5, 2019 (JP) ................................. 2019-018944
(Continued)

(51) Int. Cl.
*G03H 1/02* (2006.01)
*G02B 5/32* (2006.01)

(52) U.S. Cl.
CPC ............. *G03H 1/0272* (2013.01); *G02B 5/32* (2013.01); *G03H 2223/16* (2013.01)

(58) Field of Classification Search
CPC ........ G02B 27/00; G02B 27/01; G02B 27/02; G02B 27/0172; G02B 27/0103;
(Continued)

(56) References Cited

U.S. PATENT DOCUMENTS 9,442,306 B1  9/2016  Hines et al.
2005/0063054 A1  3/2005  Umeya
(Continued)

FOREIGN PATENT DOCUMENTS

CN  103240936 A  * 8/2013  ............. B32B 17/10
CN  105487170 A    4/2016
(Continued)

OTHER PUBLICATIONS

Extended European Search Report issued May 25, 2022, in corresponding European Patent Application No. 20753180.7, 16 pages.
(Continued)

*Primary Examiner* — Jyotsna V Dabbi
(74) *Attorney, Agent, or Firm* — Oblon, McClelland, Maier & Neustadt, L.L.P.

(57) ABSTRACT

A light guide plate for image display can display clear images even when a resin base is used. The Sight guide plate configured for image display may include a first resin base and a hologram layer. The first resin base may have an MC value of 0.120 or less, obtained by evaluation using shadow contrast, according to expression (1):

$$MC = \frac{Lmax - Lmin}{Lmax + Lmin}, \quad (1)$$

wherein Lmax is a maximum value of brightness from a brightness distribution, Lmin is a minimum value of the lightness from the brightness distribution, and MC is an MC value that objectively represents a magnitude of a dip in low brightness portions in the brightness distribution.

21 Claims, 13 Drawing Sheets

(30) Foreign Application Priority Data

Feb. 5, 2019 (JP) ................................. 2019-018945
Feb. 5, 2019 (JP) ................................. 2019-018946

(58) Field of Classification Search
CPC .... G02B 5/32; G02B 5/18; G02B 2027/0194;
G02B 2027/0174; G03H 1/02; G03H
1/04; G03H 1/22; G03H 1/0272; G03H
1/0256; G03H 2250/37; G03H
2001/0439; G03H 2001/2226; G03F 7/00;
B32B 7/023
USPC .......................................................... 359/34
See application file for complete search history.

(56) References Cited

U.S. PATENT DOCUMENTS

| | | | |
|---|---|---|---|
| 2006/0152782 | A1 | 7/2006 | Noda et al. |
| 2007/0008624 | A1 | 1/2007 | Hirayama |
| 2009/0190222 | A1 | 7/2009 | Simmonds et al. |
| 2010/0112460 | A1* | 5/2010 | Satou ................. G11B 7/24038 430/2 |
| 2012/0193617 | A1* | 8/2012 | Urano ..................... H05B 33/10 257/E51.026 |
| 2015/0062715 | A1 | 3/2015 | Yamada et al. |
| 2016/0307035 | A1 | 10/2016 | Schilling et al. |
| 2017/0363788 | A1 | 12/2017 | Hirayama et al. |
| 2018/0371262 | A1 | 12/2018 | Aihemaiti et al. |
| 2019/0227309 | A1* | 7/2019 | Kadono ................... G09G 3/36 |
| 2019/0331921 | A1 | 10/2019 | Suzuki et al. |
| 2020/0142106 | A1 | 5/2020 | Voloschenko et al. |

FOREIGN PATENT DOCUMENTS

| | | | |
|---|---|---|---|
| EP | 0 521 296 | A1 | 1/1993 |
| JP | 5-181400 | A | 7/1993 |
| JP | 11-184363 | A | 7/1999 |
| JP | 11-326602 | A | 11/1999 |
| JP | 2000-296583 | A | 10/2000 |
| JP | 2004-226821 | A | 8/2004 |
| JP | 2006-162798 | A | 6/2006 |
| JP | 2006-178185 | A | 7/2006 |
| JP | 2006-317815 | A | 11/2006 |
| JP | 2008-139768 | A | 6/2008 |
| JP | 2010-37380 | A | 2/2010 |
| JP | 2013-8657 | A | 1/2013 |
| JP | 2013-83686 | A | 5/2013 |
| JP | 2015-49278 | A | 3/2015 |
| JP | 2015-203770 | A | 11/2015 |
| JP | 2016-40352 | A | 3/2016 |
| JP | 2017-50277 | A | 3/2017 |
| JP | 2017-203965 | A | 11/2017 |
| JP | 2018-123319 | A | 8/2018 |
| TW | 200626360 | A | 8/2006 |
| TW | 201731977 | A | 9/2017 |
| TW | I646470 | | 1/2019 |
| WO | WO 2005/088384 | A1 | 9/2005 |
| WO | WO 2010/110135 | A1 | 9/2010 |
| WO | WO 2018/093137 | A1 | 6/2016 |
| WO | WO 2017/138637 | A1 | 8/2017 |
| WO | WO 2018/135193 | A1 | 7/2018 |

OTHER PUBLICATIONS

Yoshida Takuji et al: "A plastic holographic waveguide combiner for light-weight and highly-transparent augmented reality glasses: A plastic holographic waveguide combiner for augmented reality glasses", Journal of The Society for Information Display—Sid, vol. 26, No. 5, XP055893992, Apr. 30, 2018, pp. 280-286, ISSN: 1071-0922, DOI: 10.1002/jsid.659, Retrieved from the Internet: URL:https://api.wiley.com/onlinelibrary/tdm/v1/articles/10.1002%2Fjsid.659>.
Levola T: "Diffractive optics for virtual reality displays", Journal of the Society for Information Display—Sid, Society for Information Display, vol. 14/5, XP008093627, Jan. 1, 2006, pp. 467-475, ISSN: 1071-0922.
Khanarian G. et al: "Optical properties of cyclic olefin copolymers", Optical Engineering, Soc. of Photo-Optical Instrumentation Engineers, Bellingham, vol. 40, No. 6, Jun. 1, 2001, pp. 1024-1029, XP002507414, ISSN: 0091-3286, DOI: 10.1117/1.1369411.
Anonymous: "Refractive Index of Amorphous Polymers", Dec. 30, 2018, XP055894593, Retrieved from the Internet: URL:https://web.archive.org/web/20181230032911/https://polvmerdatabase.com/polymer%20physics/Ref%20Index%20Table2%20.html [retrieved on Feb. 23, 2022], 3 pages.
Japanese Office Action issued on Dec. 13, 2022 in Japanese Patent Application No. 2019-018945 (with Unedited Computer Generated English Translation), 6 pages.
Japan Office Action issued on Dec. 13, 2022 in Japanese Patent Application No. 2019-018946 (with Unedited Computer Generated English Translation), 6 pages.
Combined Taiwanese Office Action and Search Report issued Oct. 15, 2021 in Patent Application No. 109103501 (with English language translation), 9 pages.
Combined Chinese Office Action and Search Report issued Oct. 20, 2022 in Chinese Patent Application No. 202080012156.5 (with unedited computer generated English Translation), 22 pages.
Notice of Reasons for Refusal issued Feb. 1, 2022 in Japanese Patent Application No. 2020-016591 (with English machine translation), 10 pages.
International Search Report issued Apr. 28, 2020 in PCT/JP2020/004237, filed on Feb. 5, 2020, 7 pages.
Office Action issued Jun. 6, 2023, in corresponding Japanese Patent Application No. 2019-018945 (with English Translation), 6 pages.
Office Action issued Jun. 6, 2023, in corresponding Japanese Patent Application No. 2019-018946 (with English Translation), 6 pages.
Combined Taiwanese Office Action and Search Report issued Aug. 17, 2022 in Taiwanese Patent Application No. 111101592 (with English translation), 12 pages.
Japanese Office Action issued Aug. 9, 2022 in Japanese Patent Application No. 2020-016591 (with unedited computer generated English translation), 10 pages.
Chinese Office Action issued on Jul. 3, 2023 in Chinese Patent Application No. 202080012156.5 (with English translation), 19 pages.
Office Action issued Nov. 7, 2023, in corresponding Japanese Patent Application No. 2019-018945 (with English Translation), 9 pages.
Combined Chinese Office Action and Search Report issued Nov. 11, 2023, in corresponding Chinese Patent Application No. 202080012156.5 (with English Translation), 30 pages.
Office Action issued Dec. 4, 2023, in corresponding Korean Patent Application No. 10-2021-7023048 (with English Translation), 13 pages.
Kyosuke Inoue et al., "Novel COP Optical Film with Durability for Flexible Displays", SID Symposium Digest of Technical Papers, vol. 48, Issue 1, 2017, pp. 631-633 and cover page.
Office Action issued Jun. 28, 2024, in corresponding Chinese Patent Application No. 202080012156.5, filed Feb. 5, 2020 (with English Translation), 15 pages.
Decision of Reexamination issued in corresponding Chinese Application No. 202080012156.5, filed Feb. 5, 2020 (with English-language Translation) 20 pages.
Office Action issued in corresponding Korean Application No. 10-2024-7018668, filed Jun. 25, 2024 (with Machine Translation), 13 pages.
Office Action issued Oct. 14, 2024 in Korean Patent Application No. 10-2021-7023048, (with English Translation) 11 pages.
Office Action issued Jul. 25, 2025, in Korean Patent Application No. 10-2024-7018668 with machine English translation (14 pages).

\* cited by examiner

LIGHT GUIDE PLATE FOR IMAGE DISPLAY

This application is a continuation filing of, and claims priority under 35 U.S.C. § 111(a) to, International Application No. PCT/JP2020/004237, filed on Feb. 5, 2020, and claim priority under 35 U.S.C. § 119 to Japanese Patent Application No. 2019-018943, Japanese Patent Application No. 2019-018944, Japanese Patent Application No. 2019-018945 and Japanese Patent Application No. 2019-018946, filed on Feb. 5, 2019, the entireties of which are incorporated herein by reference.

BACKGROUND OF THE INVENTION

Field of the Invention

The present invention relates to a light guide plate for image display.

Description of the Related Art

In a display device, a light guide plate for image display may be used. For example, in a display device using virtual reality (VR) technology, augmented reality (AR) technology, or mixed reality (MR), a light guide plate for image display in which a hologram layer is supported by a transparent base is used. Holograms having various optical functions, such as waveguide, reflection and diffraction functions, are formed on the hologram layer.

As the transparent base, a glass base is often used. However, from the viewpoint of processability, light weight, durability and portability, it is more preferable to use a resin base as the transparent base.

JP 2000-296583 A (Patent Document 1) discloses a hologram laminate used for an in-vehicle head-up display. In this hologram laminate, an acrylic-based resin substrate, an acrylic-based adhesive layer, a hologram layer made of an acrylic-based photopolymer, an acrylic-based adhesive layer and an acrylic-based resin substrate are laminated in that order.

JP 2000-296583 A (Patent Document 1) describes that the appearance of the hologram changes due to the surface smoothness of the acrylic-based resin substrate. According to Patent Document 1, when the maximum height Rmax representing the surface smoothness of the hologram laminate is greater than 50 µm, the appearance change of the hologram becomes remarkable. When the maximum height Rmax is less than 25 µm, the change in appearance of the hologram is acceptable. However, J P 2000-296583 A (Patent Document 1) does not particularly describe the necessity of nano-order surface smoothness having a maximum height Rmax of 1 µm or less. JP 2000-296583 A (Patent Document 1) does not describe any specific example having the nano-order surface smoothness.

Further, the hologram material forming the hologram layer may erode the resin base due to a temperature change. Hologram materials are also known to deteriorate due to moisture absorption. Therefore, the display device in which the hologram layer is supported by the resin base tends to deteriorate in a high temperature and high humidity environment.

JP H05-181400 A (Patent Document 2) describes that a photosensitive material layer for hologram formation is formed on an optically transparent resin base member and the photosensitive material layer is covered with an aqueous polymer protective barrier. JP H05-181400 A (Patent Document 2) suggests that the aqueous polymer protective barrier is provided for the purpose of withstanding an attack from moisture.

JP H11-184363 A (Patent Document 3) describes a hologram laminate having a hologram sandwiched between resin base members through an optical adhesive. The entire outer peripheral portion thereof is covered with a protective coating layer. JP H11-184363 A (Patent Document 3) describes that the protective coating layer may be a coating that enhances airtightness and gas barrier properties.

SUMMARY OF INVENTION

Technical Problem

However, the above-mentioned related art has the following problems.

The hologram laminate described in JP 2000-296583 A (Patent Document 1) is mainly used for an in-vehicle head-up display viewed by a driver. Therefore, the image quality of the display image does not have to be particularly high. However, for example, in the case of a wearable display or a head-mounted display used for AR or MR, a realistic image is often displayed or fine characters are displayed in the entire field of view of the user. In such applications, higher image quality is required.

According to the study of the present inventor, when the hologram layer is sandwiched between the resin bases in the light guide plate for image display, deterioration in image quality may be observed even when the maximum height Rmax is less than 25 µm. For example, when swelling (a gear mark) of a pitch corresponding to the meshing pitch of the drive gear of the extrusion roller is generated on the surface of the extruded resin base, a portion where the image is unclear is likely to occur.

In the technique described in JP H05-181400 A (Patent Document 2), a resin base member is in close contact with the surface of the photosensitive material layer opposite to the aqueous polymer protective barrier.

Therefore, the photosensitive material may erode the resin base member in a high temperature environment.

Further, since the inside of the resin base member contains moisture, moisture diffuses into the photosensitive material layer through the contact surface with the photosensitive material layer. In addition, since the base member is exposed to the outside, moisture continues to permeate the base member from the outside. As a result, moisture permeates the photosensitive material layer through the resin base member. Thus, even when the moisture is blocked by the aqueous polymer protective barrier, it is not possible to prevent the photosensitive material layer from deteriorating over time due to the moisture from the base member side.

In the technique described in JP H11-184363 A (Patent Document 3), the entire outer circumference of the laminate including the hologram is sealed by a protective coating layer. Therefore, it is possible to prevent the hologram from deteriorating due to the permeation of moisture from the outside of the hologram laminate into the inside. However, the moisture contained in the resin base member when the protective coating layer is formed is trapped inside the protective coating layer. As a result, the moisture contained in the resin base member permeates the hologram, which may cause the hologram to deteriorate over time. In particular, in a high temperature environment, the influence of moisture release from the resin substrate becomes remarkable.

The present invention has been made in view of the above problems, and an object of the present invention is to provide a light guide plate for image display capable of displaying a clear image even when a resin base is used.

Another object of the present invention is to provide a light guide plate for image display capable of suppressing deterioration of a hologram layer even when a resin base is used.

Solution to Problem

The present inventor conducted diligent research, and found that a clear image can be displayed by improving the flatness of the resin base used for the light guide plate for image display, and thus completed the present invention. The flatness corresponds to the magnitude of swelling of the surface changing with a pitch significantly greater than the pitch measured due to the surface roughness.

When the flatness of the surface of the resin base is lowered due to the swelling, the thickness of the hologram layer laminated on the resin base fluctuates. When the thickness of the hologram layer fluctuates, the waveguide light fluctuates. As a result, the image becomes finely strained and deformed, and the image becomes unclear. In the case of a color image, the image becomes unclear as a result of color shift and color bleeding due to the fluctuation of the waveguide light.

On the other hand, when the smoothness of the surface of the resin base is reduced by fine unevenness, the waveguide light is scattered and the image becomes unclear.

In addition, the present inventor conducted diligent research, and found that deterioration of the hologram layer can be suppressed and a clear image can be displayed by employing a barrier layer in a resin base having a hologram layer used for a light guide plate for image display, and thus completed the present invention.

In order to solve the above problems, for example, the present invention has the following aspects.

[1] A light guide plate for image display has a first resin base and a hologram layer.

The first resin base is a light guide plate for image display having an MC value of 0.120 or less obtained by evaluation using shadow contrast.

[2] A light guide plate for image display has a first resin base, a first barrier layer and a hologram layer.

[3] In the light guide plate for image display according to [2], the first resin base, the first barrier layer and the hologram layer are arranged in that order in a thickness direction.

[4] In the light guide plate for image display according to [3] further has a second resin base and a second barrier layer.

The first resin base, the first barrier layer, the hologram layer, the second barrier layer and the second resin base are arranged in that order in the thickness direction.

[5] In the light guide plate for image display according to any one of [2] to [4], a refractive index of the first barrier layer is higher than a refractive index of the first resin base.

[6] In the light guide plate for image display according to any one of [2] to [5], a refractive index of the first barrier layer is 1.48 or more.

[7] In the light guide plate for image display according to any one of [2] to [6], the first barrier layer contains an inorganic material.

[8] In the light guide plate for image display according to [7], the first barrier layer contains at least one inorganic material selected from a group consisting of silicon oxide, silicon nitrogen oxide, diamond-like carbon, aluminum oxide and glass.

[9] In the light guide plate for image display according to any one of [2] to [8], the first barrier layer is disposed on a resin film.

[10] In the light guide plate for image display according to any one of [2] to [9], a steam barrier material is used as the material of the first barrier layer.

[11] In the light guide plate for image display according to any one of [2] to [10], the first barrier layer is disposed on the hologram layer.

[12] In the light guide plate for image display according to any one of [1] to [11], a refractive index of the first resin base is 1.48 to 1.70.

[13] In the light guide plate for image display according to any one of [1] to [12], the first resin base contains at least one resin selected from the group consisting of a poly(meth)acrylic resin, an epoxy resin, a cyclic polyolefin and a polycarbonate.

[14] In the light guide plate for image display according to any one of [1] to [13], a heat shrinkage rate measured based on annex A of JIS K 6718-1: 2015 of the first resin base is less than 3%.

[15] In the light guide plate for image display according to any one of [1] to [14], an arithmetic average roughness Ra of a surface of the first resin base is 10 nm or less.

Advantageous Effects of Invention

According to the present invention, it is possible to provide a light guide plate for image display capable of displaying a clear image even when a resin base is used.

Further, according to the present invention, it is possible to provide a light guide plate for image display capable of suppressing deterioration of a hologram layer even when a resin base is used.

DETAILED DESCRIPTION OF THE INVENTION

Figure 1:
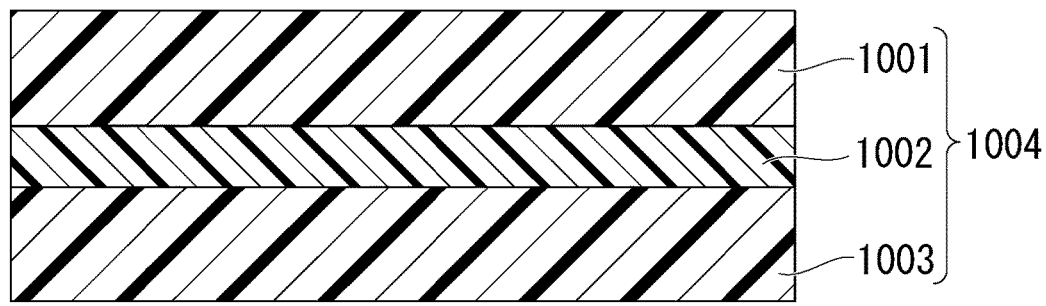
FIG. 1 is a schematic cross-sectional view showing an example of a light guide plate for image display according to a first embodiment of the present invention.

Hereinafter, embodiments of the present invention will be described with reference to the accompanying drawings. In all the drawings, even when the embodiments are different, the same or corresponding members are designated by the same reference numerals, and common description will be omitted.

Numerical ranges represented using "to" include the numerical values on both sides of "to".

The term "UV" means ultraviolet light.

The term "(meth)acrylic" means one or both of acrylic and methacrylic.

The term "(meth)acrylate" means one or both of acrylate and methacrylate.

First Embodiment

Basic Example

The light guide plate for image display according to the first embodiment of the present invention will be described.

The light guide plate for image display according to the first embodiment of the present invention has a first resin base and a hologram layer. The light guide plate for image display of the present embodiment may further have a second resin base. In the present embodiment, the first resin base and the second resin base may be generically referred to as simply "resin base". The resin base is transparent.

The hologram layer is sandwiched between the first resin base and the second resin base, or between the first resin base and the glass base.

The light guide plate for image display has an incidence portion on which image light is incident and a display image emission portion that displays an image formed by the image light. The hologram layer is disposed between the incidence portion and the display image emission portion. A diffraction grating pattern for waveguiding at least the image light incident from the incidence portion to the display image emission portion and emitting the image light from the display image emission portion is formed on the hologram layer. The diffraction grating pattern in the display image emission portion transmits at least a part of the external light incident from the outside of the light guide plate for image display. The external light incidence portion is a surface opposite to the display image emission portion.

The image light incident on the incidence portion is guided into the hologram layer and emitted to the outside from the display image emission portion. On the other hand, as a result of the external light also passing through the resin base and the display image emission portion, the observer of the display image emission portion can observe both the image light and the external light in the field of view.

The light guide plate for image display of the present embodiment is suitably used for a display device using AR technology or MR technology. For example, the light guide plate for image display of the present embodiment may be used in a device such as an AR glass such as a head-mounted display or a head-up display for a vehicle.

The resin base used for the light guide plate for image display of the present embodiment has an MC value of 0.120 or less obtained by evaluation using shadow contrast. The definition of the MC value and the specific evaluation method will be described later. The MC value is particularly effective for evaluating flatness among the surface characteristics of the resin base. That is, with respect to the unevenness having a spatial frequency lower than the spatial frequency of the unevenness of the surface roughness, the lower the MC value, the smaller the degree of the unevenness. Therefore, the lower the MC value of the resin base, the better the flatness.

The material of the resin base is not particularly limited as long as the material is a transparent material.

The material used for the resin base preferably contains at least one resin selected from the group consisting of an acrylic resin, a cyclic polyolefin resin and a polycarbonate resin, and an acrylic resin is more preferable.

The refractive index of the material used for the resin base is preferably 1.48 to 1.70.

The heat shrinkage rate of the material used for the resin base is preferably less than 3%. Here, the heat shrinkage rate is a heat dimensional change rate based on annex A "Measurement of dimensional change (shrinkage) during heating" of JIS K 6718-1: 2015.

This "Measurement of dimensional change (shrinkage) during heating" is a standard for casting plates, but the heat shrinkage rate in the present invention is such that the resin base using the above material is an extruded plate, a continuous casting plate or the like. Even in these cases, the value based on this standard is employed.

The smoothness of the resin base (for example, represented by the surface roughness such as arithmetic average roughness Ra or maximum height Rmax) is preferably 10 nm or less in the arithmetic average roughness Ra of the surface of the resin base.

Further, in the light guide plate for image display of the present embodiment, a barrier layer that will be described later can be employed. By employing the barrier layer, deterioration of the hologram layer can be suppressed and a clear image can be maintained.

The resin base having the above-mentioned MC value and having excellent flatness is manufactured by, for example, a manufacturing method such as a casting method or an extrusion method. Alternatively, the resin base is manufactured by performing post-processing such as cutting processing, polishing processing, or heat-press processing on a resin base.

As the casting method, a glass casting method may be used. In the glass casting method, the raw material of the resin base is poured between glass plates having favorable flatness and smoothness. Then, a polymerization process is performed to solidify the raw material of the resin. When the resin base is manufactured by the glass casting method, the surface shape of the glass used in the glass casting method (which may be referred to hereinafter as "casting glass") is transferred to the resin base. Therefore, when the flatness and smoothness of the surface of the casting glass are favorable, the flatness and smoothness of the surface of the resin base are also favorable.

The smaller the internal strain of the casting glass, the better the flatness of the surface of the casting glass. Therefore, the flatness of the resin base can be improved. For example, as the casting glass, non-tempered glass is more preferable than tempered glass. However, even in the case of tempered glass, the flatness of the resin base can be improved when the glass is chemically tempered glass having less strain than wind-cooled tempered glass.

The larger the thickness of the casting glass, the higher the rigidity of the casting glass and the more the deformation of the glass during manufacturing is suppressed. Therefore, the flatness of the resin base can be improved.

When the resin base is molded, by pressing the casting glass by applying surface pressure, it is possible to improve the smoothness and flatness of the resin base.

The casting method is not limited to the glass casting method described above.

For example, metal endless belts facing each other may be used as the cast. In such a case, the resin base can be continuously manufactured by performing the polymerization process while rotating the endless belt. The shape of the surface of the endless belt is transferred to the resin base. Therefore, the smoothness of the resin base can be improved by mirror-finishing the surface of the endless belt. Further, by controlling the tension of the endless belt, the flatness of the resin base can be improved.

As another casting method, a method of using a metal plate instead of the casting glass and the like can be mentioned.

In the polymerization process in the casting method, the lower the curing rate, the easier it is for the surface shape of the cast to be transferred to the resin base. Therefore, the flatness and smoothness of the resin base can be improved.

As the means for lowering the curing rate, for example, means such as reducing the amount of the polymerization initiator or lowering the polymerization temperature may be used.

As the addition amount of the cross-linking agent that crosslinks the material of the resin base is small, the curing rate is lowered and the surface shape of the cast is more easily transferred to the resin base. Therefore, the flatness of the resin base can be improved. The addition amount of the cross-linking agent is preferably a small amount of 0.5 parts by mass or less with respect to 100 parts by mass in total of the polymerizable monomer component and the polymerizable oligomer component other than the cross-linking agent, which are the raw materials of the resin base.

A release agent can be used for the cast, but the smaller the amount used, the more preferable. As a result, the surface shape of the cast is easily transferred by the resin base, and the flatness and smoothness of the resin base can be improved.

In the polymerization process in the casting method, the flatness and smoothness of the resin base can be improved by pre-polymerizing the monomer for forming the base.

In the polymerization process in the casting method, the curing shrinkage is reduced by performing the cast polymerization using a raw material in which the polymer for forming the base is dissolved in the monomer for forming the base, and thus the surface shape of the cast is easily transferred to the resin base. Therefore, the flatness and smoothness of the resin base can be improved.

In the casting method, two or more of the above techniques may be used in combination. In such a case, the flatness and smoothness of the resin base can be further improved by the synergistic effect of each technique.

When the resin base is manufactured by an extrusion method, for example, a polishing roll method or an air knife method may be used.

Depending on the processing accuracy of the die line of the extrusion die, the smoothness of the surface of the resin base may be lowered due to the transfer of fine unevenness of the die line. Therefore, the extrusion die is finished with high precision so that the die line is smooth.

For example, in the polishing roll method, the molten resin is generally pressed and cooled by a set of three polishing rolls. The pressure applied to the molten resin sandwiched between the polishing rolls becomes a linear pressure. This linear pressure is easily affected by the rotation unevenness of the polishing roll and the variation in the processing accuracy of the roll shaft or the machine base. Therefore, the linear pressure becomes non-uniform, and deterioration in flatness such as thickness unevenness or a gear mark tends to occur on the resin base. The gear mark is generated in a linear shape extending in a direction orthogonal to the feeding direction of the resin base.

When the surface temperature of the polishing roll is excessively high, the resin base is easily deformed. Therefore, the surface temperature is preferably low.

As the feeding mechanism of the polishing roll, it is more preferable to use a configuration that reduces drive unevenness. For example, in the transfer mechanism such as the speed reducer of the feeding mechanism, a planetary roller may be used instead of the gear transfer mechanism in order to suppress the transfer of the vibration in engagement of the gears. However, when the transfer mechanism is a gear transfer mechanism that is less likely to cause vibration in engagement than a spur gear such as a worm gear or a helical gear, the transfer mechanism may be used as a transfer mechanism of the feeding mechanism.

Instead of the polishing roll, a configuration may be used in which a pair of seamless metal belts for cooling the molten resin are disposed at the molten resin outlet of the extruder to face each other at a predetermined interval. In such a case, the molten resin is sandwiched between the pair of seamless metal belts and conveyed while being cooled. As a result, the pressure applied to the molten resin becomes the surface pressure. Therefore, the deterioration in flatness due to the linear pressure as in the above-mentioned polishing roll method is suppressed.

A known resin material for hologram formation is used for the hologram layer. For example, as the resin material for hologram formation, a known material can be appropriately selected and used. The photosensitive material may be appropriately determined in consideration of the wavelength of the light to be guided, and the photosensitive acrylic resin material for hologram formation having excellent optical characteristics may be used.

The hologram layer may be formed on the surface of the resin base, or may be laminated on the resin base with an appropriate transparent layer interposed between the hologram layers. When the light guide plate for image display includes a glass base, the hologram layer may be formed on the surface of the glass base, or may be laminated on the glass base with an appropriate transparent layer interposed therebetween.

The resin base may be disposed on the outermost portion in the thickness direction of the light guide plate for image display, or may be disposed inside. When the light guide plate for image display includes the glass base, the glass base may be disposed on the outermost portion in the thickness direction of the light guide plate for image display, or may be disposed inside.

In the light guide plate for image display, one or more appropriate transparent layers may be disposed between the resin base and the hologram layer in the thickness direction, or between the glass base and the hologram layer when the glass base is included.

In the light guide plate for image display, one or more appropriate transparent layers different from the resin base and the glass base may be disposed on the outermost portion in the thickness direction.

For example, when the transparent layer is disposed on at least one surface of the resin base, the transparent layer may be a hard coat layer that protects the surface of the resin base.

Examples of other transparent layers include absorption layers and adhesive layers having absorption peaks in UV or a specific wavelength range.

Hereinafter, a detailed configuration of an example of the light guide plate for image display of the present embodiment will be described based on the example shown in FIG. 1. FIG. 1 is a schematic cross-sectional view showing an example of a light guide plate for image display according to the first embodiment of the present invention.

In the light guide plate for image display 1004 shown in FIG. 1, the first resin base 1001, the hologram layer 1002 and the second resin base 1003 are arranged in that order in the thickness direction.

The plan view shape of the light guide plate for image display 1004 is not particularly limited. For example, the light guide plate for image display 1004 may be shaped into a shape that can be attached to the display device that is used.

For example, the light guide plate for image display 1004 may be a rectangular plate having a shape larger than the shape attached to the display device. In such a case, the light guide plate for image display 1004 is shaped, for example, by being cut into a shape that can be attached to the display device before being assembled to the display device.

The light guide plate for image display 1004 may be in the shape of a flat plate or, if necessary, in the shape of a curved plate.

Hereinafter, an exemplary case will be described in which the light guide plate for image display 1004 is made of a flat plate having a rectangular shape in a plan view.

The first resin base 1001 is disposed on the outermost portion of the light guide plate for image display 1004 in the thickness direction. The first resin base 1001 is disposed on the surface of the light guide plate for image display 1004 on the image display side.

The first resin base 1001 has a shape similar to the outer shape of the light guide plate for image display 1004.

The image light emitted from the hologram layer 1002 and the external light transmitted through the second resin base 1003 and the hologram layer 1002, which will be described later, are transmitted through the first resin base 1001.

The thickness of the first resin base 1001 is not particularly limited. For example, the thickness of the first resin base 1001 may be 0.05 mm to 2 mm. When the thickness of the first resin base 1001 is 0.05 mm or more, it is easy to maintain a stable shape, and it is preferable that the measurement error of the MC value that will be described later be suppressed to a small value. When the thickness of the first resin base 1001 is 2 mm or less, the mass of the light guide plate for image display 1004 can be reduced. Thus, the weight can be reduced. As a result, the thickness is preferable. The thickness of the first resin base 1001 is preferably 0.05 mm or more, more preferably 0.1 mm or more and even more preferably 0.5 mm or more. On the other hand, from the viewpoint of deformation or residual strain of the base due to water absorptiveness of the substrate, the thickness of the first resin base 1001 is preferably 2 mm or less, more preferably 1.5 mm or less and even more preferably 1 mm or less.

Examples of materials that can be used for the first resin base 1001 include polyethylene terephthalate, polyethylene naphthalate, polyether sulfone, polyimide, nylon, polystyrene, polyvinyl alcohol, an ethylene vinyl alcohol copolymer, a fluoro resin film, polyvinyl chloride, polyethylene, polypropylene, a cyclic polyolefin, cellulose, acetyl cellulose, polyvinylidene chloride, an aramid, polyphenylene sulfide, polyurethane, polycarbonate, a poly(meth)acrylic resin, a phenol resin, an epoxy resin, polyarylate, polynorbornene, a styrene-isobutylene-styrene block copolymer (SIBS) and organic materials such as allyl diglycol carbonate. However, it is preferable that the materials include at least one resin selected from the group consisting of a poly(meth)acrylic resin, an epoxy resin, a cyclic polyolefin and a polycarbonate.

From the viewpoint of transparency of the first resin base 1001, it is preferable to use a polycarbonate or a poly(meth)acrylic resin. From the viewpoint of process resistance such as chemical resistance and processability of the first resin base 1001, it is preferable to use a poly(meth)acrylic resin, an epoxy resin, or a cyclic polyolefin. However, it is more preferable to use a poly(meth)acrylic resin since both transparency and process resistance can be achieved.

As the first resin base 1001, a plate material having an MC value of 0.120 or less obtained by evaluation using shadow contrast is used.

Here, a specific evaluation method and calculation method of the MC value will be described.

Figure 2:
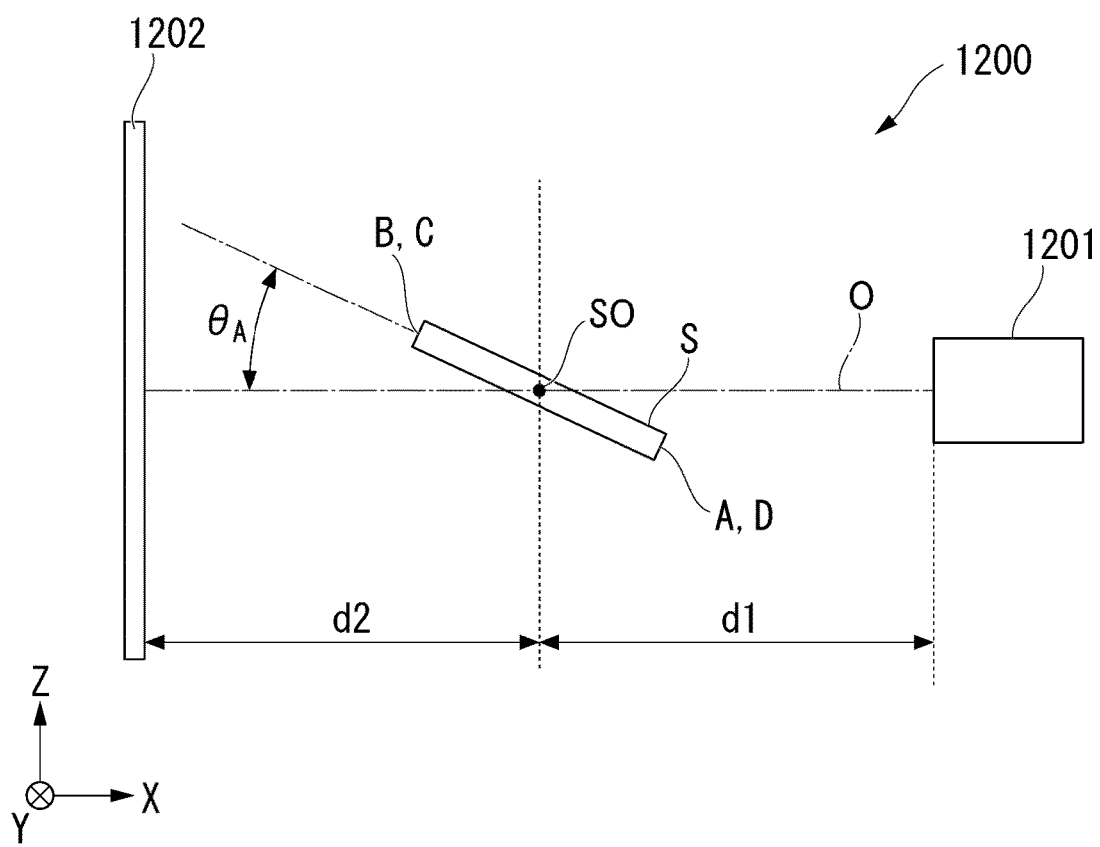
FIG. 2 is a schematic front view showing a method of evaluating an MC value.
Figure 3:
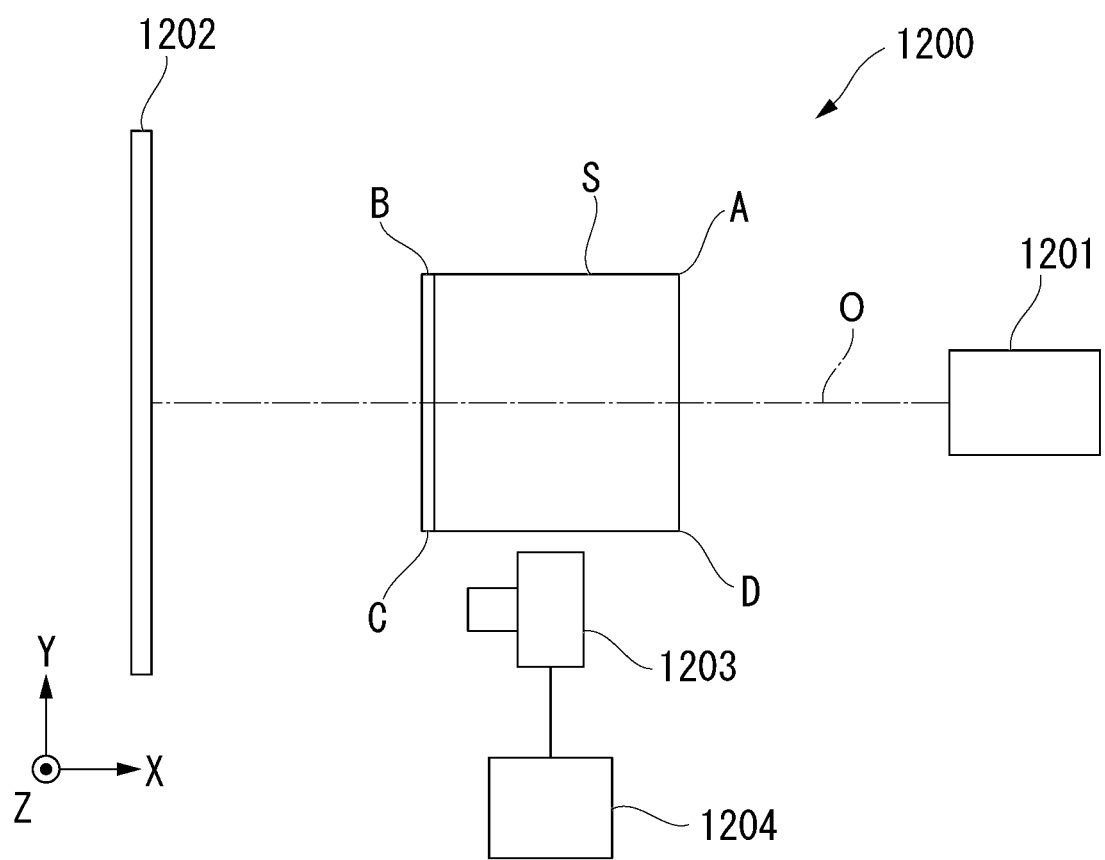
FIG. 3 is a schematic plan view showing a method of evaluating the MC value.
Figure 4:
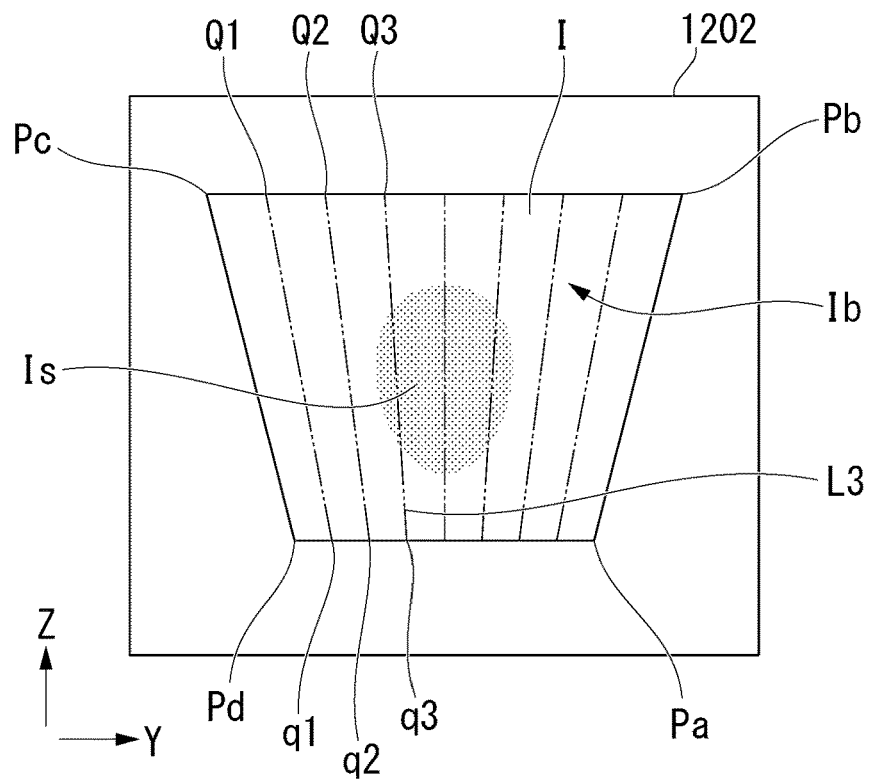
FIG. 4 is a schematic diagram showing an example of an image for evaluating the MC value.
Figure 5:
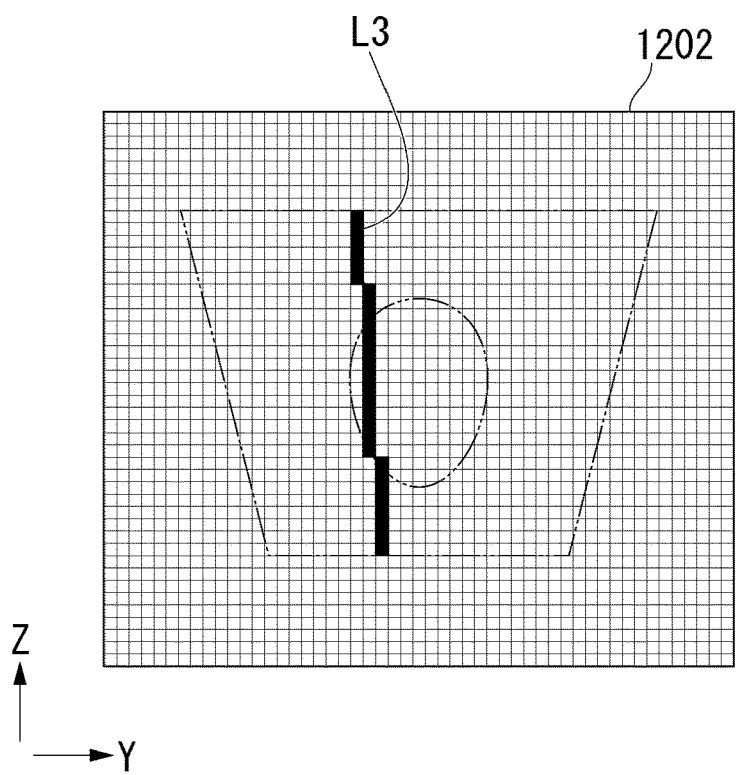
FIG. 5 is a schematic diagram showing an example of a digitized image for evaluating the MC value.
Figure 6:
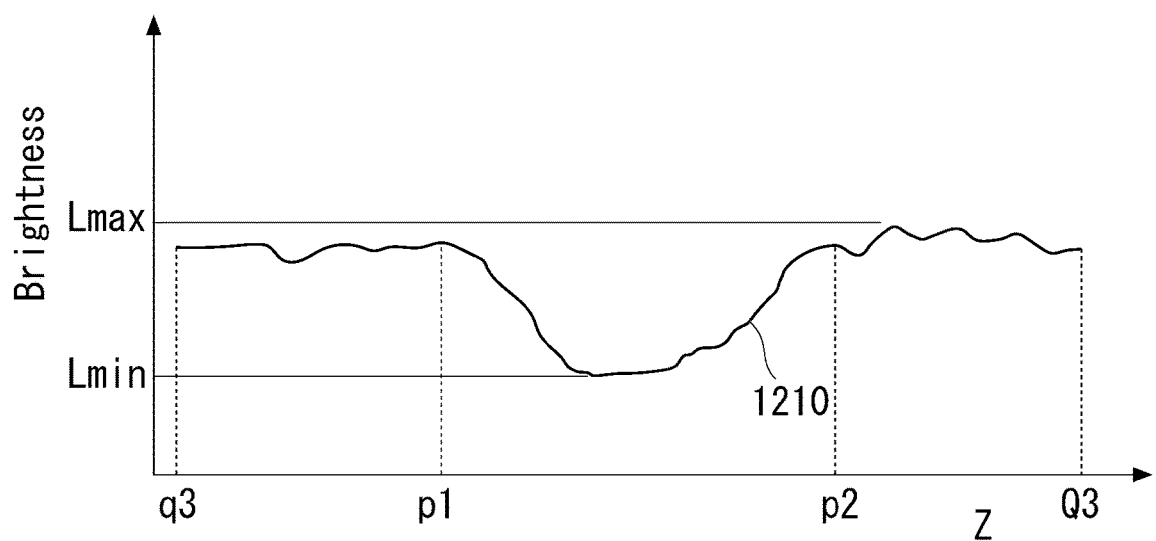
FIG. 6 is a schematic graph showing the method of calculating the MC value.

FIG. 2 is a schematic front view showing a method of evaluating an MC value. FIG. 3 is a schematic plan view showing a method of evaluating the MC value. FIG. 4 is a schematic diagram showing an example of an image for evaluating the MC value. FIG. 5 is a schematic diagram showing an example of a digitized image for evaluating the MC value. FIG. 6 is a schematic graph showing a method of calculating the MC value.

(Shadow Contrast Evaluation)

The shadow contrast evaluation can be performed using the evaluation device 1200 shown in FIGS. 2 and 3.

The evaluation device 1200 includes a light source 1201, a screen 1202, a camera 1203 (refer to FIG. 3) and an arithmetic processing unit 1204 (refer to FIG. 3).

The evaluation device 1200 forms a transmitted projection image of the measurement sample S on the screen 1202 by irradiating the measurement sample S with the measurement light emitted from the light source 1201, and calculates the MC value of the measurement sample S based on the brightness distribution of the transmitted projection image.

The shape of the measurement sample S is the same as the outer shape of the first resin base 1001. An exemplary case in which the measurement sample S is a flat plate having a rectangular shape in a plan view will be described below.

The type of the light source 1201 is not particularly limited as long as the light source 1201 is able to form a transmitted projection image of the measurement sample S. For example, as the light source 1201, it is more preferable to use a point light source so that the transmitted projection image projected on the screen 1202 becomes clear. Examples of point light sources include metal halide lamps, halogen lamps and high pressure mercury lamps. The wavelength of light is preferably in the range of 280 nm to 780 nm. When the measurement sample S is a resin base, it is preferably in the range of 400 nm to 780 nm.

Examples of the screen 1202 include a matte screen, a bead screen and a pearl screen. The color of the screen 1202 is not particularly limited as long as it does not interfere with the measurement of the brightness of the projection image on the screen 1202. The color of the screen 1202 may be, for example, white or gray. The size of the screen 1202 is not particularly limited as long as the size is sufficient to include a transmitted projection image of the measurement sample S in a required measurement area. It is more preferable that the screen 1202 have a size sufficient to include the transmitted projection image of the entire measurement sample S or a size larger than that.

The type of camera 1203 is not particularly limited as long as the brightness of the transmitted projection image on the screen 1202 can be accurately captured. For example, the camera 1203 may be an analog camera or a digital camera. The camera 1203 is more preferably a digital camera in terms of facilitating digital analysis. When the image is captured with an analog camera, the image analysis described later is performed after the obtained image is converted into a digital image.

As the size of the digital image, for example, 800×600, 1024×768, 1600×1200, 2048×1536, or 5472×3648 is used in terms of the number of horizontal×vertical pixels. However, the size of the digital image is not limited to these as long as the image has a resolution capable of acquiring a curve of brightness change corresponding to the unevenness of the measurement sample S caused by swelling or the like.

The brightness value is the degree of shading when the data in each pixel is monochromatized. The resolution of the brightness value is determined by the number of gray levels of each pixel. The number of gray levels of each pixel is not particularly limited as long as an MC value of 0.120 or less can be calculated. The number of gray levels of each pixel may be, for example, 128 gray levels, 256 gray levels, 512 gray levels or 1024 gray levels.

However, when the contrast of the transmitted projection image becomes low due to restrictions such as the transmittance of the measurement sample S and the brightness of the light source 1201, it is more preferable to use as high a number of gray levels as possible in order to improve the measurement accuracy.

It is more preferable that the imaging using the camera 1203 be performed under light blocking. When imaging with the camera 1203 is performed under light blocking, a more accurate brightness distribution can be obtained as compared with the case where imaging with the camera 1203 is not performed under light blocking. The method of imaging under light blocking is not particularly limited. For example, when an imaging environment where the evaluation device 1200 is disposed is a room having a window, light is blocked in the entire room by blocking the window. For example, the evaluation device 1200 may have at least a light blocking housing that surrounds the optical path from the light source 1201 to the screen 1202 and the optical path from the screen 1202 to the camera 1203.

The imaging mode of the camera 1203 may be a color image mode or a monochrome image mode. When imaging is performed in a color image mode, it is more preferable to convert the monochrome image using image processing software.

For example, due to the influence of the optical characteristics of the lens of the camera 1203, the brightness of the edge portion of the captured image may be lower than the brightness of the central portion. When the noise due to the level of the brightness unevenness is excessively large, it is more preferable to obtain the brightness distribution of the measurement sample S after performing shading correction of the captured image in advance in accordance with the optical characteristics of the lens. The shading correction may be performed by appropriate image processing software before the analysis of the captured image. For example, the correction amount for shading correction may be determined in the following manner. Instead of the measurement sample S, using a correction glass plate having favorable flatness and smoothness, an image is captured, so that the brightness distribution becomes uniform. In such a case, the brightness unevenness based on the optical characteristics of the light source 1201 is also corrected.

For the sake of simplicity, an example in which the camera 1203 is a digital camera and the transmitted projection image on the screen 1202 is captured in the monochrome image mode will be described below. In such a case, the pixel output value of the digital image is proportional to the brightness of the transmitted projection image.

When the camera 1203 is an analog camera, digital images of the following description are regarded as digital images generated from the captured images obtained by the camera 1203.

The arithmetic processing unit 1204 obtains the brightness distribution based on the digital image taken by the camera 1203, and calculates the MC value based on the brightness distribution. The arithmetic processing unit 1204 includes a computer capable of executing appropriate image processing software.

The arrangement of the units in the evaluation device 1200 and the measurement sample S for measurement will be described.

Positional relationships may be described below based on the XYZ Cartesian coordinate system. The X axis extends in a horizontal plane. The Y axis is orthogonal to the X axis in the horizontal plane. The Z axis is a vertical axis. The Z axis is orthogonal to the X axis and Y axis. The direction along the X axis, the direction along the Y axis and the direction along the Z axis are referred to as the X direction, the Y direction and the Z direction, respectively.

As shown in FIG. 2, in the evaluation device 1200, the screen 1202 is disposed in parallel to the YZ plane. The light source 1201 is disposed at a distance of (d1+d2) from the screen 1202 in the X direction. The optical axis O of the light source 1201 is parallel to the X axis.

As shown in FIG. 3, the measurement sample S is disposed at an intermediate portion between the light source 1201 and the screen 1202 on the optical axis O. The vertices of the rectangular outer shape in the cross section passing through the center in the thickness direction of the measurement sample S are indicated by A, B, C and D. Each of the sides AD and BC is parallel to the Y axis. The side AD represents the side closer to the light source 1201, and the side BC represents the side closer to the screen 1202.

As shown in FIG. 2, the center SO of the rectangle ABCD in the measurement sample S is disposed on the optical axis O at a position separated from the light source 1201 by a distance d1 in the X direction. Further, the measurement sample S is disposed in a posture in which the measurement sample S is rotated clockwise by the elevation angle $\theta_A$ about the axis parallel to the Y axis through the center SO from the horizontal plane. However, when the thickness of the measurement sample S is thin, the center of one surface in the thickness direction of the measurement sample S may be disposed at the same position as described above instead of the center SO of the measurement sample S.

Here, the distances d1 and d2 are appropriately set in accordance with, for example, the radiation angle and the amount of light of the light source 1201, the size of the measurement sample S and the size of the screen 1202. For example, the distances d1 and d2 may be 30 cm to 1000 cm.

For example, the distance d1 is more preferably as short as possible within the range in which the light source 1201 can be installed. It is more preferable that the distance d2 be as short as possible within the range in which the screen 1202 can be installed. The shorter the distances d1 and d2, the more efficiently the measurement light emitted from the light source 1201 tends to be used.

The elevation angle $\theta_A$ is preferably 5° to 90°. For example, the elevation angle $\theta_A$ can be measured as 20°.

The position of the camera 1203 is not particularly limited as long as the shadow and the reflected light of the camera 1203 are not in the imaging range and the entire transmitted projection image on the screen 1202 can be captured. In the example shown in FIG. 3, in a plan view, the camera 1203 is disposed at a position adjacent to the camera 1203 in the Y direction. However, although not separately shown, the camera 1203 is disposed at a height different from that of the measurement sample S in the Z direction so that the camera's shadow and reflected light are not in the imaging range.

According to such an arrangement, the measurement light emitted from the light source 1201 passes through the measurement sample S and is projected onto the screen 1202. When the light source 1201 is point light, the measurement light spreads radially, and the transmitted projection image is formed on the screen 1202, based on the light intensity of the transmitted light of the measurement sample S. The transmitted projection image is captured by the camera 1203 and sent to the arithmetic processing unit 1204 as a digital image.

For example, a digital image as schematically shown in FIG. 4 is sent to the arithmetic processing unit 1204. In FIG. 4, the outermost frame represents the end portion of the screen 1202. The trapezoid PaPbPcPd in the center represents the transmitted projection image I of the measurement sample S. The points Pa, Pb, Pc and Pd correspond to the points A, B, C and D of the measurement sample S, respectively.

The transmitted projection image I has a brightness distribution. In the example shown in FIG. 4, the image has a high brightness portion Ib and a low brightness portion Is. The high brightness portion Ib is formed by projecting the measurement light transmitted in accordance with the transmittance of the measurement sample S onto the screen 1202.

The brightness distribution on the transmitted projection image I includes the brightness unevenness due to the optical path length and the radiation intensity distribution of the light source 1201. This brightness unevenness occurs to some extent even when the measurement sample S has no unevenness defect.

Since the measurement light is radiation light, the light intensity of the measurement light traveling on the optical axis O is maximized and decreases toward the peripheral edge of the measurement sample S. The same applies to the radiation intensity distribution of the light source 1201.

When the brightness unevenness is larger than the brightness unevenness caused by the unevenness defect, the brightness unevenness is corrected in advance. For example, when the difference between the brightness value on the optical axis O and the brightness value of the outer edge portion of the measurement sample S is 5 or more, it is more preferable to correct the above-mentioned brightness unevenness.

The brightness unevenness caused by the light intensity distribution of the measurement light can be corrected based on, for example, the law of light attenuation (the intensity of the attenuated light is inversely proportional to the square of the distance from the light source). For example, the brightness unevenness caused by the radiation intensity distribution of the light source 1201 can be corrected based on the radiation intensity distribution of the light source 1201.

For example, as described above, correction data may be acquired by capturing an image using the correction glass plate.

However, under the measurement conditions, when there is only the brightness unevenness smaller than the brightness unevenness caused by the unevenness defect, the correction of the light intensity distribution of the measurement light and the light source 1201 may be omitted.

Hereinafter, it is assumed that the brightness unevenness that causes the measurement noise is removed.

It is considered that the low brightness portion Is is formed by the unevenness defect corresponding to the error of the flatness on the surface of the measurement sample S.

For example, when the radius of curvature of the unevenness formed on the measurement sample S is small to some extent, it is conceivable that the measurement light diffuses and reaches the screen 1202 due to the lens effect of the uneven portion. This depends on the smoothness.

For example, when the measurement sample S is deformed to have a wavy shape, in some cases, the thickness may not change even when the surface is uneven. This depends on the flatness. In such a case, the unevenness does not have a lens effect, but the same refraction and diffraction of the measurement light occur, which may contribute to the brightness unevenness.

In addition, for example, it is conceivable that the unevenness formed on the measurement sample S causes a strain distribution in the vicinity of the uneven portion, the emission direction of the measurement light is disturbed, and the light intensity on the screen 1202 changes.

For example, as the angle of incidence on the measurement sample S increases, the change in transmittance characteristics that depends on the angle of incidence increases. Therefore, it is conceivable that the transmittance of the uneven portion formed on the measurement sample S changes and contributes to the brightness unevenness. It is also conceivable that the transmittance that changes due to the uneven refractive index due to the strain inside the measurement sample S also contributes to the brightness unevenness.

It is considered that the unevenness defect causes brightness unevenness due to any or a combination of such factors. Further, it is considered that the magnitude of the brightness unevenness has a high correlation with the depth of the unevenness defect. Therefore, the flatness of the measurement sample S can be evaluated by the difference in brightness between the low brightness portion Is and the high brightness portion Ib.

In the example shown in FIG. 4, the low brightness portion Is is elliptical. Such a low brightness portion Is corresponds to an elliptical concave portion or convex portion on the surface of the measurement sample S. For example, when the gear mark is formed on the measurement sample S, the low brightness portion Is is formed in a streaky shape. In such a case, low brightness portions Is are formed at equal pitches substantially parallel to the direction orthogonal to the extrusion direction of the first resin base 1001.

The arithmetic processing unit 1204 analyzes the digital image as follows and calculates the MC value.

The digital image used for measuring the MC value may be the entire trapezoid PaPbPcPd. For example, when a part of the measurement sample S is cut out and is used in the display device, measurement may be performed in the entire range of the sizes which can be applied in the display device.

In some cases, as the digital image used for the measurement of the measurement sample S, a part of a region inside the trapezoid PaPbPcPd may be extracted in a trapezoidal shape. For example, the directionalities, the pitches and the like of the defects, such as the gear marks, to be detected by the MC value may be known in advance. In such a case, when the size and area thereof are sufficient to include a plurality of gear marks in consideration of the measurement error, the part of the region of the trapezoid PaPbPcPd may be used. For example, the same applies when the shape of the measurement sample S has a gentle curve in design.

For example, when the measurement sample S has a rectangular shape of 200 mm 200 mm in a plan view, it is more preferable that the measurement area include a rectangular area having a size of at least 180 mm×80 mm on the measurement sample S. Here, the longitudinal direction of the measurement area is adjusted to the direction in which the change in brightness becomes larger.

For example, when the measurement sample S is a curved plate instead of a flat plate, the width of the measurement area in the direction having the curvature is more preferably 50 mm or more. For example, when the measurement sample S has a spherical curve as a whole, it is more preferable that the digital image include a rectangular area having a size of 50 mm×50 mm with the top of the curve determined as the center.

An exemplary case in which the entire trapezoid PaPbPcPd is used will be described below.

The arithmetic processing unit 1204 acquires a brightness distribution on a predetermined measurement line. For example, the measurement line is each of (N−1) line segments qiQi connecting points qi (where i=1, . . . , N−1) obtained by dividing the side AD on the measurement sample S into N equal parts and points Qi (where i=1, . . . , N−1) obtained by dividing the side BC on the measurement sample S into N equal parts.

In such a case, on the measurement sample S, the points qi and the points Qi are points on a plane parallel to the ZX plane.

FIG. 4 shows the points qi and Qi on the transmitted projection image I.

For example, N can be appropriately selected between 2 and 10000 depending on the size of the unevenness defect. For example, in the case of a defect having a width of 100 mm, N may be selected so that the pitch of the measurement line is about 1 mm to 20 mm.

For example, when the low brightness portion Is is streaky, a digital image is obtained by changing the placement of the measurement sample S such that the measurement line intersects the low brightness portion Is. In such a case, N may be selected as the measurement line so that the pitch of the measurement line in the longitudinal direction of the low brightness portion Is is about 1 mm to 20 mm.

In the example shown in FIG. 4, N=8. The measurement line L3 in FIG. 5 schematically shows the measurement line corresponding to the line segment q3Q3 in FIG. 4. Since the measurement line on the measurement sample S is projected as an oblique line, the measurement line L3 is a digitized oblique line on the transmitted projection image I.

The arithmetic processing unit 1204 converts the coordinates of the points qi and Qi on the measurement sample S into the pixel coordinates on the transmitted projection image I based on the positional relationship between the light source 1201, the screen 1202 and the measurement sample S, thereby extracting the brightness value of each measurement line.

FIG. 6 schematically shows an example of a brightness distribution along the measurement line L3. The horizontal axis of FIG. 6 represents the position of the pixel in the Z direction. The vertical axis represents the brightness value.

As shown in the curve 1210, the brightness at the measurement line L3 decreases from a substantially constant high brightness value from the point q3 to the point Q3, reaches the minimum brightness value, and then returns to a substantially flat high brightness value again. In the Z direction, the section from q3 to p1 and the section from p2 to Q3 are both included in the high brightness portion Ib. The section from p1 to p2 is included in the low brightness portion Is.

The arithmetic processing unit 1204 obtains the minimum value Lmin and the maximum value Lmax of the brightness from such a brightness distribution.

The MC value is defined by Expression (1). The arithmetic processing unit 1204 calculates the MC value for Lmin and Lmax based on Expression (1).

[Numerical Expression 1]

$$MC = \frac{Lmax - Lmin}{Lmax + Lmin} \quad (1)$$

The MC value is an index that objectively represents the magnitude of the dip in the low brightness portion Is in the brightness distribution.

As described above, the brightness of the low brightness portion is becomes lower as the flatness of the measurement sample S becomes worse. Therefore, the larger the MC value, the poorer the flatness of the surface of the measurement sample S, and the smaller the MC value, the better the flatness of the surface of the measurement sample S.

Similarly, the arithmetic processing unit 1204 calculates the MC value for each measurement line.

The MC value of the measurement sample S is the maximum value among the MC values of each measurement line.

As described above, in the light guide plate for image display of the present invention, it is necessary for the MC value of the resin base to be 0.120 or less. As a result, the sharpness of the display image using the hologram such as AR or MR formed by using this light guide plate is improved. The MC value of the resin base is 0.120 or less, preferably 0.110 or less, more preferably 0.100 or less, even more preferably 0.080 or less and particularly preferably 0.070 or less.

On the other hand, by setting the MC value to 0.001 or more, blocking between the bases at the time of laminating the bases can be prevented, and the handleability at the time of processing the bases tends to be improved. The MC value of the resin base is preferably 0.001 or more, more preferably 0.005 or more, even more preferably 0.010 or more and particularly preferably 0.020 or more.

Further, as described above, in the light guide plate for image display of the present invention, the refractive index of the resin base is preferably 1.48 to 1.70. As a result, the viewing angle when the resin base is used as a light guide plate for image display can be enlarged.

Further, as described above, in the light guide plate for image display of the present invention, it is preferable that the heat shrinkage rate measured based on annex A of JIS K 6718-1: 2015 of the resin base be less than 3%. As a result, the sharpness of the display image using the hologram such as AR or MR formed by using this light guide plate tends to be improved. The heat shrinkage rate is preferably less than 3.0%, more preferably 2.5% or less and even more preferably 2.0% or less.

Further, as described above, in the light guide plate for image display of the present invention, it is preferable that the arithmetic average roughness Ra of the surface of the resin base be 10 nm or less. As a result, the sharpness of the display image using the hologram such as AR or MR formed by using this light guide plate tends to be improved. The arithmetic average roughness Ra of the surface of the resin base is preferably 10 nm or less, more preferably 8 nm or less and even more preferably 5 nm or less.

The description will now return to the description of the light guide plate for image display 1004 shown in FIG. 1.

The hologram layer 1002 in the light guide plate for image display 1004 is laminated on the surface of the first resin base 1001. The configuration of the hologram layer 1002 is not particularly limited. An appropriate diffraction grating corresponding to the function necessary for the light guide plate for image display 1004 is formed on the hologram layer 1002.

The second resin base 1003 is laminated on the surface of the hologram layer 1002 opposite to the first resin base 1001. As the second resin base 1003, the same configuration as that of the first resin base 1001 is used. However, the thickness, the material and the like of the second resin base 1003 may be different from those of the first resin base 1001. In particular, the second resin base 1003 is disposed on the surface of the light guide plate for image display 1004 on the external light incident side opposite to the display image emission side. Therefore, a material of which the surface hardness is higher than that of the first resin base 1001 may be used.

Such a light guide plate for image display 1004 can be manufactured, for example, as follows.

Using the manufacturing method described above, the first resin base 1001 and the second resin base 1003 having an MC value of 0.120 or less are prepared. For example, a photopolymer material for hologram formation is applied onto the first resin base 1001. At this time, a transparent seal layer having the same thickness as the hologram layer 1002 may be provided on the outer peripheral portion of the first resin base 1001. In such a case, the photopolymer material is applied to the concave portions formed by being surrounded by the seal layer. The seal layer seals the outer peripheral portion of the hologram layer 1002 after the hologram layer 1002 is formed. As the seal layer, a material having excellent gas barrier properties may be used. In such a case, the durability of the hologram layer 1002 can be improved.

Thereafter, the second resin base 1003 is placed on the photopolymer material.

However, the above-mentioned manufacturing sequence is an example. For example, the photopolymer material may be applied to the second resin base 1003. Then, the first resin base 1001 may be placed on the photopolymer material.

Thereafter, the laminate of the first resin base 1001, the photopolymer material and the second resin base 1003 is bonded by a vacuum press.

Then, interference fringes corresponding to the diffraction pattern are formed on the photopolymer material of the laminate, and a diffraction grating is formed in the photopolymer material.

In such a manner, the light guide plate for image display 1004 is manufactured.

According to the light guide plate for image display 1004, the MC values of the first resin base 1001 and the second resin base 1003 are 0.120 or less. Therefore, unevenness defects on each surface are reduced. As a result, each optical path of the image light transmitted through the first resin base 1001 and displayed as an image and the external light transmitted through the second resin base 1003 and the first resin base 1001 and superimposed on the image light is suppressed from being disturbed by the influence of unevenness defects. As a result, a clear image is displayed on the light guide plate for image display 1004.

As described above, according to the present embodiment, it is possible to provide a light guide plate for image display capable of displaying a clear image even when a resin base is used.

First Modification Example

A first modification example of the first embodiment of the present invention will be described.

Figure 7:
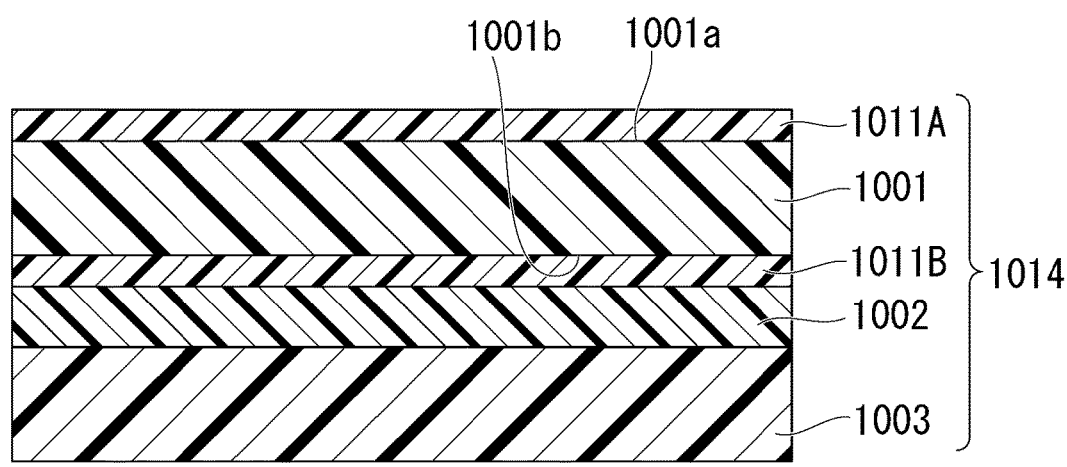
FIG. 7 is a schematic cross-sectional view showing an example of a light guide plate for image display according to a first modification example of the first embodiment of the present invention.

FIG. 7 is a schematic cross-sectional view showing an example of a light guide plate for image display according to the first modification example of the first embodiment of the present invention.

As shown in FIG. 7, in the light guide plate for image display 1014 of the first modification example of the first embodiment of the present invention, a first hard coat layer 1011A and a second hard coat layer 1011B are added to the first light guide plate for image display 1004 of the basic example of the first embodiment of the present invention.

Hereinafter, the points different from the basic example of the first embodiment of the present invention will be mainly described.

The first hard coat layer 1011A and the second hard coat layer 1011B are provided mainly for the purpose of protecting the surface of the first resin base 1001. The material of the first hard coat layer 1011A and the second hard coat layer 1011B is a transparent material having a hardness of at least one surface higher than that of the surface of the first resin base 1001. The first hard coat layer 1011A and the second hard coat layer 1011B may have a multilayer structure made of a plurality of transparent materials having different hardness as long as the hardness of at least one of the surfaces is higher than that of the first resin base 1001.

In the example shown in FIG. 7, the first hard coat layer 1011A is disposed on the first surface 1001a on the opposite side of the first resin base 1001 from the hologram layer 1002. The first hard coat layer 1011A forms the outermost surface of the light guide plate for image display 1014.

The second hard coat layer 1011B is disposed on the second surface 1001b facing the hologram layer 1002 in the first resin base 1001.

The thickness of the first hard coat layer 1011A is more preferably 1 μm to 50 μm.

The thickness of the second hard coat layer 1011B is more preferably 1 μm to 50 μm.

Regarding the surface flatness of the first hard coat layer 1011A and the second hard coat layer 1011B, when the MC value of a laminate of the first hard coat layer 1011A and the second hard coat layer 1011B and the first resin base 1001 (hereinafter referred to as a coated base) is measured, the MC value is more preferably 0.120 or less.

It is more preferable that the arithmetic average roughness Ra on the surfaces of the first hard coat layer 1011A and the second hard coat layer 1011B be 10 nm or less.

The refractive indexes of the materials of the first hard coat layer 1011A and the second hard coat layer 1011B are not particularly limited.

For example, the refractive indexes of the materials of the first hard coat layer 1011A and the second hard coat layer 1011B may be equal to or less than that of the first resin base 1001 from the viewpoint of visibility of the real image. However, when such materials for the purpose of increasing the hardness of the hard coat layer are selected, the refractive indexes may be higher than that of the first resin base 1001.

For example, when the refractive indexes of the materials of the first hard coat layer 1011A and the second hard coat layer 1011B are equal to the refractive index of the material of the first resin base 1001, the surface of the first resin base 1001 and the interface between the first hard coat layer 1011A and the second hard coat layer 1011B are optically absent. In such a case, the MC value of the coated base substantially represents the degree of unevenness defects on the surfaces of the first hard coat layer 1011A and the second hard coat layer 1011B. For example, when the first hard coat layer 1011A and the second hard coat layer 1011B are formed and thereby the unevenness defects thereof become smaller than that of the surface of the first resin base 1001, it is more preferable that the refractive indexes of the materials of the first hard coat layer 1011A and the second hard coat layer 1011B be close to the refractive index of the material of the first resin base 1001.

Generally, the refractive indexes of the materials of the first hard coat layer 1011A and the second hard coat layer 1011B are different from the refractive index of the material of the first resin base 1001. Therefore, from the MC value of the coated base, it is possible to obtain evaluation additionally including consideration of both the unevenness defects on the surfaces of the first hard coat layer 1011A and the second hard coat layer 1011B and the unevenness defects on the surface of the first resin base 1001. However, the first hard coat layer 1011A and the second hard coat layer 1011B are formed such that the layer thicknesses thereof are constant. Thereby, the unevenness defects on the surfaces of the first hard coat layer 1011A and the second hard coat layer 1011B may follow the unevenness defects on the surface of the first resin base 1001. In such a case, it is considered that the MC value of the first resin base 1001 itself is equal to the MC value of the first resin base 1001 on which the first hard coat layer 1011A and the second hard coat layer 1011B are formed.

For example, the refractive indexes of the materials of the first hard coat layer 1011A and the second hard coat layer 1011B are preferably equal to or higher than the refractive index of the material of the hologram layer 1002 from the viewpoint of a wide viewing angle. The larger the refractive index, the larger the critical angle of the light to be guided tends to be.

The surface hardness of the first hard coat layer 1011A and the second hard coat layer 1011B is not particularly limited as long as the surface hardness is higher than the surface hardness of the first resin base 1001. For example, the pencil hardness (JIS K 5600-5-4: 1999) of the first hard coat layer 1011A and the second hard coat layer 1011B is more preferably H or more and even more preferably 2H or more.

Suitable materials for the first hard coat layer 1011A and the second hard coat layer 1011B include, for example, a hard coating agent containing a polymerizable monomer or a polymerizable oligomer that forms a cured product by irradiation with active energy rays. Examples of the polymerizable monomer include (meth)acrylate monomers having a radically polymerizable unsaturated group in the molecule. Examples of the polymerizable oligomer include (meth)acrylate oligomers having a radically polymerizable unsaturated group in the molecule.

Examples of the (meth)acrylate monomer having a radically polymerizable unsaturated group in the molecule include at least one monomer selected from the group consisting of urethane(meth)acrylate, polyester(meth)acrylate, epoxy(meth)acrylate, melamine(meth)acrylate, polyfluoroalkyl(meth)acrylates and silicone(meth)acrylates. Examples of the (meth)acrylate oligomer having a radically polymerizable unsaturated group in the molecule include oligomers containing constituent units derived from at least one monomer selected from the group consisting of urethane (meth)acrylate, polyester(meth)acrylate, epoxy(meth)acrylate, melamine(meth)acrylate, polyfluoroalkyl(meth)acrylates and silicone(meth)acrylates. The polymerizable monomer or the polymerizable oligomer may be used in a combination of two or more. Among these, urethane(meth)acrylate monomers or oligomers are preferable because of their high surface hardness and the like.

Examples of the urethane(meth)acrylate include a urethane(meth)acrylate obtained by reacting a polyisocyanate compound and a (meth)acrylate compound having one hydroxyl group in the molecular structure and a urethane (meth)acrylate obtained by reacting the polyisocyanate compound, a (meth)acrylate compound having one hydroxyl group in the molecular structure and a polyol compound.

The first hard coat layer 1011A and the second hard coat layer 1011B may contain a cured product of a polyfunctional (meth)acrylate.

Examples of the polyfunctional(meth)acrylate include trimethylolpropane tri(meth)acrylate, tripropyleneglycol di(meth)acrylate, diethyleneglycol di(meth)acrylate, dipropyleneglycol di(meth)acrylate, pentaerythritol tri(meth)acrylate, pentaerythritol tetra(meth)acrylate, dipentaerythritol hexa(meth)acrylate, 1,6-hexanediol di(meth)acrylate, neopentylglycol di(meth)acrylate, trimethylolpropane tri(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanurate tri(meth)acrylate, isocyanurate di(meth)acrylate, polyester tri(meth)acrylate, polyester di(meth)acrylate, bisphenol di(meth)acrylate, diglycerin tetra(meth)acrylate, adamanthyl di(meth)acrylate, isobolonyl di(meth)acrylate, dicyclopentane di(meth)acrylate, tricyclodecan di(meth)acrylate and ditrimethylolpropane tetra(meth)acrylate. Alternatively, the examples include PO, EO, caprolactone and the like obtained by modifying the components.

In forming the first hard coat layer 1011A and the second hard coat layer 1011B, a cross-linking agent, a polymerization initiator, a lubricant, a plasticizing agent, an organic particle, an inorganic particle, an antifouling agent, an additive such as an antioxidant or a catalyst, or silicone-based or fluorine-based additives for preventing stains and adhesion may be added to the hard coating agent as long as the physical properties are not impaired.

For the first hard coat layer 1011A and the second hard coat layer 1011B, a material having a refractive index different from that of the first resin base 1001 may be used. In such a case, using the first hard coat layer 1011A and the second hard coat layer 1011B, it is possible to change the refractive index of the outermost surface of the light guide plate for image display 1014 and the refractive index at the interface with the hologram layer 1002, from the refractive index of the first resin base 1001.

The light guide plate for image display 1014 of the first modification example of the first embodiment of the present invention can be manufactured in the same manner as in the basic example of the first embodiment of the present invention except the following configuration. For example, the first resin base 1001 is formed in the same manner as the above-mentioned basic example of the first embodiment of the present invention. Then, until a photopolymer material forming the hologram layer 1002 is laminated thereon, the first hard coat layer 1011A and the second hard coat layer 1011B are formed on the first surface 1001a and the second surface 1001b of the first resin base 1001, respectively.

The first hard coat layer 1011A and the second hard coat layer 1011B can be formed by applying the hard coating liquid as raw materials to the first surface 1001a and the second surface 1001b, respectively, and then curing the hard coating liquid. The application method of the hard coating liquid is not particularly limited. For example, as the application method of the hard coating liquid, there is an application method such as a casting method, a roller coating method, a bar coating method, a spray coating method, an air knife coating method, or a dipping method. By using the application method, the photocurable resin composition is directly applied to the surface of the base, and a cured film is formed on a base by irradiating the coating film with light to cure the coating film.

Further, as the application method, there is a method as follows. For example, a photocurable resin composition is applied to the surface of at least one template material in order to form a mold for cast polymerization by the above application method or the like, and the coating film is irradiated with light to be cured. As a result, a cured film is formed on the mold material, a mold for cast polymerization is assembled using this mold material so that the cured film is on the inside, and the raw material of the base is injected into this mold, thereby performing cast polymerization. After the polymerization is completed, a laminate in which a cured film is integrated on the surface of the base is taken out.

However, the first hard coat layer 1011A and the second hard coat layer 1011B may be formed in the same manner as the first resin base 1001 in the manufacturing process of the first resin base 1001.

As the material and the material application method used for the first hard coat layer 1011A and the second hard coat layer 1011B, it is more preferable to use a material and a material application method that are unlikely to increase the unevenness of the unevenness defects on the surface of the first resin base 1001. As the material and the material application method used for the first hard coat layer 1011A and the second hard coat layer 1011B, it is even more preferable to use a material and a material application method for smoothing the unevenness of the unevenness defects on the surface of the first resin base 1001.

For example, as the material, the above-mentioned hard coating agent, alkoxysilane polycondensation-based cured resin, melamine-based resin and the like can be used.

For example, as an application method, a conventionally known coating method such as bar coating, dip coating, reverse gravure coating, direct gravure coating, roll coating, die coating or curtain coating can be used. The dip coating, the die coating or the gravure coating is particularly preferred.

According to the first modification example of the first embodiment of the present invention, as in the basic example of the first embodiment of the present invention, the MC values of the first resin base 1001 and the second resin base 1003 are 0.120 or less. Thus, as in the basic example of the first embodiment of the present invention, even when a resin base is used, it is possible to provide a light guide plate for image display capable of displaying a clear image.

Further, according to the first modification example of the first embodiment of the present invention, the first hard coat layer 1011A and the second hard coat layer 1011B are laminated on the first resin base 1001. Thus, the surface of the first resin base 1001 is prevented from being scratched.

For example, in the manufacturing process of the light guide plate for image display 1014 and the display device, deterioration in flatness due to scratches on the surface of the first resin base 1001 is prevented. Therefore, the defect rate of the light guide plate for image display 1014 and the display device due to handling in the manufacturing process such as transportation can be reduced.

For example, the first hard coat layer 1011A constitutes the outermost surface of the light guide plate for image display 1014. Thus, deterioration in image quality due to scratches on the outermost surface when the light guide plate for image display 1014 is used is suppressed.

In the description of the first modification example, the exemplary case where the hard coat layer is formed on each surface of the first resin base 1001 in the thickness direction has been described. However, one of the first hard coat layer 1011A and the second hard coat layer 1011B may be omitted.

In the description of the first modification example, the exemplary case where the hard coat layer is formed only on the first resin base 1001 has been described. However, at least one of the first hard coat layer 1011A and the second hard coat layer 1011B may be formed on the second resin base 1003.

Second Embodiment

Basic Example

Hereinafter, the light guide plate for image display according to the second embodiment of the present invention will be described.

The light guide plate for image display according to the second embodiment of the present invention has a first resin base, a first barrier layer and a hologram layer. The first barrier layer is preferably disposed on at least one surface of the first resin base and the hologram layer, and more preferably the first barrier layer is disposed on the hologram layer. It is preferable that the first resin base, the first barrier layer and the hologram layer be arranged in that order in the thickness direction.

The light guide plate for image display according to the second embodiment of the present invention may further have a second barrier layer and a second resin base. It is preferable that the first barrier layer be disposed on at least one surface of the surface of the first resin base facing the hologram layer and the surface of the hologram layer facing the first resin base. It is also preferable that the second barrier layer be disposed on the surface of the second resin base facing the hologram layer and on the surface of the hologram layer facing the second resin base. It is more preferable that the first barrier layer and the second barrier layer be disposed on the surface of the hologram layer on the side facing the first resin base and the surface of the hologram layer on the side facing the second resin base, respectively. It is preferable that the first resin base, the first barrier layer, the hologram layer, the second barrier layer and the second resin base be laminated in that order in the thickness direction.

In the present embodiment, the first resin base and the second resin base may be collectively referred to as "resin base". Further, the first barrier layer and the second barrier layer may be collectively referred to as "barrier layer".

One or more transparent layers may be disposed between the barrier layer and the resin base. Further, one or more transparent layers may be disposed between the barrier layer and the hologram layer.

Examples of the transparent layer include a hard coat layer, an adhesive layer and an anchor coat layer.

In the light guide plate for image display according to the second embodiment of the present invention, a glass base may be provided such that the barrier layer and the hologram layer are sandwiched between the glass base and the resin base. In such a case, since the glass base itself has a barrier property, the glass base may be disposed on the surface of the hologram layer opposite to the surface facing the barrier layer.

As the resin base, the resin base according to the first embodiment described above can be suitably used.

The material used for the resin base is not particularly limited as long as the material is a transparent material, but preferably contains at least one resin selected from the group consisting of an acrylic resin, a cyclic polyolefin resin and a polycarbonate resin.

The refractive index of the barrier layer is preferably higher than that of the resin base and more preferably 1.48 or more.

As the material of the barrier layer, it is preferable to use a steam barrier material.

It is preferable that the material of the barrier layer include an inorganic material. It is more preferable that the material include at least one inorganic material selected from the group consisting of silicon oxide, silicon nitrogen oxide, diamond-like carbon (DLC), aluminum oxide and glass.

Further, by using an auxiliary layer containing a fluorine-based material, a cycloolefin-based polymer, vinylidene chloride or the like as a part of the barrier layer in combination with the above-mentioned inorganic material, the barrier layer can have a multi-layer structure. As a result, a steam barrier property can be further enhanced.

Further, the barrier layer may be disposed on the resin film. In such a case, it is more preferable that the resin film be disposed between the barrier layer and the resin base.

The hologram layer is sandwiched between the first resin base and the second resin base, or between the first resin base and the glass base.

The light guide plate for image display has an incidence portion on which image light is incident and a display portion that displays an image formed by the image light. The hologram layer is disposed between the incidence portion and the display portion. A diffraction grating pattern for guiding image light incident from at least the incidence portion to the display portion and emitting the image light from the display portion is formed on the hologram layer. The diffraction grating pattern in the display portion transmits at least a part of external light incident from the outside of the light guide plate for image display.

The image light incident on the incidence portion is guided into the hologram layer and emitted to the outside from the display portion. On the other hand, as a result of the external light also passing through the resin base and the display portion, the observer of the display portion is able to observe both the image light and the external light in the field of view.

The light guide plate for image display according to the second embodiment of the present invention is suitably used for a display device using VR technology or AR technology. For example, the light guide plate for image display according to the second embodiment of the present invention may be used in a device such as a hologram optical element (HOE) which is represented by a combiner of a head-up display (HUD) mounted on an automobile or a reflector for a reflective liquid crystal display device, in addition to display applications.

A known resin material for hologram formation is used for the hologram layer. Examples of the resin material for hologram formation include hologram recording materials (Japanese Unexamined Patent Application, First Publication Nos. H08-1676, H08-1677, H08-1678 and H08-1679). The hologram recording materials each consist of a thermosetting resin, which has at least one solvent-soluble and cationically polymerizable ethylene oxide ring in constituent units, and a radically polymerizable ethylenic monomer.

Figure 9:
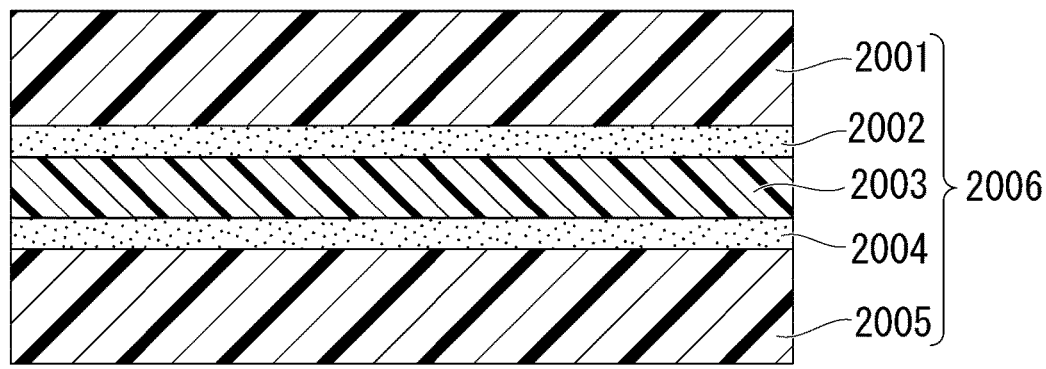
FIG. 9 is a schematic cross-sectional view showing an example of a light guide plate for image display according to a second embodiment of the present invention.

Hereinafter, a detailed configuration of an example of a light guide plate for image display according to a second embodiment of the present invention will be described based on the example shown in FIG. 9. FIG. 9 is a schematic cross-sectional view showing an example of a light guide plate for image display according to a second embodiment of the present invention.

In the light guide plate for image display 2006 shown in FIG. 9, the first resin base 2001, the first barrier layer 2002, the hologram layer 2003, the second barrier layer 2004 and the second resin base 2005 are arranged in that order in the thickness direction.

The plan view shape of the light guide plate for image display 2006 is not particularly limited. For example, the light guide plate for image display 2006 may be shaped into a shape that can be attached to the display device used.

For example, the light guide plate for image display 2006 may be a rectangular plate having a shape larger than the shape attached to the display device. In such a case, the light guide plate for image display 2006 is formed by being cut into a shape that can be attached to the display device before being assembled to the display device.

The light guide plate for image display 2006 may have a flat plate shape or, if necessary, a curved plate shape.

An exemplary case in which the light guide plate for image display 2006 is made of a flat plate having a rectangular shape in a plan view will be described below.

The first resin base 2001 is disposed on the outermost portion of the light guide plate for image display 2006 in the thickness direction. The first resin base 2001 is disposed on the surface of the light guide plate for image display 2006 on the display image emission side.

The first resin base 2001 has a shape similar to the outer shape of the light guide plate for image display 2006.

The image light emitted from the hologram layer 2003 and the external light transmitted through the second resin base 2005 and the hologram layer 2003, which will be described later, are transmitted through the first resin base 2001.

The thickness of the first resin base 2001 is not particularly limited. For example, the thickness of the first resin base 2001 may be 0.1 mm to 10 mm.

The material forming the first resin base 2001 is not particularly limited as long as the material is a transparent resin material. Examples of the material for forming the first resin base 2001 include, in consideration of optical characteristics such as transparency and light refractive index, and various physical properties such as impact resistance, heat resistance and durability: polyolefin-based resins such as a homopolymer or a copolymer of an olefin such as ethylene, propylene or butene; amorphous polyolefin-based resins such as a cyclic polyolefin; polyester-based resins such as polyethylene terephthalate (PET) and polyethylene naphthalate (PEN); cellulose-based resins such as triacetyl cellulose, diacetyl cellulose and cellophane; polyamide-based resins such as nylon 6, nylon 66, nylon 12 and copolymerized nylon; and ethylene-vinyl acetate copolymer partial hydrolyzate (EVOH), a polyimide-based resin, a polyether imide-based resin, a polysulfone-based resin, a polyether sulfone-based resin, a polyether ether ketone-based resin, a polycarbonate-based resin, a polyvinyl butyral-based resin, a polyarylate-based resin, a fluoro resin, a poly(meth)acrylic resin, a styrene-based resin such as polystyrene, polyvinyl alcohol, an ethylene vinyl alcohol copolymer, polyvinyl chloride, cellulose, acetyl cellulose, polyvinylidene chloride, polyphenylene sulfide, polyurethane, a phenol resin, an epoxy resin, a polyarylate resin, polynorbornene, styrene-isobutylene-styrene block copolymers (SIBS), allyl diglycol carbonate and organic materials such as biodegradable resins. Among these, it is preferable that the material include at least one resin selected from the group consisting of a poly(meth)acrylic resin, an epoxy resin, a cyclic polyolefin and a polycarbonate. The first resin base 2001 may be formed of two or more kinds of materials, or may have a laminated structure in which two or more kinds of materials are laminated.

From the viewpoint of transparency of the first resin base 2001, a polycarbonate or poly(meth)acrylic resin is preferable. From the viewpoint of process resistance such as chemical resistance and processability of the first resin base 2001, a poly(meth)acrylic resin, epoxy resin, or cyclic polyolefin is preferable. A poly(meth)acrylic resin is more preferable since the resin is able to achieve both transparency and process resistance.

The first barrier layer 2002 is disposed between the first resin base 2001 and the hologram layer 2003 that will be described later. In the configuration shown in FIG. 9, the first barrier layer 2002 is in close contact with the surfaces of the first resin base 2001 and the hologram layer 2003. However, the first barrier layer 2002 does not have to be in close contact with the surfaces of both the first resin base 2001 and the hologram layer 2003, and is preferably disposed on at least the hologram layer 2003. The first barrier layer 2002 prevents the gas permeating from the outside of the light guide plate for image display 2006 and the first resin base 2001 from permeating into the hologram layer 2003.

For the first barrier layer 2002, for example, lower oxygen permeability and water vapor permeability are more preferable. In particular, the first barrier layer 2002 is more preferably made of a material having excellent steam barrier properties (low water vapor permeability) since deterioration of the hologram layer can be suppressed.

For example, the oxygen permeability of the first barrier layer 2002 may be 1 $cm^3/m^2$·day or less.

For example, the water vapor permeability of the first barrier layer 2002 may be 1 $g/m^2$ day or less. The water vapor permeability of the first barrier layer 2002 is more preferably 0.5 $g/m^2$·day or less.

The material of the first barrier layer 2002 is not particularly limited as long as the material has a property of being able to barrier a gas that causes deterioration of the hologram layer 2003. However, the material tends to be excellent in this gas barrier property and also in the sharpness of the display image. Therefore, it is preferable that the material contain an inorganic material.

In such a case, the inorganic material used for the first barrier layer 2002 may have a higher refractive index than the first resin base 2001. For example, the refractive index of the first barrier layer 2002 may be 1.48 to 3.00. When the first barrier layer 2002 has a high refractive index, the light transmitted through the first barrier layer 2002 and the first resin base 2001 is incident from the first barrier layer 2002, which is optically dense, onto the first resin base 2001 which is optically coarse. Thus, the exit angle of light from the first barrier layer 2002 to the first resin base 2001 becomes larger depending on the difference in refractive index between the first barrier layer 2002 and the first resin base 2001. As a result, the field of view (FOV) in the light guide plate for image display 2006 can be enlarged.

Examples of the material of the first barrier layer 2002 include silicon oxide, silicon nitrogen oxide, DLC, aluminum oxide and glass.

The material of the first barrier layer 2002 is as described above, but may be an oxide such as zinc oxide, antimony oxide, indium oxide, cerium oxide, calcium oxide, cadmium oxide, silver oxide, gold oxide, chromium oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide, or barium oxide.

When the first barrier layer 2002 is made of silicon oxide, the layer thickness may be 10 to 300 nm. When the layer thickness is less than 10 nm, the moisture resistance may be insufficient. When the layer thickness is greater than 300 nm, the silicon oxide thin film is likely to crack and may peel off from the film formation surface.

A particularly preferable layer thickness is 20 to 200 nm.

The method of forming the first barrier layer 2002 with the silicon oxide is not particularly limited. For example, the first barrier layer 2002 can be formed by any of conventionally known methods such as a vacuum deposition method, a sputtering method, an ion plating method and a plasma CVD method. When the first barrier layer 2002 is formed of the silicon oxide, in order to improve the adhesiveness between the film formation surface and the silicon oxide, a surface treatment may be performed. The surface treatment includes applying a corona discharge treatment or a low-temperature plasma treatment onto the film formation surface, applying a silane coupling agent on the film formation surface, or applying a mixture of a saturated polyester and an isocyanate.

For example, when a thin film of silicon oxide is formed by the vacuum deposition method, silicon, by using silicon monoxide, silicon dioxide or a mixture thereof as an evaporative substance, under a vacuum of $1.0 \times 10^{-3}$ to $1.0 \times 10^{-5}$ Torr, the evaporative substance is heated and evaporated by an electron beam, resistance heating, or high frequency heating method.

Further, a reaction vapor deposition method performed while supplying oxygen gas can also be adopted.

The silicon oxide forming the first barrier layer 2002 may contain calcium, magnesium or their oxides as impurities as long as the impurities are 10% by mass or less.

When the first barrier layer 2002 is made of silicon nitrogen oxide, the same configuration as the first barrier layer 2002 containing the silicon oxide as a main component is used, except that the silicon oxide is replaced with the silicon nitrogen oxide.

The DLC is an amorphous carbon material generally having a ternary structure of a diamond-like structure, a graphite-like structure and a polyethylene-like polymer structure containing a hydrogen atom in the structure. In the generation of the DLC, there is usually an essentially ternary structure containing hydrogen when using ethylene, a hydrocarbon acetylene or benzene as a carbon source.

The DLC is excellent in hardness, lubricity, wear resistance, chemical stability, heat resistance and surface smoothness. Since the DLC forms the above-mentioned dense polymer structure, the DLC is also excellent in a gas barrier property and a steam barrier property.

When the first barrier layer 2002 is formed by the DLC, the forming method is not particularly limited. As the DLC coating method, a well-known appropriate coating method such as a plasma CVD method or a physical vapor deposition method such as an ion plating method or an ion beam sputtering method can be used.

When the first barrier layer 2002 consists of aluminum oxide, the first barrier layer 2002 may be formed of, for example, only $Al_2O_3$, or may be formed of a mixture of two or more elements selected from the group consisting of Al, AlO and $Al_2O_3$. The atomic number ratio of Al:O in the aluminum oxide layer differs depending on the production conditions of the aluminum oxide layer. The aluminum oxide layer that can be used as the first barrier layer 2002 may contain a trace amount (up to 3% of all components) of other components as long as the barrier performance is not impaired.

The layer thickness of the aluminum oxide layer may be set in accordance with requirements of the barrier performance. For example, the layer thickness of the aluminum oxide layer may be 5 nm to 800 nm.

The method for forming the first barrier layer 2002 with the aluminum oxide is not particularly limited. For example, as a method for forming the first barrier layer 2002, a physical vapor deposition (PVD) method such as a vacuum deposition method, a sputtering method or an ion plating method, or a chemical vapor deposition (CVD) method may be used.

For example, in the vacuum deposition method, Al, $Al_2O_3$ and the like may be used as the vapor deposition source material, and resistance heating, high frequency induction heating, electron beam heating and the like may be used as the heating method of the vapor deposition source. In the vacuum deposition method, oxygen, nitrogen, water vapor or the like may be adopted as the reactive gas. Alternatively, reactive vapor deposition using means such as ozone addition or ion assist may be used. Further, the film formation surface may be biased. Alternatively, the temperature of the film formation surface may be raised. Alternatively, the film may be cooled. The same applies to film forming methods other than the sputtering method such as the PVD method, the CVD method and other vacuum deposition methods.

When the first barrier layer 2002 is made of glass, examples of the material of the first barrier layer 2002 include borosilicate glass, non-alkali glass, low alkali glass, soda lime glass, sol-gel glass, or glass of these glasses on which heat treatment or surface treatment is performed. As the material of the first barrier layer 2002, non-alkali glass is particularly preferable from the viewpoint of avoiding coloring due to impurities.

When the first barrier layer 2002 is made of glass, the layer thickness may be 10 µm to 200 µm. When the layer thickness is 10 µm or more, the gas barrier property and the mechanical strength tend to be excellent. The layer thickness is preferably 10 µm or more and more preferably 30 µm or more. Further, when the layer thickness is 200 µm or less, the optical characteristics as a light guide plate such as light transmittance tend to be excellent. The layer thickness is preferably 200 µm or less, more preferably 100 µm or less, even more preferably 75 µm or less and particularly preferably 50 µm or less.

The method of forming the first barrier layer 2002 with glass is not particularly limited. As a method of forming the first barrier layer 2002 from glass, for example, a slot down draw method, a fusion method or a float method can be adopted. Further, as the glass to be used, commercially available glass may be used as it is, or commercially available glass may be polished to a desired thickness and used. Examples of the commercially available glass include "EAGLE2000" manufactured by Corning Incorporated, "AN100" manufactured by AGC Inc., "OA10G" manufactured by Nippon Electric Glass Co., Ltd. and "D263" manufactured by Schott AG µm or more.

Further, as a part of the first barrier layer 2002, an auxiliary layer containing a fluorine-based material, a cycloolefin-based polymer, vinylidene chloride or the like can be employed, and the first barrier layer 2002 has a multilayer structure with the above-mentioned inorganic material layer. As a result, the steam barrier property can be further enhanced.

As the fluorine-based material, for example, PCTFE (polychlorotrifluoroethylene) can be used. Further, as the cycloolefin-based polymer, a cycloolefin polymer, a cycloolefin copolymer or the like can be used.

The layer thickness of this auxiliary layer may be set in accordance with requirements of the steam barrier performance. For example, when a fluorine-based material is used, the layer thickness may be 0.1 μm to 100 μm.

The hologram layer 2003 is laminated on the surface of the first barrier layer 2002. The configuration of the hologram layer 2003 is not particularly limited. An appropriate diffraction grating corresponding to the functions necessary for the light guide plate for image display 2006 is formed on the hologram layer 2003.

The second barrier layer 2004 is laminated on the surface of the hologram layer 2003 opposite to the surface of the hologram layer 2003 on which the first barrier layer 2002 is formed.

As the configuration of the second barrier layer 2004, the same configuration as given as an example in the description of the first barrier layer 2002 is used. However, the material, thickness, and the like of the second barrier layer 2004 may be different from those of the first barrier layer 2002.

The second resin base 2005 is laminated on the surface of the second barrier layer 2004 opposite to the hologram layer 2003. As the second resin base 2005, the same configuration as given as an example in the description of the first resin base 2001 is used. However, the thickness, material and the like of the second resin base 2005 may be different from those of the first resin base 2001. In particular, since the second resin base 2005 is disposed on the surface of the light guide plate for image display 2006 on the external light incident side opposite to the display image emission side. Therefore, a material of which the surface hardness is higher than that of the first resin base 2001 may be used.

Such a light guide plate for image display 2006 can be manufactured, for example, as follows.

The first resin base 2001 and the second resin base 2005 are prepared, and the first barrier layer 2002 and the second barrier layer 2004 are formed on the surfaces of the first resin base 2001 and the second resin base 2005, respectively. As a method for producing the first barrier layer 2002 and the second barrier layer 2004, an appropriate production method is selected depending on the materials of the first barrier layer 2002 and the second barrier layer 2004.

For example, a photosensitive material for hologram formation is applied to the surface of the first barrier layer 2002 in the first resin base 2001 on which the first barrier layer 2002 is formed. At this time, a transparent seal layer having the same thickness as the hologram layer 2003 may be provided on the outer peripheral portion of the first barrier layer 2002. In such a case, the photosensitive material is applied to the concave portions formed by being surrounded by the seal layer. The seal layer seals the outer peripheral portion of the hologram layer 2003 after the hologram layer 2003 is formed. For this seal layer, a material having excellent gas barrier properties such as that used for the first barrier layer 2002 can be used. Thereby, the durability of the hologram layer 2003 can be improved.

Thereafter, the second resin base 2005 on which the second barrier layer 2004 is formed is placed on the photosensitive material in a state where the second barrier layer 2004 is directed toward the photosensitive material.

However, the above-mentioned manufacturing sequence is an example. For example, after the photosensitive material is applied to the second resin base 2005 on which the second barrier layer 2004 is formed, the first resin base 2001 on which the first barrier layer 2002 is formed may be placed on the photosensitive material.

Thereafter, a laminate consisting of the first resin base 2001, the first barrier layer 2002, the photosensitive material, the second barrier layer 2004 and the second resin base 2005 is bonded by a vacuum press.

Thereafter, interference fringes corresponding to the diffraction pattern are formed on the photosensitive material of the laminate, and a diffraction grating is formed in the photosensitive material.

In such a manner, the light guide plate for image display 2006 is manufactured.

According to the light guide plate for image display 2006, the first barrier layer 2002 is disposed between the first resin base 2001 and the hologram layer 2003. In addition, the second barrier layer 2004 is disposed between the second resin base 2005 and the hologram layer 2003.

The gas barrier properties of the first resin base 2001 and the second resin base 2005 are much lower than those of glass, although the degree of gas barrier property varies depending on the type of resin material. Therefore, the first resin base 2001 and the second resin base 2005 have higher hygroscopicity and water vapor permeability than glass.

As a result, the gas outside the light guide plate for image display 2006 permeates the first resin base 2001 and the second resin base 2005 to some extent, or accumulates inside. In particular, moisture tends to accumulate in the first resin base 2001 and the second resin base 2005.

However, the gas and moisture that have permeated into the first resin base 2001 and the second resin base 2005 from the outside are blocked by the first barrier layer 2002 and the second barrier layer 2004 even when the gas and moisture diffuse in the light guide plate for image display 2006. As a result, the permeation of gas and water vapor into the hologram layer 2003 is suppressed.

For example, by suppressing the permeation of moisture into the hologram layer 2003, deterioration of the hologram layer 2003 is prevented.

Further, since the light guide plate for image display 2006 has the above-mentioned layer structure, the hologram layer 2003 is not in contact with the first resin base 2001 and the second resin base 2005. As a result, even when the light guide plate for image display 2006 is disposed in a high temperature environment, the hologram layer 2003 is prevented from eroding the first resin base 2001 and the second resin base 2005.

In particular, as described above, when the refractive indexes of the first barrier layer 2002 and the second barrier layer 2004 are higher than those of the first resin base 2001 and the second resin base 2005, the exit angle of light from the first barrier layer 2002 to the first resin base 2001 becomes large. Similarly, the exit angle of the light incident on the second barrier layer 2004 from the second resin base 2005 is narrowed. Therefore, the light incident from the outside on the side of the second resin base 2005 and transmitted through the light guide plate for image display 2006 is incident in a wider angle range than the case where the second barrier layer 2004 is not provided. Then, the light is emitted in a wider angle range as compared with the case where the first barrier layer 2002 is not provided. As a result, the range of the field of view of the external light is further enlarged, and the FOV on the display side is also enlarged.

Regarding the image light from the hologram layer 2003, as described above, as a result of increasing the exit angle of the light from the first barrier layer 2002 to the first resin base 2001, as compared with the case where the first barrier layer 2002 is not provided, the FOV of the display screen enlarges.

In particular, in the present embodiment, the first barrier layer 2002 and the second barrier layer 2004 are laminated on the hologram layer 2003. Thereby, the diffusion positions of external light and image light become closer to the diffraction position of the hologram layer 2003 constituting the display screen. Thus, a clearer image can be observed from a wide range of angles as compared with the case where the first barrier layer 2002 and the second barrier layer 2004 are provided at positions away from the hologram layer 2003.

Here, an example of a measurement method of the luminance value and the FOV in the light guide plate for image display 2006 will be briefly described.

Figure 10:
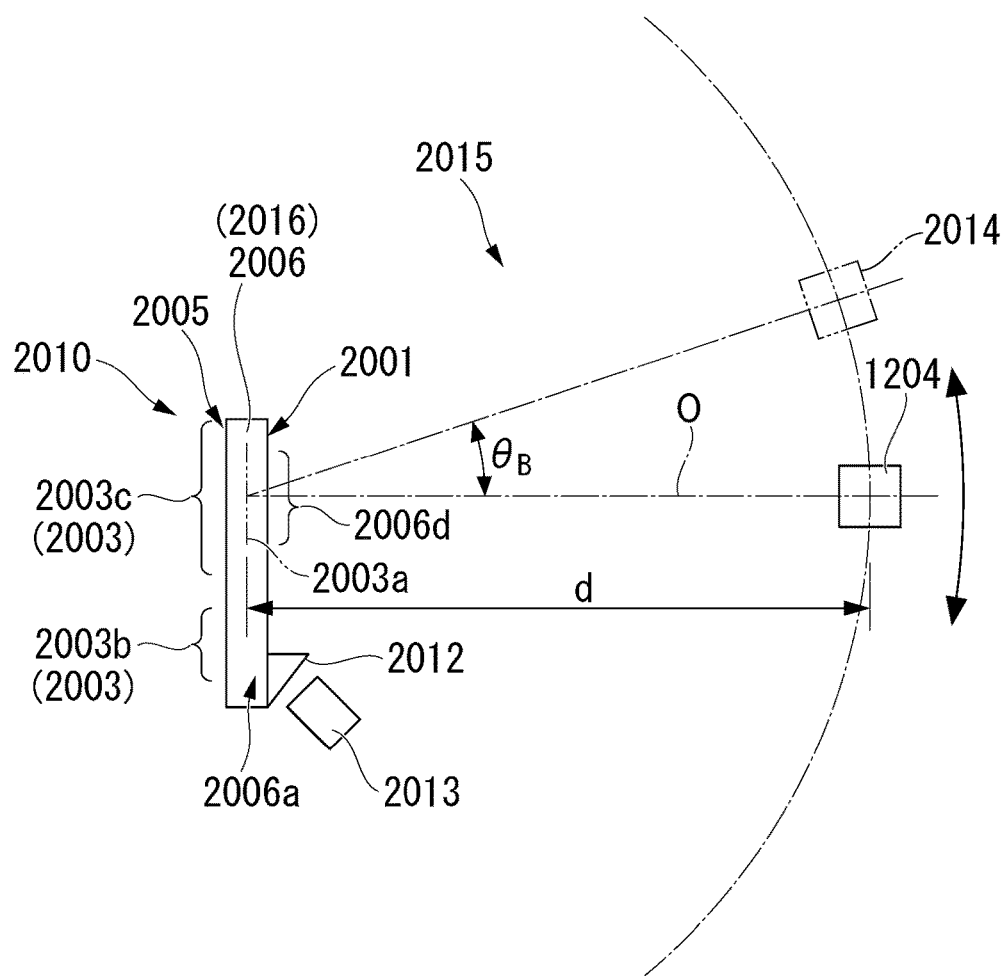
FIG. 10 is a schematic front view showing a measurement method of a luminance value and an FOV.

FIG. 10 is a schematic front view showing a measurement method of the luminance value and the FOV.

As shown in FIG. 10, in order to measure the luminance value and the FOV of the light guide plate for image display 2006, a display device 2010 is manufactured using the light guide plate for image display 2006.

The display device 2010 includes an image light projection unit 2013 and an incident optical system 2012 in addition to the light guide plate for image display 2006.

The image light projection unit 2013 projects the image light to be displayed on the light guide plate for image display 2006 in response to the image signal transmitted from the controller which is not shown.

The incident optical system 2012 includes, for example, a prism or the like. The incident optical system 2012 causes the image light emitted from the image light projection unit 2013 to be incident on the incidence portion 2006a provided on the surface of the light guide plate for image display 2006. For example, the incidence portion 2006a is provided on the surface of the first resin base 2001 side.

The image light incident on the incidence portion 2006a reaches the display diffraction grating portion 2003c of the hologram layer 2003 through the waveguide diffraction grating portion 2003b formed on the hologram layer 2003. The display diffraction grating portion 2003c diffracts the image light at a position corresponding to each display pixel. The diffracted light is emitted to the outside from the display portion 2006d on the surface of the light guide plate for image display 2006. In the example shown in FIG. 10, the display portion 2006d is formed on the surface of the first resin base 2001 side at a position separated from the incidence portion 2006a.

The luminance value and FOV of the light guide plate for image display 2006 are measured by disposing the display device 2010 in the measurement device 2015.

The measurement device 2015 includes a holding table (not shown), a luminance meter 2014, and a goniometer stage (not shown).

The holding table holds the display device 2010. The luminance meter 2014 measures the luminance value of the received light. The goniometer stage swingably supports the luminance meter 2014 on the circumference centered on the center of rotation.

The distance d between the luminance meter 2014 and the display surface 2003a is a distance corresponding to the position of the user's eyes when the display device 2010 is attached. For example, when the display device 2010 is a head-mounted display, the distanced is set to 15 mm.

The luminance value of the light guide plate for image display 2006 is measured by disposing the luminance meter 2014 at a position where the swing angle is 0° (refer to the solid line luminance meter 2014 in FIG. 10). The display device 2010 is disposed by the holding table at a position where the center of the display surface 2003a faces the luminance meter 2014 on the measurement optical axis of the luminance meter 2014.

The luminance value is the luminance measured by the luminance meter 2014 when the display device 2010 displays the white image with the maximum luminance.

In the measurement of the FOV of the light guide plate for image display 2006, the luminance is measured by changing the swing angle $\theta_B$ while displaying the white image with the maximum luminance on the display device 2010. The luminance corresponding to the invisible white image is set as a threshold value, and the angle range in which the luminance of the threshold value or more can be obtained is obtained. When the luminance equal to or higher than the threshold value is obtained in the range of $-\theta 1$ to $+\theta 2$, the FOV is $\theta 1 + \theta 2$.

The FOV of the light guide plate for image display 2006 is preferably 24° to 160°, more preferably 35° to 160°. In addition, as the FOV increases, the viewing angle of the image increases, the amount of information in the image increases, and the range of applications that can be applied increases. On the other hand, when the FOV is less than the upper limit value, the amount of light extracted for a certain area tends to increase. This configuration is preferable since the image becomes bright.

For example, the closer the first barrier layer 2002 and the second barrier layer 2004 are to the hologram layer 2003, the more the FOV can be improved by about 10° or more. The distance is preferably 1000 nm or less, more preferably 500 nm or less, and most preferably 100 nm or less.

As described above, according to the present embodiment, it is possible to provide a light guide plate for image display that can suppress deterioration of the hologram layer even when a resin base is used.

First Modification Example

A first modification example of the second embodiment of the present invention will be described.

Figure 11:
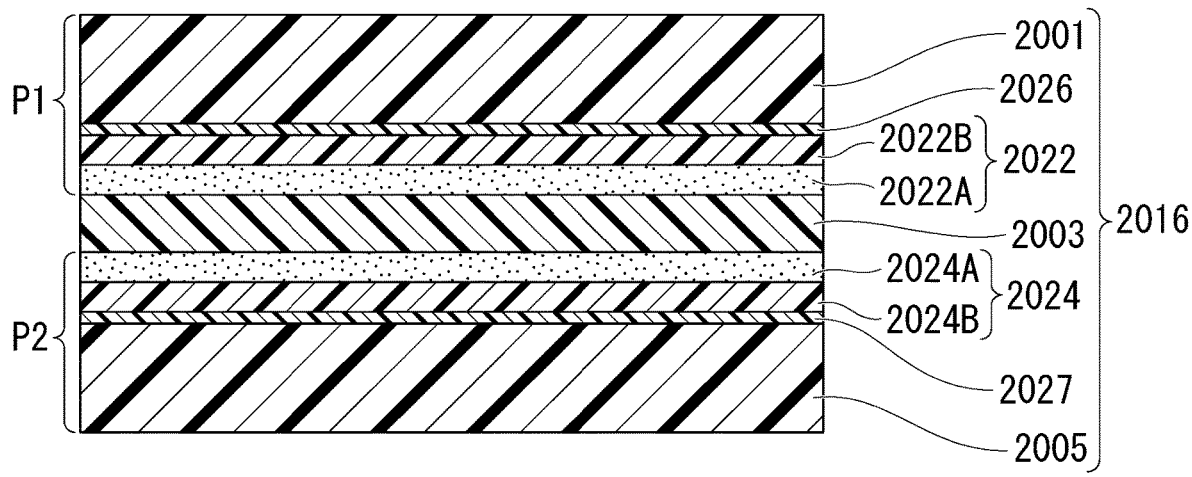
FIG. 11 is a schematic cross-sectional view showing an example of a light guide plate for image display according to a first modification example of the second embodiment of the present invention.

FIG. 11 is a schematic cross-sectional view showing an example of a light guide plate for image display according to a first modification example of the second embodiment of the present invention.

As shown in FIG. 11, the light guide plate for image display 2016 of the first modification example of the second embodiment of the present invention includes a first barrier film 2022 and a second barrier film 2024, instead of the first barrier layer 2002 and the second barrier layer 2004 of the light guide plate for image display 2006 of the basic example of the second embodiment of the present invention.

Hereinafter, the points different from the above-described embodiment will be mainly described.

The first barrier film 2022 includes a barrier layer 2022A and a resin film 2022B.

The barrier layer 2022A is configured in the same manner as the first barrier layer 2002 in the above embodiment.

The resin film 2022B is a base member on which the barrier layer 2022A is formed. The material of the resin film 2022B is not particularly limited as long as the material is a transparent resin film capable of forming the barrier layer 2022A.

For example, as the material of the resin film 2022B, a resin such as polypropylene, ABS, an amorphous polyester resin, polyimide, polyamide, polyethersulfone (PES), polycarbonate (PC), polynorbornene which is a cyclic polyolefin copolymer, a cyclic polyolefin resin, polycyclohexene, polyethylene terephthalate (PET), polyethylene naphthalate (PEN), a fluoro resin, polyarylate (PAR), polyetherketone (PEK) or polyetheretherketone (PEEK) may be used.

For example, when considering the thermal expansion coefficient, the humidity expansion coefficient and the glass transition temperature, as a more suitable material for the resin film 2022B, in the crystalline resin, there is a polyamide, polyacetal, polybutylene terephthalate, polyethylene terephthalate, syndiotactic polystyrene or the like which is a thermoplastic resin. In the thermosetting resin, there is polyphenylene sulfide, polyetheretherketone, a liquid crystal polymer, a fluoro resin, polyethernitrile or the like. For example, in the amorphous resin, there is a polycarbonate, a modified polyphenylene ether or the like which is a thermoplastic resin. In the thermosetting resin, there is polysulfone, polyether sulfone, polyarylate, polyamideimide, polyetherimide, thermoplastic polyimide or the like. Among the components, since polycarbonate has low water absorptiveness, the first barrier film 2022 configured by using polycarbonate has a low humidity expansion coefficient. Thus, this configuration is particularly preferable.

The thickness of the resin film 2022B is not particularly limited. However, it is more preferable that the resin film 2022B be thinner than the first resin base 2001. For example, the thickness of the resin film 2022B may be 1 µm to 200 µm.

As the resin film 2022B, it is more preferable to use a material having a high surface smoothness. In such a case, the smoothness of the surface of the barrier layer 2022A is improved, and the layer thickness of the barrier layer 2022A can be easily made uniform. The surface smoothness of the resin film 2022B is more preferably 2 nm or less in arithmetic average roughness Ra.

The surface of the resin film 2022B may be subjected to various surface modification treatments in order to improve the adhesion to the barrier layer 2022A and the adhesion to the first adhesive layer 2026 that will be described later. For example, the surface of the resin film 2022B may be subjected to treatments such as a corona discharge treatment, a flame treatment, an oxidation treatment, a plasma treatment, and lamination of primer layers.

Such a first barrier film 2022 is manufactured by forming a resin film 2022B on the barrier layer 2022A. Such a first barrier film 2022 is manufactured by forming a barrier layer 2022A on the resin film 2022B.

Examples of the method for forming the barrier layer 2022A include a physical vapor deposition method (PVD), a chemical vapor deposition method (CVD), a plating method, a coating method and a sol-gel method. In particular, CVD is excellent in the formation efficiency of the barrier layer 2022A. In CVD, the heat applied to the resin film 2022B during film formation is smaller than that in the physical vapor deposition method. Therefore, the deterioration of the resin film 2022B due to heating is reduced. Among CVD methods, the plasma CVD method is more preferable. In the plasma CVD method, after the raw material gas is employed into the film forming chamber, a high frequency is applied to cause a discharge to bring it into a plasma state, thereby promoting a chemical reaction on the surface of the resin film 2022B. Therefore, the temperature in the film forming process is as low as about −10° C. to 200° C., and the film can be formed even at 30° C. or lower. As a result, thermal damage is less likely to be applied to the resin film 2022B.

The barrier layer 2022A in the first barrier film 2022 is disposed on the surface of the hologram layer 2003.

The resin film 2022B in the first barrier film 2022 is fixed to the surface of the first resin base 2001 by the intervention of the first adhesive layer 2026.

The material of the first adhesive layer 2026 is not particularly limited as long as the material has favorable adhesiveness to the resin film 2022B and the first resin base 2001.

Examples of preferable materials for the first adhesive layer 2026 include a polyester-based resin, an acrylic-based resin, a urethane-based resin, a melamine-based resin, an epoxy-based resin and the like.

The second barrier film 2024 includes a barrier layer 2024A similar to the barrier layer 2022A and a resin film 2024B similar to the resin film 2022B.

However, the material, thickness and the like of the barrier layer 2024A may be the same as or different from those of the barrier layer 2022A. The material, thickness and the like of the resin film 2024B may be the same as or different from those of the resin film 2022B.

The second barrier film 2024 is fixed to the surface of the second resin base 2005 by the intervention of the second adhesive layer 2027, which is configured in the same manner as the first adhesive layer 2026.

In order to manufacture such a light guide plate for image display 2016, for example, a first barrier film 2022 and a second barrier film 2024 are prepared. Then, by adhering the first barrier film 2022 and the second barrier film 2024 to the surfaces of the first resin base 2001 and the second resin base 2005, respectively, while they are interposed between a first adhesive layer 2026 and a second adhesive layer 2027, the first intermediate laminate P1 and the second intermediate laminate P2 are formed.

Thereafter, the hologram layer 2003 is formed in the same manner as in the basic example of the second embodiment of the present invention, except that the first intermediate laminate P1 and the second intermediate laminate P2 are used instead of the first resin base 2001 and the second resin base 2005, respectively, of the basic example of the second embodiment of the present invention. As a result, the light guide plate for image display 2016 is manufactured.

According to the light guide plate for image display 2016 of the first modification example of the second embodiment of the present invention, the first resin base 2001, the barrier layer 2022A and the hologram layer 2003 are arranged in that order, and the second resin base 2005, the barrier layer 2024A and the hologram layer 2003 are arranged in that order. Therefore, as in the embodiment, the deterioration of the hologram layer 2003 is prevented by suppressing the permeation of moisture into the hologram layer 2003. Further, the hologram layer 2003 does not come into contact with the first resin base 2001 and the second resin base 2005. Thus, it is possible to prevent the first resin base 2001 and the second resin base 2005 from being eroded by the material of the hologram layer 2003.

Therefore, according to the light guide plate for image display 2016, a clear image can be displayed even when a resin base is used.

Further, when the refractive indexes of the barrier layers 2022A and 2024A are set to be higher than those of the first resin base 2001 and the second resin base 2005, the FOV of the light guide plate for image display 2016 is improved. Therefore, a clear image can be observed from a wide range of angles.

In particular, according to the first modification example of the second embodiment of the present invention, in the manufacturing process of the light guide plate for image display 2016, b adhering the first barrier film 2022 and the second barrier film 2024 to the first resin base 2001 and the second resin base 2005, the barrier layers 2022A and 2024A are disposed on the first resin base 2001 and the second resin base 2005. Therefore, even when the barrier layers 2022A and 2024A cannot be directly formed due to the type, shape, size and the like of the materials of the first resin base 2001 and the second resin base 2005, the barrier layers 2022A and 2024A can be easily disposed.

As described above, according to the first modification example of the second embodiment of the present invention, it is possible to provide a light guide plate for image display capable of suppressing deterioration of the hologram layer even when a resin base is used.

In the basic example and the first modification example of the second embodiment, the exemplary case where the barrier layer is disposed on the front and back surfaces of the hologram layer has been described. However, for the purpose of blocking the moisture or the like permeating through the resin base and for the purpose of preventing contact between the hologram layer and the resin base, the barrier layer may be disposed between the resin base and the hologram layer.

However, in such a case, when the transparent layer interposed between the barrier layer and the hologram layer has high hygroscopicity, moisture may permeate through the side surface of the transparent layer. Therefore, it is more preferable that the transparent layer between the barrier layer and the hologram layer be formed of a material having low hygroscopicity. When the transparent layer between the barrier layer and the hologram layer has hygroscopicity, it is more preferable to reduce the thickness of the transparent layer. In such a case, since the exposed area of the side surface serving as the moisture permeation port is reduced, the amount of moisture absorbed can be reduced.

Third Embodiment

When the light guide plate for image display of the present invention is used, for example, in a glasses-type display, for the purpose of preventing deterioration in optical characteristics due to scratches on the surface thereof, on a surface opposite to the side where the hologram layer of the resin base is located, a hard coat film can be detachably attached from this base.

Basic Example

Hereinafter, a third embodiment of the light guide plate for image display of the present invention will be described.

Figure 14:
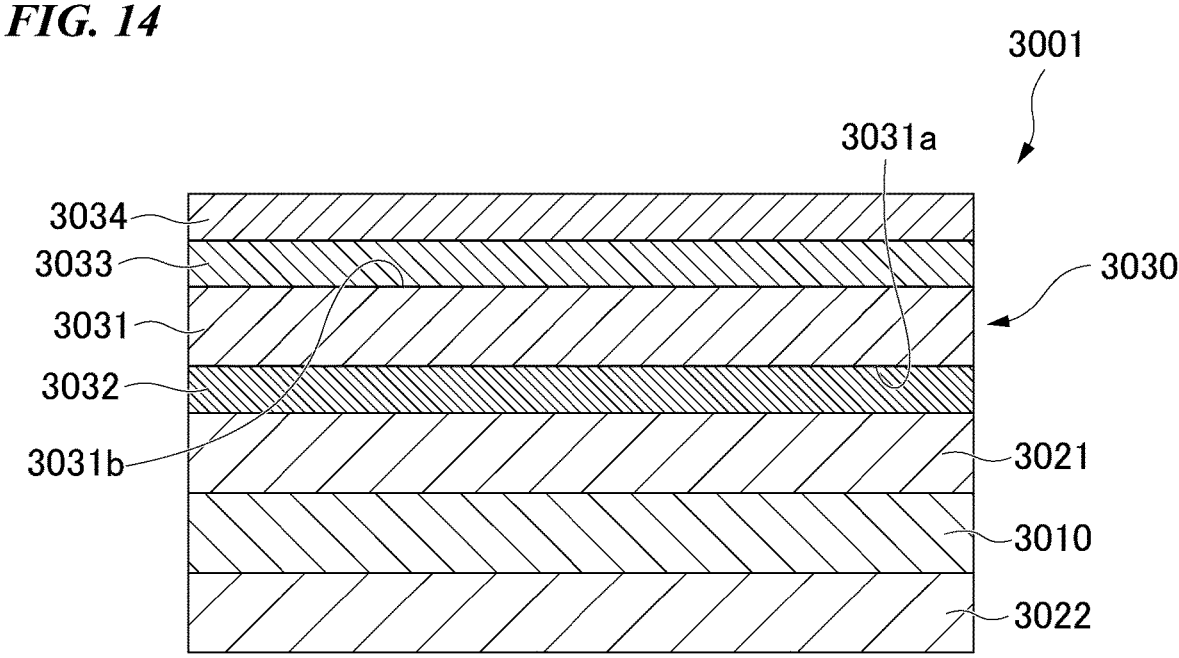
FIG. 14 is a schematic diagram showing a layer structure of a light guide plate for image display according to a third embodiment of the present invention.

FIG. 14 shows the layer structure of a light guide plate for image display (hereinafter, simply referred to as "light guide plate") 3001 according to the third embodiment of the present invention.

As shown in FIG. 14, the light guide plate 3001 includes a hologram layer 3010, two bases of a first substrate 3021 and a second substrate 3022 sandwiching the hologram layer 3010 in the thickness direction and a hard coat film 3030 provided on the first substrate 3021.

The first substrate 3021 and the second substrate 3022 are sheet-shaped resin bases having light transmittance. As the material of the first substrate 3021 and the second substrate 3022, the same material as the resin base used in the first embodiment and the second embodiment described above can be employed. However, in terms of transparency and the like, acryl is suitable. The thickness of the first substrate 3021 and the second substrate 3022 can be, for example, about 1 mm.

As the hologram layer 3010, a known configuration can be appropriately selected and used as in the first embodiment and the second embodiment described above. The optical structure of the diffraction grating or the like may be appropriately determined in consideration of the wavelength of the light to be guided and the like.

The hard coat film 3030 has a film base 3031, an adhesive layer 3032, a hard coat layer 3033, and a release layer 3034. The adhesive layer 3032 is provided on the first surface 3031a of the film base 3031. The hard coat layer 3033 is provided on the second surface 3031b opposite to the first surface 3031a in the film base 3031. The release layer 3034 is provided on the hard coat layer 3033.

The hard coat film 3030 is detachably attached from the first substrate 3021 by the adhesive layer 3032 adhering to the first substrate 3021.

Hereinafter, each portion of the hard coat film 3030 will be described in detail.
(Film Base 3031)

As the film base 3031, films or sheets made of various organic polymers can be used. For example, a base usually used for an optical member such as a display may be used. In consideration of optical characteristics such as transparency and light refractive index and various characteristics such as impact resistance, heat resistance and durability, the materials of the base consist of polyolefins such as polyethylene and polypropylene, cyclic polyolefins, polyesters such as polyethylene terephthalate and polyethylene naphthalate, celluloses such as triacetyl cellulose, diacetyl cellulose and cellophane, polyamides such as 6-nylon and 6,6-nylon, acryls such as polymethylmethacrylate, and organic polymers such as polystyrene, polyvinyl chloride, polyimide, polyvinyl alcohol, polycarbonate and ethylene vinyl alcohol. In particular, polyethylene terephthalate (PET), polycarbonate (PC) and polymethylmethacrylate (PMMA) are preferable as materials.

Furthermore, the film base 3031, which is given an additional function by adding known additives such as ultraviolet absorbers, infrared absorbers, plasticizing agents, lubricants, colorants, antioxidants, flame retardants and the like to these organic polymers, can also be used. Further, the film base 3031 may be made of one kind or a mixture of two or more kinds selected from the above-mentioned organic polymers or a polymer, or may be one in which a plurality of layers are laminated.

The film base 3031 preferably has low birefringence and favorable transparency. The thickness of the first substrate 3021 and the second substrate 3022 is preferably in the range of 5 μm to 200 μm.
(Adhesive Layer 3032)

The adhesive layer 3032 joins the film base 3031 to the first substrate 3021 so that it is peelable with a small force. The adhesive layer 3032 is joined to the surface of the first substrate 3021 opposite to the surface facing the hologram layer 3010.

The adhesive layer 3032 can be formed of, for example, an adhesive such as a rubber-based adhesive, a polyester-based adhesive, an epoxy-based adhesive, an acrylic-based adhesive, a silicone-based adhesive, a urethane-based adhesive, a vinyl alkyl ether-based adhesive, a polyvinyl alcohol-based adhesive, a polyacrylamide-based adhesive or a cellulose-based adhesive. Among these, an ultraviolet curable type or a thermosetting type acrylic-based adhesive is preferable in terms of optical characteristics such as transparency.

Examples of the acrylic-based adhesive include an adhesive formed of an adhesive composition (hereinafter referred to as "the present adhesive composition") using a (meth) acrylate ester-based polymer (hereinafter referred to as "acrylate ester-based (co)polymer" since the adhesive contains a copolymer) as a base resin.

The acrylate ester-based (co)polymer as the base resin can be prepared by appropriately selecting the type, the composition ratio, the polymerization conditions and the like of the acrylic monomer or methacrylic monomer used for polymerizing the polymer and appropriately adjusting physical properties such as a glass transition temperature (Tg) and a molecular weight.

Examples of the acrylic monomer or methacrylic monomer used for polymerizing the acrylate ester (co)polymer include 2-ethylhexyl acrylate, n-octyl acrylate, isooctyl acrylate, n-butyl acrylate, ethyl acrylate, methyl methacrylate, methyl acrylate and the like. Further, an acrylic monomer having a hydrophilic group, an organic functional group or the like may be copolymerized with the acrylic monomer. The hydrophilic group includes hydroxyethyl acrylate, acrylate, glycidyl acrylate, acrylamide, acrylonitrile, methacrylonitrile, fluorine acrylate, silicone acrylate or the like. In addition, various vinyl monomers such as vinyl acetate, alkyl vinyl ether and hydroxyalkyl vinyl ether can also be appropriately used for polymerization.

As the polymerization treatment using these monomers, known polymerization methods such as solution polymerization, emulsification polymerization, massive polymerization and suspension polymerization can be adopted. At that time, by using a polymerization initiator such as a thermal polymerization initiator or photopolymerization initiator depending on the polymerization method, an acrylate ester copolymer can be obtained.

The thickness of the adhesive layer 3032 is preferably in the range of 1 μm to 50 μm and more preferably in the range of 1 μm to 30 μm.

As a method for forming the adhesive layer on the film base 3031, conventionally known coating methods such as reverse gravure coating, direct gravure coating, roll coating, die coating, bar coating and curtain coating can be used. Regarding the coating method, there is a description example in "Coating method" (Maki Shoten, Yuji Harasaki, published in 1979).

The method for drying the adhesive is not particularly limited, but it is generally preferable to dry the adhesive at 30° C. to 160° C. Further, as a method for curing the adhesive, a known method may be appropriately selected depending on the composition of the adhesive and the like. For example, when the adhesive is an active energy ray-curable type, the adhesive may be cured by being irradiated with active energy rays (visible light, ultraviolet rays, X-rays and γ-rays). At this time, the irradiation amount of the active energy rays may be appropriately adjusted in accordance with the characteristics of the adhesive, but it is generally preferable to perform the irradiation in a range of 10 mJ/m$^2$ to 10000 mJ/m$^2$.

From the viewpoint of making the hard coat film easily peelable, it is preferable that the peel strength of the adhesive layer 3032 be 0.01 N to 50 N/20 mm width when the peeling in the 180 degree direction is measured (peeling speed 50 mm/min).

(Hard Coat Layer 3033)

The hard coat layer 3033 has sufficient hardness to prevent damage due to contact with other structures or the like. When such hardness is shown by the pencil hardness (load 750 g) specified in JIS K 5600-5-4: 1999, the hardness is generally H or more. Therefore, the pencil hardness of the hard coat layer is preferably H or higher and more preferably 2H or higher.

The hard coat layer 3033 can be formed by a cured product formed by using various hard coating agents. For example, the hard coat layer 3033 can be formed by using a hard coating agent containing an active energy ray-curable composition and a thermosetting composition.

The hard coating agent may be an organic/inorganic hybrid material.

A polymerizable monomer or a polymerizable oligomer that forms a cured product by irradiation with active energy rays can also be used as a material for the hard coat layer 3033. Examples of the polymerizable monomer include (meth)acrylate monomers having a radically polymerizable unsaturated group in the molecule. Examples of the polymerizable oligomer include (meth)acrylate oligomers having a radically polymerizable unsaturated group in the molecule.

Examples of the (meth)acrylate monomer having a radically polymerizable unsaturated group in the molecule include at least one monomer selected from the group consisting of urethane(meth)acrylate, polyester(meth)acrylate, epoxy(meth)acrylate, melamine(meth)acrylate, polyfluoroalkyl(meth)acrylates and silicone(meth)acrylates.

Examples of the (meth)acrylate oligomer having a radically polymerizable unsaturated group in the molecule include oligomers containing constituent units derived from at least one monomer selected from the group consisting of urethane(meth)acrylate, polyester(meth)acrylate, epoxy (meth)acrylate, melamine(meth)acrylate, polyfluoroalkyl (meth)acrylates and silicone(meth)acrylates. The polymerizable monomer or the polymerizable oligomer may be used in a combination of two or more. Among these, urethane (meth)acrylate monomers or oligomers are preferable because of their high surface hardness and the like.

Examples of the urethane(meth)acrylate include a urethane(meth)acrylate obtained by reacting a polyisocyanate compound and a (meth)acrylate compound having one hydroxyl group in the molecular structure and a urethane (meth)acrylate obtained by reacting the polyisocyanate compound, a (meth)acrylate compound having one hydroxyl group in the molecular structure and a polyol compound.

The hard coat layer 3033 may contain a cured product of a polyfunctional(meth)acrylate.

Examples of the polyfunctional(meth)acrylate include trimethylolpropane tri(meth)acrylate, tripropyleneglycol di(meth)acrylate, diethyleneglycol di(meth)acrylate, dipropyleneglycol di(meth)acrylate, pentaerythritol tri(meth)acrylate, pentaerythritol tetra(meth)acrylate, dipentaerythritol hexa(meth)acrylate, 1,6-hexanediol di(meth)acrylate, neopentylglycol di(meth)acrylate, trimethylolpropane tri (meth)acrylate, ditrimethylolpropane tetra(meth)acrylate, dipentaerythritol penta(meth)acrylate, tripentaerythritol octa (meth)acrylate, tetrapentaerythritol deca(meth)acrylate, isocyanurate tri(meth)acrylate, isocyanurate di(meth)acrylate, polyester tri(meth)acrylate, polyester di(meth)acrylate, bisphenol di(meth)acrylate, diglycerin tetra(meth)acrylate, adamanthyl di(meth)acrylate, isobolonyl di(meth)acrylate, dicyclopentane di(meth)acrylate, tricyclodecan di(meth) acrylate and ditrimethylolpropane tetra(meth)acrylate. Alternatively, the examples include PO, EO and caprolactone obtained by modifying the components.

Among the components, polyfunctional(meth)acrylates having 3 to 6 functionalities are suitable since the acrylates appropriately satisfy the surface hardness. Specific examples thereof include pentaerythritol triacrylate (PETA), dipentaerythritol hexaacrylate (DPHA), pentaerythritol tetraacrylate (PETTA), dipentaerythritol pentaacrylate (DPPA), trimethylolpropane tri(meth)acrylate, tripentaerythritol octa (meth)acrylate and tetrapentaerythritol deca(meth)acrylate.

In forming the hard coat layer 3033, a cross-linking agent, a polymerization initiator, a lubricant, a plasticizing agent, an organic particle, an inorganic particle, an antifouling agent, an additive such as an antioxidant or a catalyst or silicone-based or fluorine-based additives for preventing stains and adhesion may be added to the hard coating agent as long as the physical properties are not impaired.

If necessary, the hard coating agent may contain a solvent. Examples of the solvent include alcohols (methanol, ethanol, propanol, isopropanol, n-butanol, s-butanol, t-butanol, benzyl alcohol, PGME, ethyleneglycol and diacetone alcohol); ketones (acetone, methyl ethyl ketone, methyl isobutyl ketone, cyclopentanone, cyclohexanone, heptanone, diisobutylketone, diethylketone and diacetone alcohol); esters (methyl acetate, ethyl acetate, butyl acetate, n-propyl acetate, isopropyl acetate, methyl formate and PGMEA); aliphatic hydrocarbons (hexane and cyclohexane); halogenated hydrocarbons (methylene chloride, chloroform and carbon tetrachloride); aromatic hydrocarbons (benzene, toluene and xylene); amides (dimethylformamide, dimethylacetamide and n-methylpyrrolidone); ethers (diethyl ether, dioxane and tetrahydrofuran); ether alcohols (1-methoxy-2-propanol); carbonates (dimethyl carbonate, diethyl carbonate and ethyl methyl carbonate); and the like. These solvents may be used alone or in a combination of two or more.

The thickness of the hard coat layer 3033 is preferably 1 μm to 50 μm, more preferably 2 μm to 40 μm, and even more preferably 3 μm to 25 μm. When the thickness of the hard coat layer 3033 satisfies this range, scratches on the first substrate 3021 can be effectively prevented, and scratches on the hard coat film 3030 itself can be suppressed. Further, when the hard coat layer 3033 is formed, occurrence of warpage of the hard coat film due to the curing shrinkage of the hard coating agent is suppressed.

The procedure for providing the hard coat layer 3033 on the film base 3031 can be substantially the same as the procedure for providing the adhesive layer 3032. As for the coating method, the drying method and the curing method, the various methods mentioned above can be used.

(Release Layer 3034)

The release layer 3034 easily peels off the adhesive layer of the overlapping hard coat films when the hard coat film is rolled into a roll during manufacturing or storage.

The release layer 3034 can be formed by applying and drying a coating material, which is dissolved in an organic solvent or water, through a usual printing method such as a gravure printing method, a screen printing method, or an offset printing method. The organic solvent includes, as a main component, one or a combination of surfactants and resins such as a silicone resin, a fluoro resin, an aminoalkyd resin, a polyester resin, paraffin wax, an acrylic resin, a urethane resin, a melamine resin, a urea resin, urea-melamine, cellulose and benzoguanamine. A curable coating film such as a thermosetting resin, an ultraviolet curable resin, an electron beam curable resin and a radiation curable resin can be formed by curing.

In particular, it is preferable to perform a peeling treatment with a silicone, a fluorine compound, an alkyd resin-based peeling treatment agent or the like.

Since the hard coat film 3030 affects the visibility of the surrounding real image viewed through the light guide plate 3001 and the image displayed on the light guide plate, it is preferable that the hard coat film 3030 have predetermined optical characteristics. As an example, when sandwiched between soda lime glass having a thickness of 0.5 mm, the following (A) is preferably satisfied, and the following (B) and (C) are more preferable.

(A) The retardation value is within the range of 0 nm to 100 nm.
(B) Total light transmittance measured in accordance with JIS K 7361-1: 1997 is 85% or more.
(C) The haze value measured in accordance with JIS K 7136: 2000 is 5% or less.

In the light guide plate 3001 of the third embodiment of the present invention, the hard coat film 3030 attached to the first substrate 3021 prevents the first substrate 3021 from being damaged. As a result, the optical characteristics of the first substrate 3021 are suitably maintained. Since the hard coat film 3030 includes the hard coat layer 3033, it is not easily damaged by itself. Further, the adhesive layer 3032 is releasably adhered to the first substrate 3021. Therefore, when the hard coat film 3030 is damaged, the damaged hard coat film can be easily peeled off from the first substrate 3021 and can be replaced with a hard coat film which is not damaged. Thereby, it is possible to prevent the sharpness of the light guide plate from deteriorating.

First Modification Example

A first modification example of the third embodiment of the present invention will be described. In the following description, the same reference numerals will be given to the configurations common to those already described, and repeated description will not be Given.

Figure 15:
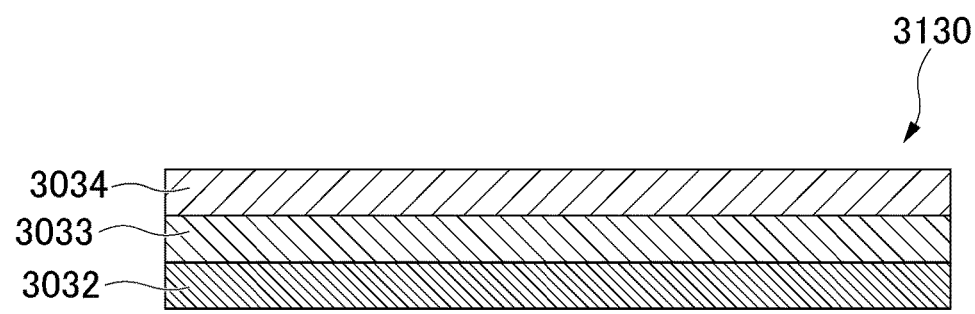
FIG. 15 is a schematic diagram showing a layer structure of a light guide plate for image display according to a first modification example of the third embodiment of the present invention.

FIG. 15 shows a hard coat film 3130 according to a first modification example of the third embodiment of the present invention.

The hard coat film 3130 includes an adhesive layer 3032, a hard coat layer 3033 and a release layer 3034. The hard coat film 3130 according to the first modification example of the third embodiment of the present invention is different from the hard coat film 3030 according to the above-mentioned basic example in that the film base 3031 is not provided.

An example of the manufacturing procedure of the hard coat film 3130 is shown below.

A coating material serving as a release layer 3034 and a hard coating agent serving as a hard coat layer 3033 are sequentially applied on the release treatment surface of the resin film subjected to the release treatment. The release layer 3034 and the hard coat layer 3033 are formed on the resin film. Next, the adhesive composition serving as the adhesive layer 3032 is applied onto the hard coat layer 3033 so that the adhesive layer 3032 is formed. Finally, when the resin film is peeled off, the hard coat film 3130 is completed.

As another configuration, the hard coat layer 3033 and the adhesive layer 3032 may be formed on the non-treated surface of the resin film whose one side has been subjected to the mold release treatment by the above procedure. Thereby, the resin film may be used as the release layer 3034.

The usage mode and function of the hard coat film 3130 of the first modification example of the third embodiment of the present invention are substantially the same as those of the hard coat film 3030 of the above-mentioned basic example. Thus, the same effect is obtained. In addition, since the film is laminated on the light guide plate, there is an effect of preventing the fragments from scattering when the light guide plate is damaged.

<Plurality of Stacked Hard Coat Films>

Figure 16:
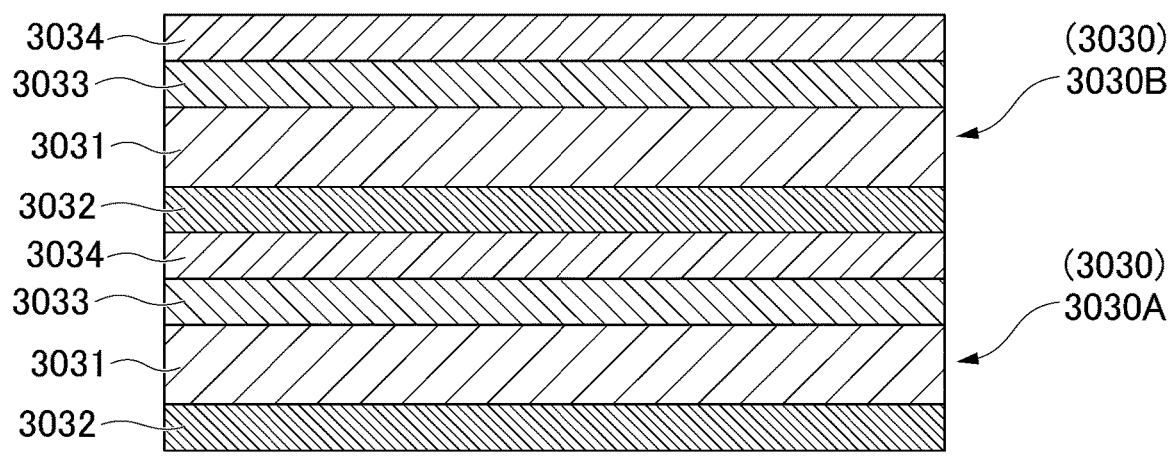
FIG. 16 is a diagram showing a state in which two hard coat films according to the third embodiment are stacked.
Figure 17:
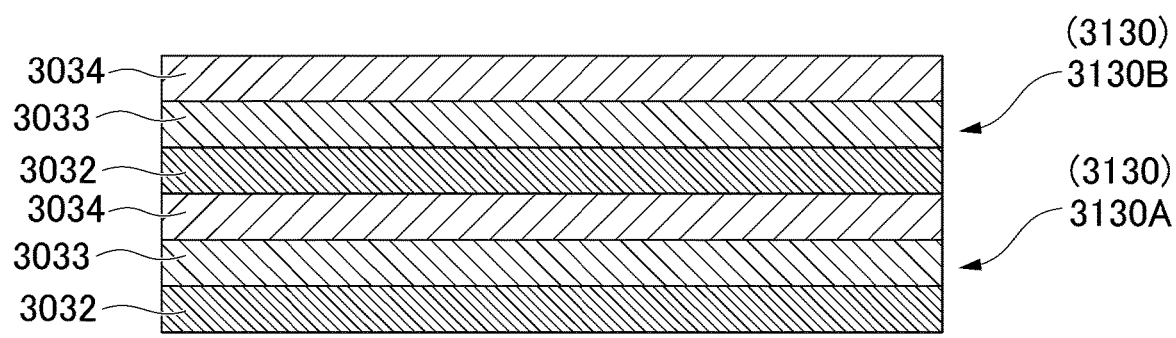
FIG. 17 is a diagram showing a state in which two hard coat films according to the first modification example of the third embodiment are stacked.

The hard coat films of the above-mentioned basic example and modification example may be attached to the first substrate 3021 in a state where a plurality of hard coat films are stacked. The two-layered hard coat film 3030 is shown in FIG. 16. The two-layered hard coat film 3130 is shown in FIG. 17. In either case, the release layer 3034 is present at the contact portion between the two stacked hard coat films. Therefore, the second hard coat films 3030B and 3130B located on the upper side can be easily peeled off from the first hard coat films 3030A and 3130A which are located on the lower side.

When the hard coat film has such a structure, the hard coat film located on the outermost surface is simply peeled off when the hard coat film is damaged. As a result, an undamaged hard coat film under the damaged hard coat film becomes a new outermost surface. Therefore, it is not necessary to attach another hard coat film after removing the damaged hard coat film. In addition, the surface state of the light guide plate can be easily maintained.

In this configuration, the number of hard coat films to be stacked is not limited to the two shown in the figure, and may be three or more.

There is no particular limitation on the method of obtaining a hard coat film in a state where a plurality of sheets are stacked. For example, a method of sticking another hard coat film to one hard coat film, or a method of winding the hard coat film into a roll and then cutting the hard coat film out can be adopted.

Further, a method of forming layers corresponding to a plurality of hard coat films at one time can also be adopted. In such a case, known methods can be applied. Examples of the known methods include: a method in which all the continuously laminated layers are laminated in an uncured state and then cured with active energy rays; a method in which the lower layer is cured or semi-cured with active energy rays and then the upper layer is applied and cured with the active energy rays again; and a method in which each layer is applied on a release film or a base film and then the layers are bonded together in an uncured or semi-cured state. However, from the viewpoint of increasing the amount of energy, a method of laminating in an uncured state and then curing with active energy rays is preferable. As the method of laminating in an uncured state, it is possible to adopt a known method such as sequential coating, in which the lower layer is applied and then the upper layer is stacked and applied thereon, or simultaneous multi-layer coating in which two or more layers are simultaneously stacked and applied thereon through multiple slits. However, the method is not limited to this.

Fourth Embodiment

In the light guide plate for image display of the present invention, the hologram layer may turn yellow during its manufacture and long-term use, which may adversely affect the display image. However, by employing an absorption layer having an absorption peak in the wavelength range of 500 nm to 600 nm, this can be reduced without deteriorating the hologram layer.

Basic Example

Hereinafter, a fourth embodiment of the light guide plate for image display of the present invention will be described.

The light guide plate for image display according to the fourth embodiment of the present invention has a first resin base, a hologram layer and a first absorption layer. It is preferable that the first absorption layer, the first resin base and the hologram layer be arranged in that order in the thickness direction.

The light guide plate for image display of the fourth embodiment of the present invention may further have a second resin base. In such a case, it is preferable that the first absorption layer, the first resin base, the hologram layer and the second resin base be laminated in that order in the thickness direction.

In the fourth embodiment of the present invention, the first resin base and the second resin base may be collectively referred to as "resin base". Further, in the present embodiment, the first absorption layer and the second absorption layer may be generically referred to simply as "absorption layer".

The light guide plate for image display according to the fourth embodiment of the present invention may further have an appropriate transparent layer. Examples of the transparent layer include a barrier layer, an adhesive layer, a hard coat layer, and an anchor coat layer.

The light guide plate for image display according to the fourth embodiment of the present invention may further have a glass base.

The light guide plate for image display has an incidence portion that on which image light is incident and a display image emission portion that displays an image formed by the image light. The hologram layer is disposed between the incidence portion and the display image emission portion. A diffraction grating pattern for waveguiding at least the image light incident from the incidence portion to the display image emission portion and emitting the image light from the display image emission portion is formed on the hologram layer. The diffraction grating pattern in the display image emission portion transmits at least a part of the external light incident from the outside of the light guide plate for image display. The external light incidence portion is a surface opposite to the display image emission portion.

The image light incident on the incidence portion is guided into the hologram layer and emitted to the outside from the display image emission portion. On the other hand, as a result of the external light also passing through the resin base and the display image emission portion, the observer of the display image emission portion can observe both the image light and the external light in the field of view.

The light guide plate for image display according to the fourth embodiment of the present invention is suitably used for a display device using VR technology, AR technology or MR technology. For example, the light guide plate for image display according to the fourth embodiment of the present invention may be used in a device such as a hologram optical element (HOE) which is represented by a combiner of a head-up display (HUD) mounted on an automobile or a reflector for a reflective liquid crystal display device, in addition to display applications.

The material of the resin base is not particularly limited as long as the material is a transparent material.

As the material used for the resin base, one appropriately selected from those used in the above-mentioned first to third embodiments can be used. The material used for the resin base preferably contains at least one resin selected from the group consisting of an acrylic resin, a cyclic polyolefin resin and a polycarbonate resin.

In the light guide plate for image display according to the fourth embodiment of the present invention, when the resin base consists of two sheets including the first resin base and the second resin base, the hologram layer may be disposed between the first resin base and the second resin base.

In the light guide plate for image display of the fourth embodiment of the present invention, when the light guide plate for image display contains a first resin base and a glass base, the hologram layer may be disposed between the first resin base and the glass base.

The resin base and the hologram layer or the glass base and the hologram layer may be in contact with each other. Alternatively, an appropriate transparent layer may be disposed therebetween.

The hologram layer is sandwiched between the first resin base and the second resin base, or between the first resin base and the glass base.

As the hologram layer, a known resin material for hologram formation is used as in the case of the first to third embodiments described above. Examples of the resin material for hologram formation include hologram recording materials (Japanese Unexamined Patent Application, First Publication Nos. H08-1676, H08-1677, H08-1678 and H08-1679). The hologram recording materials each consist of a thermosetting resin, which has at least one solvent-soluble and cationically polymerizable ethylene oxide ring in constituent units and a radically polymerizable ethylenic monomer.

The absorption layer has a wavelength characteristic of absorbing a yellow component in light transmitted through at least a part of a light guide plate for image display.
(Absorption Peak)

The absorption layer has an absorption peak in a wavelength range of 500 nm to 600 nm (which may be referred to hereinafter as "wavelength range A").

Here, the term "absorption peak" represents spectral distribution, in which the minimum value is smallest, in the U-shaped spectral distribution in which the transmittance in the spectral transmittance curve of the absorption layer in the visible light region (400 nm to 800 nm) changes from a decrease to an increase through a minimum value. It is more preferable that the U-shaped spectral distribution be formed at one location in the visible light region.

In the present specification, the fact that the wavelength that gives the minimum value (peak top) of such an "absorption peak" is in a specific wavelength range is defined as "having an absorption peak in a specific wavelength range".

It is more preferable that the absorption peak be in the wavelength range of 550 nm to 585 nm (which may be referred to hereinafter as "wavelength range B").

The half width of the absorption peak is preferably 100 nm or less, more preferably 70 nm or less and particularly preferably 40 nm or less.

Here, the half width of the absorption peak means the wavelength width of the absorption peak at which the transmittance is $Th=(100-Tp)/2$ or less when the transmittance of the peak top of the absorption peak is Tp (%).

When the half width is 100 nm or less, the color balance and luminance of the transmitted light can be satisfactorily ensured.

The transmittance at the absorption peak is preferably 80% or less, more preferably 70% or less and particularly preferably 60% or less.
(Transmittance Characteristics)

The average transmittance of the absorption layer in the wavelength range of 590 nm to 700 nm (which may be referred to hereinafter as "wavelength range C") is preferably 20% or more, more preferably 50% or more and even more preferably 70% or more.

The reason why the average transmittance is 20% or more in the wavelength range C is to maintain the luminance of red light.

The average transmittance of the absorption layer in the wavelength range of 470 nm to 550 nm (which may be referred to hereinafter as "wavelength range D") is preferably 20% or more, more preferably 50% or more and even more preferably 70% or more.

The reason why the average transmittance is 20% or more in the wavelength range D is to ensure the color balance and the luminance of the transmitted light.

Among the transmittance characteristics of the absorption layer, lower transmittance of ultraviolet light, which easily causes photodegradation, is preferable. For example, the transmittance of the absorption layer in the wavelength range of 380 nm or less is preferably 5% or less, more preferably 3% or less and even more preferably 1% or less.
(Yellowness)

The Y1 value (JIS K 7373: 2006) representing the yellowness of the absorption layer is preferably 10 or less, more preferably 5 or less and particularly preferably 3 or less.
(Absorbance)

The absorbance of the absorption layer at a wavelength of 580 nm is preferably 0.5 or less, more preferably 0.3 or less and particularly preferably 0.2 or less.
(b* in L* a* b* Color System)

The b* of the absorption layer is preferably 5 or less, more preferably 3 or less and particularly preferably 1 or less.

The configuration of the absorption layer is not particularly limited as long as the absorption layer has an absorption peak in the wavelength range A.

For example, the absorption layer may have a structure in which a coloring material is dispersed in a transparent base resin.

The material of the base resin is not particularly limited as long as the material is transparent. The refractive index of the base resin is also not particularly limited.

For example, the base resin may have a refractive index equal to or higher than the refractive index of the resin base, or may have a refractive index lower than the refractive index of the resin base.

For example, as the base resin, a resin material having a surface hardness higher than that of the resin base may be used.

For example, as the base resin, a resin material having low hygroscopicity may be used.

The coloring material is not particularly limited as long as the above-mentioned wavelength characteristics can be obtained. For example, as the coloring material, dyes, pigments and the like are used. As the coloring material, it is particularly preferable to use a bluing agent.

For example, the absorption layer may be formed of a multilayer thin film in which a plurality of high refractive index materials and low refractive index materials are laminated.
(Bluing Agent)

The bluing agent used for the absorption layer is not particularly limited, but generally an anthraquinone dye is easily available and is more preferable.

The typical examples of Specific bluing agents include, for example, the generic name Solvent Violet 13 [CA. No (color index No) 60725], generic name Solvent Violet 31 [CA. No 68210], generic name Solvent Violet 33 [CA. No 60725], generic name Solvent Blue 94 [CA. No 61500], generic name Solvent Violet 36 [CA. No 68210], generic name Solvent Blue 97 [Bayer's "Macrolex Violet RR"], generic name Solvent Blue 45 [CA. No 61110] and the like. These bluing agents may be used alone or in a combination of two or more. These bluing agents are blended with the base resin in an appropriate amount to obtain the optical characteristics necessary for the absorption layer. For example, when the base resin is a polycarbonate resin, it may be blended in a ratio of $0.1 \times 10^{-5}$ to $2 \times 10^{-4}$ parts by mass with respect to 100 parts by mass of the polycarbonate resin.

Examples of other bluing agents include Diaresin (registered trademark) Blue N (trademark: manufactured by Mitsubishi Chemical Corporation), Diaresin (registered trademark) Blue G (trademark: manufactured by Mitsubishi Chemical Corporation) and Macrolex (registered trademark), Blue RR (trademark; manufactured by Bayer Corp.), Macrolex (registered trademark) Blue 3R (trademark; manufactured by Bayer Corp.), Polysynthlen (registered trademark), Blue RLS (trademark; manufactured by Clariant Corp.) and the like.

The absorption layer is provided at least in a range through which image light and external light are transmitted. For example, the absorption layer may be disposed in an area that overlaps with the display image emission portion of the hologram layer in the thickness direction.

However, the absorption layer may be disposed in an area that covers the entire resin base or hologram layer when viewed from the thickness direction.

The placement of the absorption layer in the thickness direction of the light guide plate for image display is not particularly limited.

For example, the absorption layer may be provided at at least one of a position closer to the incident surface of the external light than the hologram layer and a position closer to the emission surface of the image light than the hologram layer.

When the absorption layer is disposed outside the resin base, the absorption layer, the resin base and the hologram layer may be arranged in that order in the thickness direction of the light guide plate for image display. That is, the absorption layer may be disposed outside the resin base in the thickness direction. For example, the absorption layer may be disposed on the outermost portion in the thickness direction of the light guide plate for image display.

When the coloring material is dispersed inside the resin base to form an absorption layer, the coloring material may be uniformly dispersed in the resin base or may be unevenly dispersed in the thickness direction. When the coloring material is biased in the thickness direction, it is more preferable that the coloring material be biased to the outside in the thickness direction of the light guide plate for image display.

As the barrier layer, the same material as in the second embodiment described above can be adopted, and it is preferable that the barrier layer be made of a transparent inorganic material. Further, the refractive index of the barrier layer is more preferably 1.48 or more.

As the material of the barrier layer, it is more preferable to use a steam barrier material. The barrier layer more preferably contains one or more substances selected from the group consisting of silicon oxides, silicon nitrogen oxides and diamond-like carbon (DLC).

The barrier layer may be disposed on the resin film. In such a case, it is more preferable that the resin film be disposed between the barrier layer and the resin base.

It is more preferable that the barrier layer be disposed in the order of the resin base, the barrier layer, and the hologram layer in the thickness direction of the light guide plate for image display. It is particularly preferable that the barrier layer be disposed on the surface of the hologram layer.

Two barrier layers may be provided with the hologram layer interposed therebetween. It is more preferable that the barrier layer be disposed on the front surface and the back surface of the hologram layer.

When the glass base is disposed, since the glass base itself has a barrier property, the glass base may be disposed on the surface of the hologram layer opposite to the surface facing the barrier layer.

Figure 18:
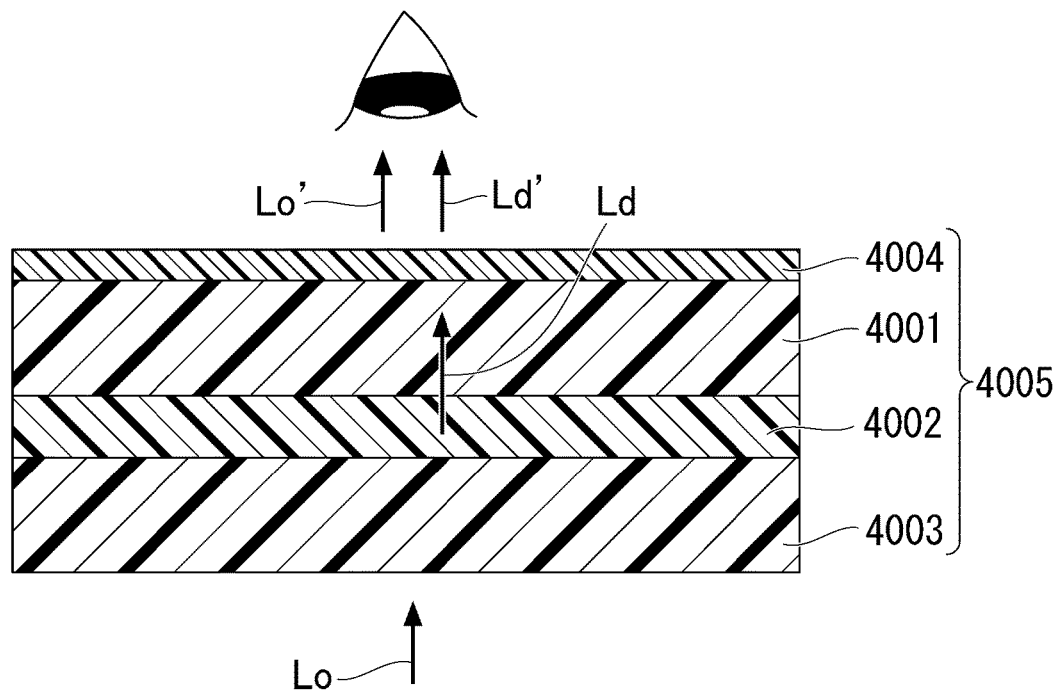
FIG. 18 is a schematic cross-sectional view showing an example of a light guide plate for image display according to a fourth embodiment of the present invention.

Hereinafter, a detailed configuration of an example of a light guide plate for image display according to a fourth embodiment of the present invention will be described based on the example shown in FIG. 18. FIG. 18 is a schematic cross-sectional view showing an example of a light guide plate for image display according to a fourth embodiment of the present invention.

In the light guide plate for image display 4005 shown in FIG. 18, the first absorption layer 4004, the first resin base 4001, the hologram layer 4002 and the second resin base 4003 are arranged in that order in the thickness direction. The light guide plate for image display 4005 is an exemplary case in which a barrier layer is not provided.

The plan view shape of the light guide plate for image display 4005 is not particularly limited. For example, the light guide plate for image display 4005 may be shaped into a shape that can be attached to the display device used.

For example, the light guide plate for image display 4005 may be a rectangular plate having a shape larger than the shape attached to the display device. In such a case, the light guide plate for image display 4005 is shaped, for example, by being cut into a shape that can be attached to the display device before being assembled to the display device.

The light guide plate for image display 4005 may have a flat plate shape or, if necessary, a curved plate shape.

An exemplary case in which the light guide plate for image display 4005 is made of a flat plate having a rectangular shape in a plan view will be described below.

The first absorption layer 4004 is disposed on the outermost portion of the light guide plate for image display 4005 in the thickness direction. The first absorption layer 4004 is disposed on the surface of the light guide plate for image display 4005 on the display image emission side.

The layer thickness of the first absorption layer 4004 is not particularly limited. For example, the layer thickness of the first absorption layer 4004 may be 0.1 µm to 10 µm.

In the example shown in FIG. 18, the first absorption layer 4004 is formed on the entire surface of the first resin base 4001 that will be described later.

The method for forming the first absorption layer 4004 is not particularly limited. For example, the first absorption layer 4004 can be formed by applying a coating liquid made of a base resin material blended with a coloring material to a film formation surface (the surface of the first resin base 4001) and then curing the coating liquid.

As the application method of the coating liquid, an appropriate application method can be selected in accordance with the viscosity of the coating liquid. For example, as the application method, it is possible to use a conventionally known coating method such as bar coating, dip coating, reverse gravure coating, direct gravure coating, roll coating, die coating or curtain coating.

As the base resin material, for example, a polymerizable monomer or a polymerizable oligomer, which forms a cured product through irradiation with active energy rays, such as a (meth)acrylate monomer having a radically polymerizable unsaturated group in the molecule or a (meth)acrylate oligomer having a radically polymerizable unsaturated group in the molecule, or a curable resin material such as urethane, epoxy or polyester may be used. As the coloring material to be blended with the base resin material, for example, the above-mentioned bluing agent may be used.

The first resin base 4001 has a shape similar to the outer shape of the light guide plate for image display 4005.

The image light Ld emitted from the hologram layer 4002 and the external light Lo transmitted through the second resin base 4003 and the hologram layer 4002, which will be described later, are transmitted through the first resin base 4001.

The thickness of the first resin base 4001 is not particularly limited. For example, the thickness of the first resin base 4001 may be 0.01 mm to 10 mm.

As the material for forming the first resin base 4001, the same materials as those in the first to third embodiments described above can be appropriately selected, and there is no particular limitation as long as the material is a transparent resin material. Examples of the material for forming the first resin base 4001 include: polyolefin-based resins such as a homopolymer or a copolymer of an olefin such as ethylene, propylene or butene; amorphous polyolefin-based resins such as a cyclic polyolefin; polyester-based resins such as polyethylene terephthalate (PET) and polyethylene naphthalate (PEN); polyamide-based resins such as nylon 6, nylon 66, nylon 12 and copolymerized nylon; and ethylene-vinyl acetate copolymer partial hydrolyzate (EVOH), a polyimide-based resin, a polyether imide-based resin, a polysulfone-based resin, a polyether sulfone-based resin, a polyether ether ketone-based resin, a polycarbonate-based resin, a polyvinyl butyral-based resin, a polyarylate-based resin, a fluoro resin, a poly(meth)acrylic resin, a styrene-based resin such as polystyrene, polyvinyl alcohol, an ethylene vinyl alcohol copolymer, polyvinyl chloride, cellulose, acetyl cellulose, polyvinylidene chloride, polyphenylene sulfide, polyurethane, a phenol resin, an epoxy resin, a polyarylate resin, polynorbornene, styrene-isobutylene-styrene block copolymers (SIBS), allyl diglycol carbonate and organic materials such as biodegradable resins. The first resin base 4001 may be formed of two or more kinds of materials, or may have a laminated structure in which two or more kinds of materials are laminated.

From the viewpoint of transparency of the first resin base 4001, polycarbonate or poly(meth)acrylic resin is preferable. Further, from the viewpoint of process resistance of the first resin base 4001, a poly(meth)acrylic resin, an epoxy resin or a cyclic polyolefin is preferable.

The hologram layer 4002 is laminated on the surface opposite to the surface of the first resin base 4001 on which the first absorption layer 4004 is formed. As described above, the configuration of the hologram layer 4002 is not particularly limited. An appropriate diffraction grating corresponding to the function necessary for the light guide plate for image display 4005 is formed on the hologram layer 4002.

The second resin base 4003 is laminated on the surface of the hologram layer 4002 opposite to the surface on which the first resin base 4001 is disposed. As the second resin base 4003, the same configuration as given as an example in the description of the first resin base 4001 is used. However, the thickness, material and the like of the second resin base 4003 may be different from those of the first resin base 4001. In particular, the second resin base 4003 is disposed on the surface of the light guide plate for image display 4005 on the external light incident side located opposite to the display image emission side. Therefore, a material of which the surface hardness is higher than that of the first resin base 4001 may be employed for the second resin base 4003.

Such a light guide plate for image display 4005 can be manufactured, for example, as follows.

The first resin base 4001 and the second resin base 4003 are prepared, and the coating liquid forming the first absorption layer 4004 is prepared.

For example, the coating liquid is applied to the surface of the first resin base 4001. Thereafter, the coating liquid is cured to form the first absorption layer 4004.

For example, a photopolymer material for hologram formation is applied to the surface of the first resin base 4001 opposite to the surface on which the first absorption layer 4004 is formed. At this time, a transparent seal layer having the same thickness as the hologram layer 4002 may be provided on the outer peripheral portion of the surface of the first resin base 4001. In such a case, the photopolymer material is applied to the concave portions formed by being surrounded by the seal layer. The seal layer seals the outer peripheral portion of the hologram layer 4002 after the hologram layer 4002 is formed. Thereafter, the second resin base 4003 is placed on the photopolymer material.

However, the above-mentioned manufacturing sequence is an example. For example, the photopolymer material may be applied to the surface of the second resin base 4003. In addition, the first resin base 4001 on which the first absorption layer 4004 is formed may be placed on the photopolymer material.

Thereafter, a laminate consisting of the first absorption layer 4004, the first resin base 4001, the photopolymer material and the second resin base 4003 is bonded by a vacuum press.

Then, interference fringes corresponding to the diffraction pattern are formed on the photopolymer material of the laminate, and a diffraction grating is formed in the photopolymer material.

In such a manner, the light guide plate for image display 4005 is manufactured.

Next, an example of a display device including the light guide plate for image display 4005 will be described.

Figure 19:
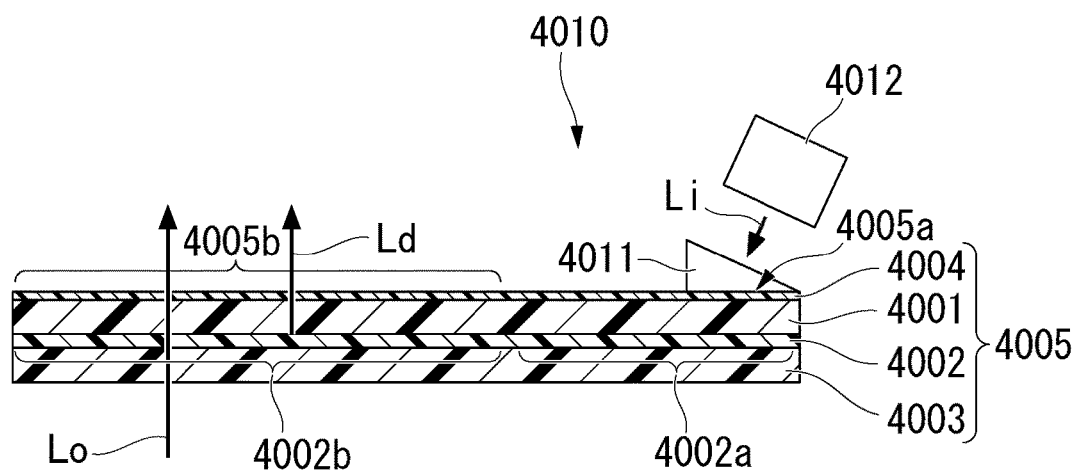
FIG. 19 is a schematic cross-sectional view showing an example of a display device including the light guide plate for image display according to the fourth embodiment of the present invention.

FIG. 19 is a schematic cross-sectional view showing an example of a display device including a light guide plate for image display according to a fourth embodiment of the present invention.

As shown in FIG. 19, the display device 4010 includes an image light projection unit 4012 and an incident optical system 4011 in addition to the light guide plate for image display 4005.

The image light projection unit 4012 projects the image light Li to be displayed on the light guide plate for image display 4005 in response to the image signal transmitted from the controller which is not shown.

The incident optical system 4011 includes an optical element such as a prism that causes the image light Li to be incident on the light guide plate for image display 4005. The incident optical system 4011 causes the image light Li to be incident on the incidence portion 4005$a$ formed on the surface of the light guide plate for image display 4005. For example, the incidence portion 4005$a$ is provided on the first absorption layer 4004.

The image light Li incident on the incidence portion 4005$a$ is guided to the display diffraction grating portion 4002$b$ of the hologram layer 4002 through the waveguide diffraction grating portion 4003$a$ formed on the hologram layer 4002. In the display diffraction grating portion 4002$b$, the image light Li is diffracted at a position corresponding to each display pixel to form the image light Ld. The image light Ld passes through the hologram layer 4002, the first resin base 4001 and the first absorption layer 4004, and is emitted as the image light Ld' to the outside of the light guide plate for image display 4005. Therefore, the regions of the display diffraction grating portion 4002b in the thickness direction and the first resin base 4001 and the first absorption layer 4004 facing the display diffraction grating portion 4002b in the thickness direction constitute the display image emission portion 4005b that displays the image light Ld. The display image emission portion 4005b is formed at a position separated from the incidence portion 4005a in the plane direction which is a direction orthogonal to the thickness direction.

On the other hand, external light Lo is incident on the light guide plate for image display 4005 through the second resin base 4003. The external light Lo passes through the second resin base 4003, the hologram layer 4002, the first resin base 4001 and the first absorption layer 4004, and is emitted to the outside of the light guide plate for image display 4005 as external light Lo'.

The user of the display device 4010 can see the image formed by the image light Ld' and the external light Lo'. Therefore, the user who puts the display image emission portion 4005b in the field of view views an image on which the external scene based on the external light Lo' and the image based on the image light Ld' are superimposed.

A transparent material such as that used for the light guide plate for image display 4005 is photodegraded with time due to the influence of, for example, ultraviolet light. A typical photodegradation is yellowing of the material. In particular, the hologram layer 4002 is formed of a photopolymer material, and is therefore yellowed to some extent immediately after production. Therefore, the light transmitted through the first resin base 4001, the second resin base 4003, and the hologram layer 4002 is yellowish.

Since yellow has high relative visibility, human vision is sensitive to yellowing. As a result, the contrast (luminance) of the yellowish image becomes low, and the observed image becomes unclear.

However, in the fourth embodiment of the present invention, the first absorption layer 4004 is provided in the display image emission portion 4005b. Therefore, in the image light Ld' and the external light Lo', yellow components of the image light Ld and the external light Lo are reduced, respectively. In such a manner, the first absorption layer 4004 cancels out the yellow components of the yellowish image light Ld and the yellowish external light Lo. Therefore, the effects of yellowing of the first resin base 4001, the second resin base 4003 and the hologram layer 4002 are eliminated.

Specifically, the first absorption layer 4004 absorbs light mainly in the light component in the wavelength range of 500 nm to 600 nm. Therefore, the yellowness is reduced and the bluish tint is relatively increased. Thereby, the white balance and contrast of the image are improved.

Further, even when the transparent materials such as the first resin base 4001 and the second resin base 4003 undergo photodegradation due to ultraviolet light or the like exposed when the display device 4010 is used, the degree of image deterioration due to yellowing is reduced as compared with the case where the first absorption layer 4004 is not provided.

As described above, according to the fourth embodiment of the present invention, it is possible to provide a light guide plate for image display capable of reducing the influence of yellowing of a transparent material on a display image.

In particular, in the fourth embodiment of the present invention, the first absorption layer 4004 is disposed on the outermost portion of the light guide plate for image display 4005. Therefore, for example, when a material having a hardness higher than that of the first resin base 4001 is used as the first absorption layer 4004, the surface of the first resin base 4001 is prevented from being scratched. For example, when the transmittance of ultraviolet light is low in the wavelength characteristics of the first absorption layer 4004, the incidence of ultraviolet light from the side of the first resin base 4001 can be suppressed. Therefore, photodegradation over time in the light guide plate for image display 4005 can be reduced.

First Modification Example

A first modification example of the fourth embodiment will be described.

Figure 20:
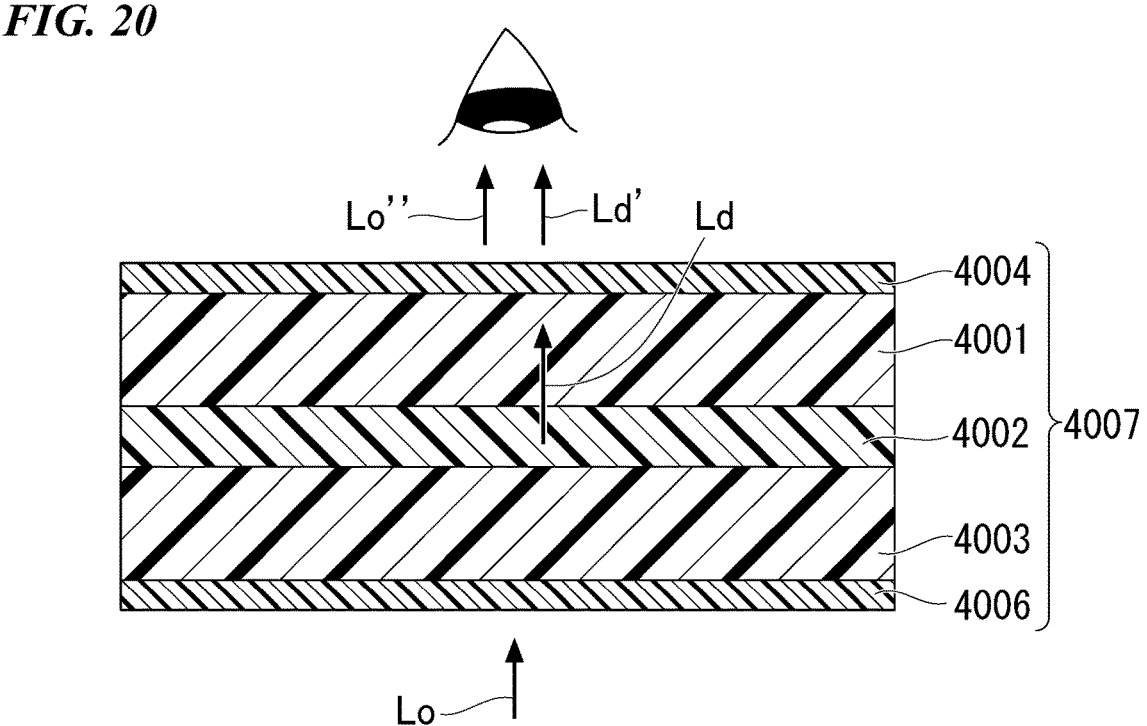
FIG. 20 is a schematic cross-sectional view showing an example of a light guide plate for image display according to a first modification example of the fourth embodiment of the present invention.

FIG. 20 is a schematic cross-sectional view showing an example of a light guide plate for image display according to a first modification example of the fourth embodiment of the present invention.

As shown in FIG. 20, the light guide plate for image display 4007 of the first modification example of the fourth embodiment of the present invention further includes a second absorption layer 4006 in the light guide plate for image display 4005 of the basic example of the fourth embodiment of the present invention.

Hereinafter, the points different from the basic example of the fourth embodiment of the present invention will be mainly described.

The second absorption layer 4006 is laminated on the surface of the second resin base 4003 opposite to the surface on which the hologram layer 4002 is disposed. That is, the second absorption layer 4006 is disposed on the outermost portion of the light guide plate for image display 4007, like the first absorption layer 4004. In the light guide plate for image display 4007, a laminate consisting of the first resin base 4001, the hologram layer 4002, and the second resin base 4003 is sandwiched between the first absorption layer 4004 and the second absorption layer 4006.

As the second absorption layer 4006, the same configuration as illustrated in the description of the first absorption layer 4004 is used.

However, the thickness, material and the like of the second absorption layer 4006 may be different from those of the first absorption layer 4004. For example, the second absorption layer 4006 is disposed on the surface of the light guide plate for image display 4007 opposite to the display image emission side. Therefore, a material of which the surface hardness is higher than that of the second resin base 4003 or the first absorption layer 4004 may be used.

In the first modification example of the fourth embodiment of the present invention, the first absorption layer 4004 and the second absorption layer 4006 are disposed on the outermost portion of the light guide plate for image display 4007. Therefore, it is more preferable that the transmittance of ultraviolet light be low in the wavelength characteristics of the first absorption layer 4004 and the second absorption layer 4006.

The light guide plate for image display 4007 is manufactured in the same manner as the light guide plate for image display 4005 in the basic example of the fourth embodiment of the present invention, except that the second absorption layer 4006 is formed on the second resin base 4003. As the method for forming the second absorption layer 4006, the same formation method as for the first absorption layer 4004 is used.

The light guide plate for image display 4007 according to the first modification example of the fourth embodiment of the present invention is configured in the same manner as the light guide plate for image display 4005 except that a second absorption layer 4006 is provided. Therefore, the yellow component of the image light Ld is reduced by passing through the first absorption layer 4004 in the same manner as the light guide plate for image display 4005 (image light Ld').

On the other hand, the external light Lo further passes through the second absorption layer 4006 and is then incident on the second resin base 4003. Therefore, when the external light Lo passes through the second absorption layer 4006, the yellow component is reduced. When the external light Lo passes through the second resin base 4003, the hologram layer 4002 and the first resin base 4001, in accordance with the degree of yellowing of each, the yellow component increases. Then, the yellow component decreases through the first absorption layer 4004.

Since the second resin base 4003 is disposed on the incident side of the external light Lo during use, photodegradation due to the external light Lo is likely to proceed. As a result, the yellowing of the second resin base 4003 may proceed more easily than the yellowing of the first resin base 4001 over time. As the yellowing of the second resin base 4003 progresses, the external light Lo transmitted through the second resin base 4003 may have a stronger yellow component than the image light Ld not transmitted through the second resin base 4003.

However, in the first modification example of the fourth embodiment of the present invention, the second absorption layer 4006 is provided. Therefore, the second absorption layer 4006 is able to cancel out the increase in yellowness due to the yellowing of the second resin base 4003. Therefore, the yellowness of the external light Lo" emitted from the first absorption layer 4004 is reduced as compared with the external light Lo" emitted from the light guide plate for image display 4005. As a result, the balance of yellowness in the image light Ld' and the external light Lo" can be improved.

In particular, when the transmittance of ultraviolet light is low in the wavelength characteristics of the second absorption layer 4006, the photodegradation itself of the second resin base 4003 due to the external light Lo can be reduced.

As described above, according to the first modification example of the fourth embodiment of the present invention, it is possible to provide a light guide plate for image display capable of reducing the influence of yellowing of the transparent material on the display image.

Second Modification Example

A second modification example of the fourth embodiment will be described.

Figure 21:
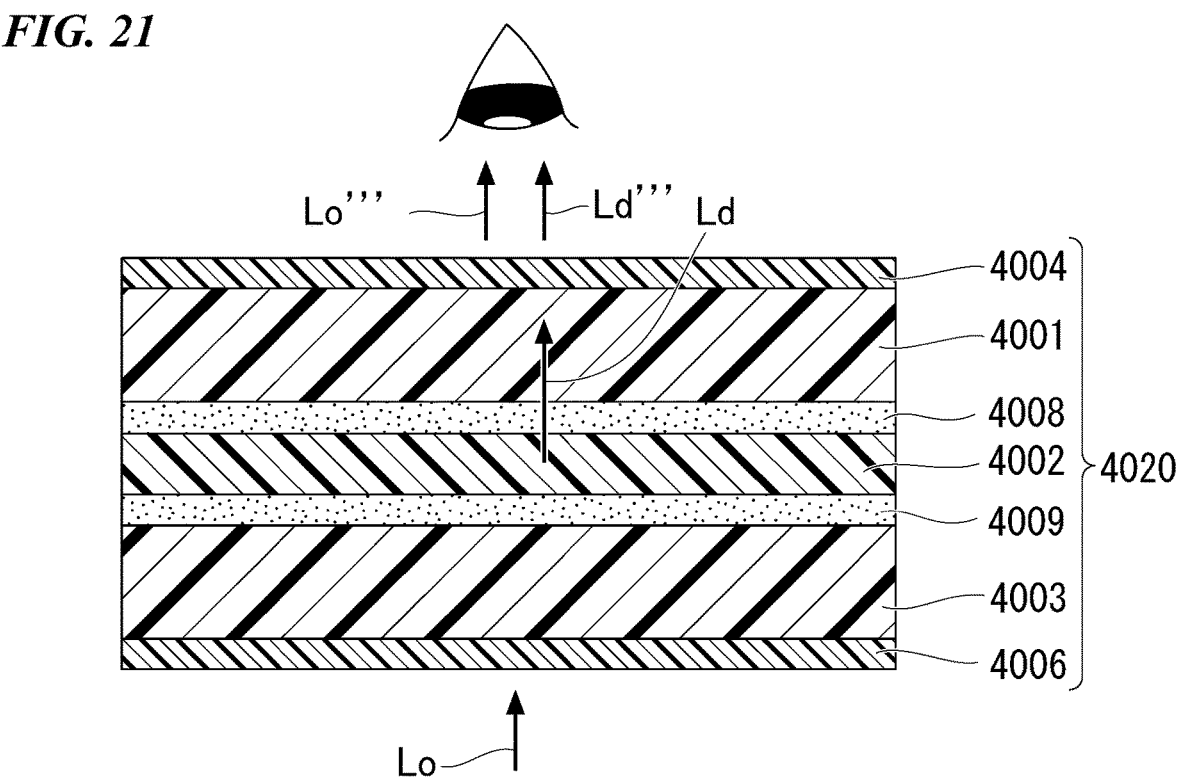
FIG. 21 is a schematic cross-sectional view showing an example of a light guide plate for image display according to a second modification example of the fourth embodiment of the present invention.

FIG. 21 is a schematic cross-sectional view showing an example of a light guide plate for image display of a second modification example of the fourth embodiment of the present invention.

As shown in FIG. 21, the light guide plate for image display 4020 of the second modification example of the fourth embodiment of the present invention further includes the first barrier layer 4008 and the second barrier layer 4009 in the light guide plate for image display 4007 of the first modification example. In the second modification example of the fourth embodiment of the present invention, the first barrier layer 4008 and the second barrier layer 4009 may be collectively referred to as "barrier layer". Further, in the second modification example of the fourth embodiment of the present invention, the first resin base 4001 and the second resin base 4003 may be collectively referred to as "resin base". Further, in the second modification example of the fourth embodiment of the present invention, the first absorption layer 4004 and the second absorption layer may be collectively referred to as "absorption layer".

Hereinafter, the points different from the first modification example of the fourth embodiment of the present invention will be mainly described.

The first barrier layer 4008 is disposed between the first resin base 4001 and the hologram layer 4002, and is in close contact with the surfaces of the first resin base 4001 and the hologram layer 4002. The first barrier layer 4008 prevents the gas permeating from the outside of the light guide plate for image display 4020 and the first resin base 4001 from permeating into the hologram layer 4002.

The material of the first barrier layer 4008 is not particularly limited as long as the material is able to barrier the gas that causes deterioration of the hologram layer 4002. It is preferable that the first barrier layer 4008 contain a transparent inorganic material. Similarly to the barrier layer in the second embodiment described above, it is more preferable that the material include at least one inorganic material selected from the group consisting of silicon oxide, silicon nitrogen oxide, diamond-like carbon (DLC), aluminum oxide and glass.

Further, the barrier layer may be disposed on the resin film. In such a case, it is more preferable that the resin film be disposed between the barrier layer and the resin base.

For the first barrier layer 4008, for example, lower oxygen permeability and water vapor permeability are more preferable. In particular, the first barrier layer 4008 is more preferably made of a material having excellent steam barrier properties (low water vapor permeability).

For example, the oxygen permeability of the first barrier layer 4008 may be 1 $cm^3/m^2 \cdot day$ or less.

For example, the water vapor permeability of the first barrier layer 4008 may be 1 $g/m^2 \cdot day$ or less. The water vapor permeability of the first barrier layer 4008 is more preferably 0.5 $g/m^2 \cdot day$ or less.

The inorganic material used for the first barrier layer 4008 may have a higher refractive index than the first resin base 4001. For example, the refractive index of the first barrier layer 4008 may be 1.48 to 3.00. When the first barrier layer 4008 has a high refractive index, the light transmitted through the first barrier layer 4008 and the first resin base 4001 is incident from the first barrier layer 4008, which is optically dense, onto the first resin base 4001 which is optically coarse. Thus, the exit angle of light from the first barrier layer 4008 to the first resin base 4001 becomes larger depending on the difference in refractive index between the first barrier layer 4008 and the first resin base 4001. As a result, the field of view (FOV) in the light guide plate for image display 4020 can be enlarged.

The material of the first barrier layer 4008 is as described above, but may be an oxide such as zinc oxide, antimony oxide, indium oxide, cerium oxide, calcium oxide, cadmium oxide, silver oxide, gold oxide, chromium oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide or barium oxide.

When the first barrier layer 4008 is made of silicon oxide, the layer thickness may be 10 to 300 nm. When the layer thickness is less than 10 nm, the moisture resistance may be insufficient. When the layer thickness is greater than 300 nm, the silicon oxide thin film is likely to crack and may peel off from the film formation surface.

A particularly preferable layer thickness is 20 to 200 nm.

The method for forming the first barrier layer 4008 from the silicon oxide is not particularly limited. For example, the first barrier layer 4008 can be formed by any of conventionally known methods such as a vacuum deposition method, a sputtering method, an ion plating method and a plasma CVD method. When the first barrier layer 4008 is formed of the silicon oxide, in order to improve the adhesiveness between the film formation surface and the silicon oxide, a surface treatment may be performed. The surface treatment includes applying a corona discharge treatment or a low-temperature plasma treatment onto the film formation surface, applying a silane coupling agent on the film formation surface or applying a mixture of a saturated polyester and an isocyanate.

For example, when a thin film of silicon oxide is formed by the vacuum deposition method, silicon, by using silicon monoxide, silicon dioxide or a mixture thereof as an evaporative substance, under a vacuum of $1.0 \times 10^{-3}$ to $1.0 \times 10^{-5}$ Torr, the evaporative substance is heated and evaporated by an electron beam, resistance heating or high frequency heating method.

Further, a reaction vapor deposition method performed while supplying oxygen gas can also be adopted.

The silicon oxide forming the first barrier layer 4008 may contain calcium, magnesium or their oxides as impurities as long as the impurities are 10% by mass or less.

When the first barrier layer 4008 is made of silicon nitrogen oxide, the same configuration as the first barrier layer 4008 containing the silicon oxide as a main component is used, except that the silicon oxide is replaced with the silicon nitrogen oxide.

The DLC is an amorphous carbon material generally having a ternary structure of a diamond-like structure, a graphite-like structure and a polyethylene-like polymer structure containing a hydrogen atom in the structure. In the generation of the DLC, there is usually an essentially ternary structure containing hydrogen when using ethylene, a hydrocarbon acetylene or benzene as a carbon source.

The DLC is excellent in hardness, lubricity, wear resistance, chemical stability, heat resistance and surface smoothness. Since the DLC forms the above-mentioned dense polymer structure, the DLC is also excellent in a gas barrier property and a steam barrier property.

When the first barrier layer 4008 is formed by the DLC, the forming method is not particularly limited. As the DLC coating method, a well-known appropriate coating method such as a plasma CVD method or a physical vapor deposition method such as an ion plating method or an ion beam sputtering method can be used.

When the first barrier layer 4008 consists of aluminum oxide, the first barrier layer 4008 may be formed of, for example, only $Al_2O_3$, or may be formed of mixture of two or more elements selected from the group consisting of Al, AlO and $Al_2O_3$. The atomic number ratio of Al:O in the aluminum oxide layer differs depending on the production conditions of the aluminum oxide layer. The aluminum oxide layer that can be used as the first barrier layer 4008 may contain a trace amount (up to 3% of all components) of other components as long as the barrier performance is not impaired.

The layer thickness of the aluminum oxide layer may be set in accordance with requirements of the barrier performance. For example, the layer thickness of the aluminum oxide layer may be 5 nm to 800 nm.

The method for forming the first barrier layer 4008 with the aluminum oxide is not particularly limited. For example, as a method for forming the first barrier layer 4008, a physical vapor deposition (PVD) method such as a vacuum deposition method, a sputtering method or an ion plating method, or a chemical vapor deposition (CVD) method may be used.

For example, in the vacuum deposition method, Al, $Al_2O_3$ and the like may be used as the vapor deposition source material, and resistance heating, high frequency induction heating, electron beam heating and the like may be used as the heating method of the vapor deposition source. In the vacuum deposition method, oxygen, nitrogen, water vapor or the like may be adopted as the reactive gas. Alternatively, reactive vapor deposition using means such as ozone addition or ion assist may be used. Further, the film formation surface may be biased. Alternatively, the temperature of the film formation surface may be raised. Alternatively, the film may be cooled. The same applies to film forming methods other than the sputtering method such as the PVD method and the CVD method and other vacuum deposition methods.

When the first barrier layer 4008 is made of glass, examples of the material of the first barrier layer 4008 include borosilicate glass, non-alkali glass, low alkali glass, soda lime glass, sol-gel glass or glass of these glasses on which a heat treatment or surface treatment is performed. As the material of the first barrier layer 4008, non-alkali glass is particularly preferable from the viewpoint of avoiding coloring due to impurities.

When the first barrier layer 4008 is made of glass, the layer thickness may be 10 μm to 200 μm. When the layer thickness is 10 μm or more, the gas barrier property and the mechanical strength tend to be excellent. The layer thickness is preferably 10 μm or more and more preferably 30 μm or more. Further, when the layer thickness is 200 μm or less, the optical characteristics as a light guide plate such as light transmittance tend to be excellent. The layer thickness is preferably 200 μm or less, more preferably 100 μm or less, even more preferably 75 μm or less and particularly preferably 50 μm or less.

The method of forming the first barrier layer 4008 with glass is not particularly limited. As a method of forming the first barrier layer 4008 from glass, for example, a slot down draw method, a fusion method or a float method can be adopted. Further, as the glass to be used, commercially available glass may be used as it is, or commercially available glass may be polished to a desired thickness and used. Examples of the commercially available glass include "EAGLE2000" manufactured by Corning Incorporated, "AN100" manufactured by AGC Inc., "OA10G" manufactured by Nippon Electric Glass Co., Ltd., and "D263" manufactured by Schott AG μm or more.

The second barrier layer 4009 is laminated on the surface of the hologram layer 4002 on the opposite side of the surface of the hologram layer 4002 on which the first barrier layer 4008 is formed.

As the configuration of the second barrier layer 4009, the same configuration as given as an example in the description of the first barrier layer 4008 is used. However, the material, thickness and the like of the second barrier layer 4009 may be different from those of the first barrier layer 4008.

Such a light guide plate for image display 4020 can be manufactured, for example, as follows.

The first resin base 4001 and the second resin base 4003 are prepared, and the first barrier layer 4008 and the second barrier layer 4009 are formed on the surfaces of the first resin base 4001 and the second resin base 4003, respectively.

As a method for producing the first barrier layer 4008 and the second barrier layer 4009, an appropriate production method is selected in accordance with the materials of the first barrier layer 4008 and the second barrier layer 4009.

For example, a photopolymer material for hologram formation is applied to the surface of the first barrier layer 4008 in the first resin base 4001 on which the first barrier layer 4008 is formed. At this time, a transparent seal layer having the same thickness as the hologram layer 4002 may be provided on the outer peripheral portion of the first barrier layer 4008. In such a case, the photopolymer material is applied to the concave portions formed by being surrounded by the seal layer. The seal layer seals the outer peripheral portion of the hologram layer 4002 after the hologram layer 4002 is formed.

Thereafter, the second resin base 4003 on which the second barrier layer 4009 is formed is placed on the photopolymer material in a state where the second barrier layer 4009 is directed toward the photopolymer material.

However, the above-mentioned manufacturing sequence is an example. For example, after the photopolymer material is applied to the second resin base 4003 on which the second barrier layer 4009 is formed, the first resin base 4001 on which the first barrier layer 4008 is formed may be placed on the photopolymer material.

Thereafter, a laminate consisting of the first absorption layer 4004, the first resin base 4001, the first barrier layer 4008, the photopolymer material, the second barrier layer 4009, the second resin base 4003 and the second absorption layer 4006 is bonded by a vacuum press.

Then, interference fringes corresponding to the diffraction pattern are formed on the photopolymer material of the laminate, and a diffraction grating is formed in the photopolymer material.

In such a manner, the light guide plate for image display 4020 is manufactured.

The light guide plate for image display 4020 is configured in the same manner as the light guide plate for image display 4007 of the first modification example, except that the first barrier layer 4008 and the second barrier layer 4009 are added.

The first barrier layer 4008 and the second barrier layer 4009 are made of a transparent inorganic material such as DLC or silicon oxide, but easily absorb blue light in the wavelength range of 400 nm to 480 nm. Therefore, as a result of the decrease in transmittance of a blue component, the transmitted light becomes yellowish.

As described above, the first barrier layer 4008 tends to increase the yellowness of the external light Lo and the image light Ld. The second barrier layer 4009 tends to increase the yellowness of the external light Lo. However, in the second modification example of the fourth embodiment of the present invention, as in the first modification example, the first absorption layer 4004 and the second absorption layer 4006 are provided. Therefore, by appropriately adjusting the wavelength characteristics of the first absorption layer 4004 and the second absorption layer 4006, the increase in yellowness due to the first barrier layer 4008 and the second barrier layer 4009 can be canceled out. That is, it is possible to reduce the yellowness of the external light Lo''' and the image light Ld'' emitted from the first absorption layer 4004. Further, similarly to the first modification example, the balance of yellowness of the external light Lo''' and the image light Ld'' can be improved.

As described above, according to the second modification example of the fourth embodiment of the present invention, it is possible to provide a light guide plate for image display capable of reducing the influence of yellowing of the transparent material on the display image.

Further, according to the light guide plate for image display 4020, the first barrier layer 4008 and the second barrier layer 4009 are provided. Therefore, deterioration of the hologram layer 4002 with time can be suppressed.

The gas barrier properties of the first resin base 4001 and the second resin base 4003 are much lower than those of glass, although the degree of gas barrier property varies depending on the type of resin material. Therefore, the first resin base 4001 and the second resin base 4003 have higher hygroscopicity and water vapor permeability than glass.

As a result, the gas outside the light guide plate for image display 4005 permeates the first resin base 4001 and the second resin base 4003 to some extent, or accumulates inside. In particular, moisture tends to accumulate in the first resin base 4001 and the second resin base 4003.

However, the gas and moisture that have permeated into the first resin base 4001 and the second resin base 4003 from the outside are blocked by the first barrier layer 4008 and the second barrier layer 4009 even when the gas and moisture diffuse in the light guide plate for image display 4020. As a result, the permeation of gas and water vapor into the hologram layer 4002 is suppressed.

For example, by suppressing the permeation of moisture into the hologram layer 4002, deterioration of the hologram layer 4002 is prevented.

Further, since the light guide plate for image display 4020 has the above-mentioned layer structure, the hologram layer 4002 is not in contact with the first resin base 4001 and the second resin base 4003. As a result, even when the light guide plate for image display 4020 is disposed in a high temperature environment, the hologram layer 4002 is prevented from eroding the first resin base 4001 and the second resin base 4003.

In particular, as described above, when the refractive indexes of the first barrier layer 4008 and the second barrier layer 4009 are higher than those of the first resin base 4001 and the second resin base 4003, the exit angle of light from the first barrier layer 4008 to the first resin base 4001 becomes large. Similarly, the exit angle of the light incident on the second barrier layer 4009 from the second resin base 4003 is narrowed. Therefore, the light incident from the outside on the side of the second resin base 4003 and transmitted through the light guide plate for image display 4005 is incident in a wider angle range than the case where the second barrier layer 4009 is not provided. Then, the light is emitted in a wider angle range as compared with the case where the first barrier layer 4008 is not provided. As a result, the range of the field of view of the external light is further enlarged, and the FOV on the display side is also enlarged.

Regarding the image light from the hologram layer 4002, as described above, as a result of increasing the exit angle of the light from the first barrier layer 4008 to the first resin base 4001, as compared with the case where the first barrier layer 4008 is not provided, the FOV of the display screen enlarges.

In particular, in the second modification example of the fourth embodiment of the present invention, the first barrier layer 4008 and the second barrier layer 4009 are laminated on the hologram layer 4002. Thereby, the diffusion positions of external light and image light become closer to the diffraction position of the hologram layer 4002 constituting the display screen. Thus, a clearer image can be observed from a wide range of angles as compared with the case where the first barrier layer 4008 and the second barrier layer 4009 are provided at positions away from the hologram layer 4002.

Here, a measurement method of the luminance value and the FOV of the light guide plate for image display 4020 will be briefly described.

The luminance value of the light guide plate for image display 4020 is measured by a luminance meter and a display device such as the display device 4010 in the basic example of the fourth embodiment of the present invention described above, except that the light guide plate for image display 4005 is replaced with the light guide plate for image display 4020.

In the measurement of the luminance value, the display device is disposed at a position where the center of the display image emission portion of the light guide plate for image display 4020 faces the luminance meter on the measurement optical axis of the luminance meter. The distance between the display image emission portion and the luminance meter is a distance corresponding to the position of the user's eyes when the display device is attached. For example, when the display device is a head-mounted display, the distance is set to 15 mm.

The luminance value is a luminance measured by the luminance meter when a white image having the maximum luminance is displayed on the display device.

In the measurement of the FOV of the light guide plate for image display 4020, the luminance is measured by inclining the measurement optical axis of the luminance meter with respect to the display image emission portion in a state where the display device displays a white image having the maximum luminance. For example, the luminance meter is swingably supported by the goniometer stage or the like to be inclined at an appropriate angle from a position perpendicular to the light guide plate for image display 4020.

The FOV is obtained as an angle range in which a luminance equal to or higher than the threshold value can be obtained, with the luminance corresponding to the invisible white image as a threshold value. When the luminance equal to or higher than the threshold value is obtained in the range of $-\theta_1$ to $+\theta_2$, the FOV is $\theta_1+\theta_2$. Here, the angle is 0° with respect to the normal angle of the light guide plate for image display 4020.

Third Modification Example

A third modification example of the fourth embodiment will be described.

Figure 22:
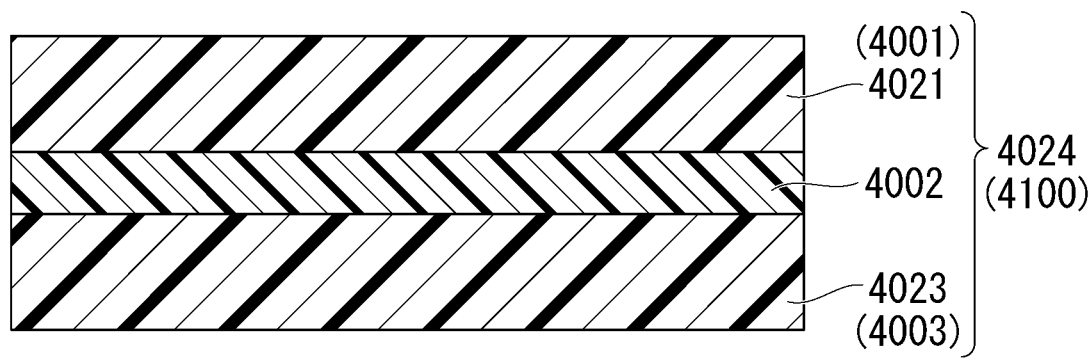
FIG. 22 is a schematic cross-sectional view showing an example of a light guide plate for image display according to a third modification example of the fourth embodiment of the present invention.

FIG. 22 is a schematic cross-sectional view showing an example of a light guide plate for image display according to a third modification example of the fourth embodiment of the present invention.

As shown in FIG. 22, in the light guide plate for image display 4024 of the third modification example, the first absorption layer 4004 of the light guide plate for image display 4005 of the basic example of the fourth embodiment of the present invention is deleted. In addition, a first resin base (absorption layer) 4021 and a second resin base (absorption layer) 4023 are provided instead of the first resin base 4001 and the second resin base 4003.

Hereinafter, the points different from the basic example of the fourth embodiment of the present invention will be mainly described.

The first resin base (absorption layer) 4021 includes a base resin similar to that of the first resin base 4001 and a coloring material dispersed in the base resin.

As the coloring material contained in the first resin base (absorption layer) 4021, the same coloring material as the first absorption layer 4004 in the basic example of the fourth embodiment of the present invention is used. The blending amount of the coloring material is set so that the first resin base (absorption layer) 4021 has the same light absorption as the first absorption layer 4004 in the basic example of the fourth embodiment of the present invention.

The second resin base (absorption layer) 4023 is configured in the same manner as the first resin base (absorption layer) 4021.

The light guide plate for image display 4024 is manufactured in the same manner as the light guide plate for image display 4005 in the basic example of the fourth embodiment of the present invention, except that the first resin base (absorption layer) 4021 and the second resin base (absorption layer) 4023 prepared in the base preparation process are molded using a material obtained by kneading a coloring material into each base resin and the absorption layer forming process is not performed.

The light guide plate for image display 4024 is an example in which the absorption layer is formed of the first resin base (absorption layer) 4021 and the second resin base (absorption layer) 4023.

According to the light guide plate for image display 4024, the first resin base (absorption layer) 4021 and the second resin base (absorption layer) 4023 are absorption layers. Therefore, similarly to the first modification example, yellowness in external light and image light can be reduced.

As described above, according to the third modification example of the fourth embodiment of the present invention, it is possible to provide a light guide plate for image display capable of reducing the influence of yellowing of the transparent material on the display image.

In the basic example and each modification example of the fourth embodiment of the present invention, the exemplary case where the absorption layer is disposed on the outermost portion of the light guide plate for image display has been described. However, when the absorption layer is on the optical path of the external light Lo and the image light Ld, regardless of where the absorption layer is disposed, it is possible to reduce the yellowness of the light emitted from the light guide plate for image display.

In the basic example and each modification example of the fourth embodiment of the present invention, the exemplary case where the absorption layer is in contact with the resin base has been described. However, the absorption layer may be laminated on a transparent resin film. In such a case, for example, the absorption layer can be formed on the resin film and then fixed to the placement surface through an adhesive or the like. Therefore, the absorption layer can be easily formed.

In the second modification example, the exemplary case where the barrier layer is disposed on the front and back surfaces of the hologram layer has been described. However, the barrier layer may be disposed between the resin base and the hologram layer for the purpose of blocking moisture or the like that permeates through the resin base and for the purpose of preventing contact between the hologram layer and the resin base.

However, in such a case, when the transparent layer interposed between the barrier layer and the hologram layer has high hygroscopicity, moisture may permeate through the side surface of the transparent layer. Therefore, it is more preferable that the transparent layer between the barrier layer and the hologram layer be formed of a material having low hygroscopicity. When the transparent layer between the barrier layer and the hologram layer has hygroscopicity, it is more preferable to reduce the thickness of the transparent layer. In such a case, since the exposed area of the side surface serving as the moisture permeation port is reduced, the amount of moisture absorbed can be reduced.

In the second modification example, the exemplary case where the barrier layer is in contact with the hologram layer and the resin base has been described. However, the barrier layer may be laminated on a transparent resin film. In such a case, for example, the barrier layer can be formed on the resin film and then fixed to the resin base through an adhesive or the like. Therefore, the barrier layer can be easily formed.

EXAMPLES

Hereinafter, the present invention will be described in more detail with reference to examples. However, the present invention is not limited to the examples described below, and various modification examples can be made as long as the scope of the present invention is not changed.

Examples and Comparative Examples of First Embodiment (Examples 1 to 3, Comparative Examples 1 to 3)

Hereinafter, examples and comparative examples of the first embodiment will be described.

Table 1 below shows the configurations and evaluation results of the resin bases used in Examples 1 to 3 and Comparative Examples 1 to 3.

base 1003 ("resin base" in Table 1). The plate thicknesses of the first resin base 1001 and the second resin base 1003 are both 1 mm.

The hologram layer 1002 is common to each example and each comparative example. Regarding the material of the hologram layer 1002, 100 parts by mass of bisphenol-based epoxy resin jER 1007 (polymerization degree n=10.8, epoxy equivalent: 1750 to 2200, trade name manufactured by Mitsubishi Chemical Corporation), 50 parts by mass of triethyleneglycol diacrylate, 5 parts by mass of 4,4'-bis (t-butylphenyl) iodonium hexafluorophosphate and 0.5 parts by mass of 3,3'-carbonylbis (7-diethylamino) coumarin are mixed and dissolved in 100 parts by mass of 2-butanone, and are used as photosensitive materials for a hologram. The thickness of the hologram layer 1002 is 5 μm. The size of the hologram layer 1002 in a plan view is 50 mm×50 mm.

(Substrate Manufacturing Process)

The first resin base 1001 and the second resin base 1003 of Example 1 are manufactured as follows.

100 portions of methyl methacrylate (MMA) is put into a reactor (polymerization kettle) equipped with a cooling tube, a thermometer and a stirrer, and the mixture is stirred. After bubbling with nitrogen gas, heating is started. When the internal temperature reaches 80° C., 0.05 parts of 2,2'-azobis-(2,4-dimethylvaleronitrile), which is a radical polymerization initiator, are added. After further heating to an internal temperature of 100° C., the mixture is held for 10 minutes. The reactor is then cooled to room temperature to obtain a syrup. The polymerization rate of the syrup is about 20% by mass.

TABLE 1

| | Resin base | | | | | | | Evaluation | | |
|---|---|---|---|---|---|---|---|---|---|---|
| | | | | | | | | | Heat | |
| | Material | Plate thickness [mm] | Manufacturing method | Hard coat | Product name | Manufacturer | MC value | Ra [nm] | shrinkage rate [%] | Sharpness of display image |
| Example 1 | Acrylic resin | 1 | Continuous casting | No | Acrylite L | Mitsubishi Chemical | 0.074 | 4.9 | Less than 3 | A |
| Example 2 | Acrylic resin | 1 | Continuous casting | Both surfaces | Acrylite MR | Mitsubishi Chemical | 0.103 | 4.7 | Less than 3 | A |
| Example 3 | Acrylic resin | 1 | Cutting, polishing | No | — | — | 0.060 | 2.6 | Less than 3 | A |
| Comparative Example 1 | Acrylic resin | 3 | Extrusion | No | Comoglas P | Kuraray | 0.126 | 5.5 | 3 or more | C |
| Comparative Example 2 | Acrylic resin | 3 | Extrusion | No | Sumipex E | Sumitomo Chemical | 0.183 | 2.9 | 3 or more | C |
| Comparative Example 3 | Acrylic resin | 3 | Extrusion | No | Delaglas A | Asahi Kasei | 0.148 | 2.3 | 3 or more | C |

Mitsubishi Chemical: Mitsubishi Chemical Corporation
Kuraray: Kuraray Co., Ltd.
Sumitomo Chemical: Sumitomo Chemical Co., Ltd.
Asahi Kasei: Asahi Kasei Corporation
Acrylite, Comoglas, Sumipex and Delaglas are registered trademarks of their respective companies in Japan.

Example 1

Example 1 is an example corresponding to the light guide plate for image display 1004 of the basic example of the first embodiment.

As shown in Table 1, an acrylic resin (PMMA) is used as the material of the first resin base 1001 and the second resin Thereafter, 0.2 parts by mass of t-hexyl peroxypivalate and 0.01 parts by mass of sodium dioctyl sulfosuccinate are added to the syrup and completely dissolved at room temperature to form a polymerizable raw material.

After the dissolved air in the polymerizable raw material is removed under reduced pressure, the raw material is injected into a continuous polymerization device equipped with a pair of mirror-finished stainless steel endless belts.

Here, the continuous polymerization device used in the present example will be described.

Figure 8:
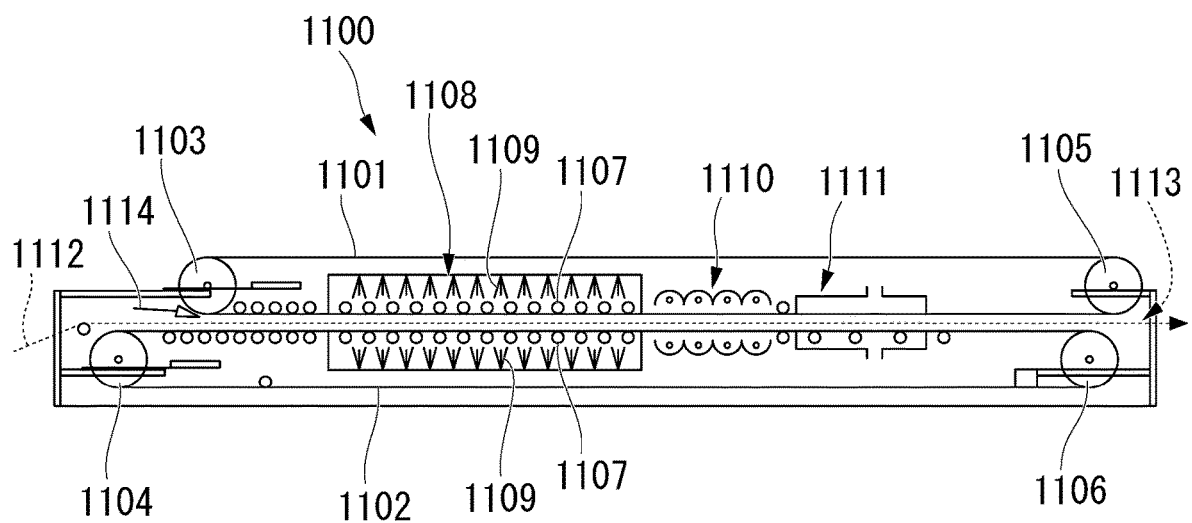
FIG. 8 is a schematic vertical cross-sectional view showing an example of the manufacturing apparatus of the resin substrate according to Example 1.

FIG. 8 is a schematic vertical cross-sectional view showing an example of the manufacturing apparatus of the resin substrate of Example 1.

As shown in FIG. 8, in the continuous polymerization device 1100, a pair of endless belts 1101 and 1102 are disposed one above the other. The endless belt 1101 is tensioned by the main pulleys 1103 and 1105, the endless belt 1102 is tensioned by the main pulleys 1104 and 1106, and the endless belts 1101 and 1102 are driven to travel at the same speed. A plurality of carrier rolls 1107 are disposed on the inner peripheral portions of the endless belts 1101 and 1102. The carrier rolls 1107 face each other with the endless belts 1101 and 1102 facing each other in between. Each carrier roll 1107 horizontally supports the traveling endless belts 1101 and 1102, and is subjected to a line load at least once onto the belt surface from the direction which is perpendicular to the belt traveling direction (direction from left to right in the figure) of the endless belts 1101 and 1102 and perpendicular to the belt surface.

The line load may be 0.001 to 10.0 kg/cm. The line load is more preferably 0.01 kg/cm or more.

The more times the line load is applied, the more preferable. As the number of times the line load is applied increases, the flatness of the obtained resin substrate is improved. For example, the number of times the line load is applied is more preferably 10 times or more.

The raw material injection device 1114 provided in the continuous polymerization device 1100 supplies the polymerizable raw material between the endless belts 1101 and 1102. Two elastic gaskets 1112 seal the vicinities of both side end portions of the endless belts 1101 and 1102.

The polymerizable raw material is heated by the hot water spray 1109 in the first polymerization zone 1108 and polymerized as the endless belts 1101 and 1102 travel. Further, the polymerizable raw material is heated by a hot air heater in the second polymerization zone 1110 provided downstream in the belt traveling direction to complete the polymerization. The polymerizable raw material is cooled in the downstream cooling zone 1111 provided on the downstream side in the belt traveling direction, and then taken out as a plate-like polymer 1113.

The specific production conditions of the polymerizable raw material of Example 1 described above are as follows.

In the continuous polymerization device 1100, the distance between the belt surfaces of the endless belts 1101 and 1102 at the portion where the polymerizable raw material is supplied from the raw material injection device 1114 is adjusted to 1.6 mm. Then, the distance is continuously adjusted so that the plate-like polymer finally has a thickness of 1 mm at the portion where the polymerization is completed and the plate-like polymer is taken out.

The line load of each carrier roll 1107 in the first polymerization zone 1108 is 0.3 kg/cm. The hot moisture temperature of the hot water spray 1109 is 80° C. The hot moisture is continuously applied to the inner peripheral surface of the endless belts 1101 and 1102 while the polymerizable raw material stays in the first polymerization zone 1108. The residence time of the polymerizable raw material in the first polymerization zone 1108 is 40 minutes.

In the second polymerization zone 1110, the polymerization is completed under the condition that the residence time of the polymerizable raw material is 10 minutes while blowing hot air having a temperature of 120° C. from the hot air heater onto the inner peripheral surface of the belt.

In such a manner, a plate-like polymer 1113 having a plate thickness of 1 mm is obtained.

The evaluation sample 1A of the first resin base 1001 and the second resin base 1003 is formed by cutting the plate-like polymer 1113 into a rectangular shape of 200 mm×200 mm. The evaluation sample 1A is used for the MC value measurement, the arithmetic average roughness Ra measurement and the heat shrinkage rate measurement, which will be described later.

The evaluation sample 1B is formed by cutting the plate-like polymer 1113 into a rectangular shape of 60 mm×60 mm. The evaluation sample 1B forms a light guide plate for image display 1004 and is used for image evaluation (described later) of the light guide plate for image display 1004.

Next, the manufacturing process of the light guide plate for image display 1004 according to Example 1 will be described. The light guide plate for image display 1004 is manufactured by performing the substrate preparation process and the light guide plate manufacturing process described below in order.

(Substrate Preparation Process)

In the substrate preparation process, the evaluation sample 1B made of an acrylic resin and having 60 mm×60 mm×thickness 1 mm obtained in the substrate manufacturing process is washed and dried.

The evaluation sample 1B is ultrasonically cleaned for 5 minutes while being immersed in a 5% aqueous surfactant solution of Semiclean (registered trademark) M-LO (trade name; manufactured by Yokohama Oils & Fats Industry Co., Ltd.), which is a neutral cleaning agent.

Thereafter, the evaluation sample 1B is ultrasonically cleaned for 5 minutes while being immersed in ultrapure water. Further, the evaluation sample 1B is rinsed with ultrapure water, and the evaluation sample 1B is air-dried and then dried in an oven at 100° C. under a nitrogen atmosphere. Thereafter, the air-dried evaluation sample 1B is cleaned with UV ozone for 1 minute with a UV ozone cleaning machine.

Then, the substrate preparation process ends.

(Light Guide Plate Manufacturing Process)

In the light guide plate manufacturing process, the light guide plate for image display 1004 is manufactured using the two evaluation samples 1B.

A seal layer having a width of 5 mm and a thickness of 5 μm is applied to the peripheral edge of the evaluation sample 1B.

The seal layer is not particularly limited as long as the seal layer is made of a transparent material and is able to bond the evaluation samples 1B to each other, but in Example 1, an epoxy-based resin or a silicone-based resin is used.

As a result, an acrylic substrate with a stepped seal layer having an opening portion having a size of 50 mm×50 mm surrounded by the seal layer is prepared.

Thereafter, an acrylic-based photosensitive material is applied on the acrylic substrate as a photopolymer material for a hologram by spin coating. The acrylic-based photosensitive material is applied to have a thickness of 5 μm after drying.

Thereafter, the other evaluation sample 1B is laminated on the seal layer and the acrylic-based photosensitive material, and press-bonded under reduced pressure. The conditions for press bonding are an absolute pressure of 5 kPa, a temperature of 70° C., and a press pressure of 0.04 MPa.

Thereafter, the diffraction grating is recorded on the photopolymer material of the press-bonded laminate. In this process, the temperature of the laminate is maintained at 20° C. The diffraction grating forms interference fringes so that a required diffraction pattern is formed by irradiating the laminate with two laser beams and adjusting each irradiation angle and each intensity thereof. As a result, the diffraction grating is recorded on the photopolymer material.

As a specific diffraction grating, each light in the red, green, and blue wavelength regions incident as image light incident on the incidence portion is diffracted, and a color display diffraction grating to be emitted from the display image emission portion is formed at a position corresponding to the pixels of the image light.

Thereafter, with the laminate kept at 20° C., ultraviolet light (at a wavelength of 365 nm and an irradiance of 80 W/cm$^2$) is fully irradiated for 30 seconds from the direction of one side of the laminate. A high pressure mercury lamp is used as a light source for ultraviolet light.

As a result, the acrylic-based photosensitive material is cured, and the light guide plate for image display 1004 of Example 1 is formed.

Example 2

Example 2 is an example corresponding to the light guide plate for image display 1014 of the first modification example of the first embodiment.

As shown in Table 1, Example 2 is the same as Example 1 except that both sides of the first resin base 1001 in the thickness direction are hard coated.

The evaluation sample 1A of Example 2 is formed by applying a hard coat that will be described later on both sides of the evaluation sample 1A of Example 1 in the thickness direction.

The evaluation sample 1B of Example 2 is manufactured in the same manner as in Example 1 except that the evaluation sample 1A of Example 2 is used instead of the evaluation sample 1A of Example 1. Therefore, unlike the embodiment shown in FIG. 7 of the first modification example, the first hard coat layer 1011A and the second hard coat layer 1011B are also laminated on the second resin base 1003.

Hereinafter, the substrate manufacturing process of Example 2 will be described focusing on the differences from Example 1.
(Substrate Manufacturing Process)

The abbreviations used below will be described.

"C6DA" means 1,6-hexanediol diacrylate (manufactured by Osaka Organic Chemical Industry Ltd., trade name; Viscoat #230).

"U6HA" means a urethane compound obtained by reacting 1 mol of triisocyanate, which is obtained by trimerizing hexamethylene diisocyanate, with 3 mol of 3-acryloyloxy-2-hydroxypropyl methacrylate (manufactured by Shin Nakamura Chemical Co., Ltd., trade name; NK oligo U-6HA).

"M305" means a mixture of pentaerythritol triacrylate and pentaerythritol tetraacrylate (manufactured by Toagosei Co., Ltd., trade name; Aronix (registered trademark) M-305).

60 parts by mass of C6DA, 30 parts by mass of U6HA, 10 parts by mass of M305, 0.5 parts by mass of bis (2,4,6-trimethylbenzoyl)-phenyl-phosphine oxide and 5 parts by mass of 1-hydroxy-cyclohexyl-phenyl-ketone are mixed to prepare a hard coating liquid.

This hard coating liquid is applied on the endless belts 1101 and 1102 of the continuous polymerization device 1100 to a thickness of 20 μm. Thereafter, ultraviolet light is irradiated using a high pressure mercury lamp having an irradiance of 120 W/cm$^2$. Then, the hard coating liquid is cured to form a hard coat on the endless belt.

By polymerizing the resin substrate in the same manner as in Example 1 except that the hard coat is formed on the endless belts 1101 and 1102, a plate-like polymer 1113, which has a thickness of 1 mm and in which the hard coat is laminated on the surface, is obtained.

Evaluation samples 1A and 1B of Example 2 are formed from the plate-like polymer 1113 of Example 2 in the same manner as in Example 1.

Example 3

Example 3 is an example corresponding to the light guide plate for image display 1004 of the basic example of the first embodiment.

As shown in Table 1, Example 3 is the same as Example 1 except that an acrylic plate that has been cut and polished is used as the resin base. The resin base in Example 3 is obtained by processing Acrylite (registered trademark) L, which is a continuous cast acrylic plate having a thickness of 2 mm, to a thickness of 1 mm through cutting and polishing.

Comparative Examples 1 to 3

As shown in Table 1, Comparative Examples 1 to 3 are the same as Example 1 except that a ready-made extruded acrylic plate is used as the resin base. Therefore, the substrate manufacturing process of each comparative example is performed by extrusion molding that differs from manufacturer to manufacturer.

As the resin base in Comparative Example 1, Comoglas (registered trademark) P (trade name; manufactured by Kuraray Co., Ltd.), which is an extruded acrylic plate having a thickness of 3 mm, is used.

As the resin base in Comparative Example 2, Sumipex (registered trademark) E (trade name; manufactured by Sumitomo Chemical Co., Ltd.), which is an extruded acrylic plate having a thickness of 3 mm, is used.

As the resin base in Comparative Example 3, Delaglas (registered trademark) A (trade name; manufactured by Asahi Kasei Corporation), which is an extruded acrylic plate having a thickness of 3 mm, is used.

In each comparative example, evaluation samples 1A and 1B having the same shape as that of Example 1 except that the thickness is 3 mm are prepared.

The light guide plate manufacturing process in each comparative example is performed in the same manner as in Example 1 except that the evaluation sample 1B of each comparative example is used.
<Evaluation Method>

Next, the evaluation methods of Examples 1 to 3 and Comparative Examples 1 to 3 will be described. As the evaluation, the MC value, Ra, the heat shrinkage rate and the sharpness of the display image are evaluated.
(MC Value)

The evaluation of the MC value is performed by the evaluation method described in "Description of Embodiments" of the present specification. As the measurement sample S, the evaluation sample 1A of the examples and comparative examples is used.

As specific evaluation conditions, each of the distances d1 and d2 is 1 m, and the elevation angle $\theta_A$ is 20°.

Since Comparative Examples 1 to 3 have gear marks, the evaluation sample 1A of each comparative example is disposed on the evaluation device 1200 in a posture in which the gear marks face the Y direction.

On the other hand, no gear mark is found in Examples 1 to 3. However, in order to make the directions at the time of production uniform, the evaluation sample 1A of each example is disposed so that the direction orthogonal to the traveling direction in the continuous polymerization device 1100 faces the Y direction.

The measurement area of the brightness distribution is a rectangular region having a width of 180 mm in the vertical direction and a width of 80 mm in the horizontal direction when the Y direction is set as the horizontal direction (the direction in which the line segments AD and BC extend) in the placement of the evaluation sample 1A in the evaluation device 1200 and the direction orthogonal to the horizontal direction on the evaluation sample 1A is set as the vertical direction (the direction in which the line segments AB and DC extend).

The measurement area is provided at each of 41 points, which are shifted by 2 mm in the lateral direction, on the measurement sample S. In each measurement area, the measurement line is selected to divide the measurement area laterally into 40 equal parts.

Table 1 shows the maximum value of the MC value obtained from the brightness distribution of each measurement line in each measurement area.

(Ra)

In the evaluation of Ra, the arithmetic average roughness Ra of the surface of each evaluation sample 1A is measured.

As the measurement device, a white interference type surface shape measurement machine Zygo NewView (registered trademark) 6300 (trade name; manufactured by Zygo Corporation) is used. The magnification of the objective lens is 2.5 times. The observation area is a rectangular area of 2.8 mm×2.1 mm.

(Heat Shrinkage Rate)

The evaluation of the heat shrinkage rate is performed by measuring the dimensional change (shrinkage) based on annex A "Measurement of dimensional change (shrinkage) during heating" of JIS K 6718: 2015.

(Sharpness of Display Image)

The light guide plates for image display of Examples 1 to 3 and Comparative Examples 1 to 3 are attached to an image display device. The image display device is provided with an optical system that causes the image light to be displayed to be incident on the incidence portion of the light guide plate for image display 1004, a drive power supply and a circuit system that supplies image information for obtaining the image light.

As the input image used for the evaluation, a white image and a character display image are used.

The evaluation is performed by visually determining the appearance of the white image and the character display image. As a character image, "ABCDE" having a size of 10 mm×100 mm or less is displayed.

When the rainbow color is not visible in the white image and the characters are clearly visible in the character display image, it is determined that the result is favorable (good, described as "A" in Table 1).

When a slight rainbow color is visible in the white image but the characters are clearly visible in the character display image, it is determined that the result is acceptable (fair, described as "B" in Table 1).

When a rainbow color is visible in at least a part of the white image and the outline of the characters is blurred in the character display image, it is determined that the result is unacceptable (no good, described as "C" in Table 1).

<Evaluation Result>

As shown in Table 1, the MC values of Examples 1 to 3 are 0.074, 0.103, and 0.060, respectively, which are less than 0.120. On the other hand, the MC values of Comparative Examples 1 to 3 are 0.126, 0.183, and 0.148, respectively, which are greater than 0.120.

In Examples 1 to 3, no gear mark was observed, and the MC value was correspondingly less than 0.120. The reason for this is considered to be that the resin base of each example is manufactured by the continuous casting method or cutting and polishing. In the continuous casting method, for example, the surface shapes of the endless belts 1101 and 1102 are transferred to the surface of the raw material of the resin base of each example. Therefore, the flatness of the surface of the resin base is equivalent to the flatness of the endless belts 1101 and 1102. In cutting and polishing, the flatness of the surface of the resin base can be made extremely high.

On the other hand, since the gear marks are observed in Comparative Examples 1 to 3, it is considered that the MC value is increased by the gear marks. The reason why the gear marks are formed in Comparative Examples 1 to 3 is considered to be, for example, that the drive unevenness of the rolls in contact with the extruded material in the extruder is large.

The arithmetic average roughnesses Ra of Examples 1 to 3 are 4.9 nm, 4.7 nm, and 2.6 nm, respectively, which are less than 10 nm. On the other hand, Ra of Comparative Examples 1 to 3 is 5.5 nm, 2.9 nm, and 2.3 nm, respectively, which are less than 10 nm. Therefore, regarding the smoothness represented by Ra, there is no significant difference between Examples 1 to 3 as compared with Comparative Examples 1 to 3.

The shrinkage rates of Examples 1 to 3 are all less than 3%. On the other hand, the heat shrinkage rates of Comparative Examples 1 to 3 are all 3% or more. The reason for this is considered to be that strain is accumulated in the resin base since the resin bases of Comparative Examples 1 to 3 are manufactured by extrusion molding.

The sharpness of the display images of Examples 1 to 3 is determined to be "favorable (A)". On the other hand, the sharpness of the display images of Comparative Examples 1 to 3 is determined to be "unacceptable (C)". The reason for this is considered to be that, in Comparative Examples 1 to 3, since the MC value is greater than those in the examples, the diffraction direction of the image light and the like are disturbed.

For example, Ra of the resin bases of Comparative Examples 2 and 3 is less than that of Examples 1 and 2, and is thus superior in the smoothness of Examples 1 and 2. However, it is considered that this is because the flatness (that is, the MC value) contributes more to sharpness of the display image. At least, when Ra is 10 nm or less, it is considered that there is no significant difference in the magnitude of Ra in terms of sharpness.

Example of Second Embodiment

Hereinafter, examples of the second embodiment will be described.

Tables 2A to 2C below show the configurations and the evaluation results of the resin base and the barrier layer used in Examples 4 to 7 and 12 to 21.

TABLE 2A

| | | Resin base | | | | | | |
|---|---|---|---|---|---|---|---|---|
| | Material | Plate thickness [mm] | Manufacturing method | Hard coat | Manufacturer | MC value | Ra [nm] | Heat shrinkage rate [%] |
| Example 4 | Acrylic resin | 1 | Continuous casting | Both surfaces | Mitsubishi Chemical | 0.099 | 4.6 | Less than 3 |
| Example 5 | Acrylic resin | 1 | Continuous casting | Both surfaces | Mitsubishi Chemical | 0.106 | 4.6 | Less than 3 |
| Example 6 | Acrylic resin | 1 | Continuous casting | Both surfaces | Mitsubishi Chemical | 0.101 | 4.6 | Less than 3 |
| Example 7 | Acrylic resin | 1 | Continuous casting | Both surfaces | Mitsubishi Chemical | 0.100 | 4.6 | Less than 3 |
| Example 12 | Acrylic resin | 1 | Continuous casting | Both surfaces | Mitsubishi Chemical | 0.107 | 4.9 | Less than 3 |
| Example 13 | Acrylic resin | 1 | Continuous casting | Both surfaces | Mitsubishi Chemical | 0.106 | 4.6 | Less than 3 |
| Example 14 | Acrylic resin | 1 | Continuous casting | Both surfaces | Mitsubishi Chemical | 0.104 | 4.8 | Less than 3 |
| Example 15 | Acrylic resin | 1 | Continuous casting | Both surfaces | Mitsubishi Chemical | 0.099 | 4.8 | Less than 3 |
| Example 16 | Acrylic resin | 1 | Continuous casting | Both surfaces | Mitsubishi Chemical | 0.106 | 4.6 | Less than 3 |
| Example 17 | Acrylic resin | 1 | Continuous casting | Both surfaces | Mitsubishi Chemical | 0.104 | 4.9 | Less than 3 |
| Example 18 | Acrylic resin | 1 | Continuous casting | Both surfaces | Mitsubishi Chemical | 0.107 | 4.5 | Less than 3 |
| Example 19 | Acrylic resin | 1 | Continuous casting | Both surfaces | Mitsubishi Chemical | 0.101 | 4.9 | Less than 3 |
| Example 20 | Acrylic resin | 1 | Continuous casting | Both surfaces | Mitsubishi Chemical | 0.107 | 4.8 | Less than 3 |
| Example 21 | Acrylic resin | 1 | Continuous casting | Both surfaces | Mitsubishi Chemical | 0.106 | 4.8 | Less than 3 |

TABLE 2B

| | Barrier layer | | | | |
|---|---|---|---|---|---|
| | Material | Layer thickness [nm] | Placement | Anchor coat | Auxiliary layer |
| Example 4 | DLC | 40 | Surface of hologram layer | No | No |
| Example 5 | Silicon oxide | 50 | Surface of hologram layer | No | No |
| Example 6 | Silicon oxide | 50 | Outer surface of resin base | No | No |
| Example 7 | Silicon oxide | 50 | Outer surface & side surface of resin base | No | No |
| Example 12 | Alumina | 40 | Surfical layer of hologram layer | No | No |
| Example 13 | Silicon oxide | 70 | Surfical layer of hologram layer | No | No |
| Example 14 | Silicon oxide | 140 | Surfical layer of hologram layer | No | No |
| Example 15 | Silicon oxide | 170 | Surfical layer of hologram layer | No | No |
| Example 16 | Silicon oxide | 140 | Surfical layer of hologram layer | No | EVO H-based |
| Example 17 | Silicon oxide | 140 | Surfical layer of hologram layer | No | F-based |
| Example 18 | Silicon oxide | 140 | Surfical layer of hologram layer | Yes | No |
| Example 19 | Silicon oxide | 140 | Surfical layer of hologram layer | Yes | EVO H-based |
| Example 20 | Silicon oxide | 100 | Surfical layer of hologram layer | No | No |
| Example 21 | Silicon oxide | 100 | Surfical layer of hologram layer | Yes | No |

In the column of "auxiliary layer" in Table 2B, "EVOH-based" represents "ethylene vinyl alcohol-based" and "F-based" represents "fluorine-based".

TABLE 2C

|  | Evaluation | | | | |
| --- | --- | --- | --- | --- | --- |
|  | Luminance value (initial) | FOV | Luminance value (after humidification) | Luminance value (after heating) | Sharpness |
| Example 4 | S | S | A | S | A |
| Example 5 | S | A | A | S | A |
| Example 6 | B | B | C | C | C |
| Example 7 | B | B | B | C | C |
| Example 12 | S | A | A | S | A |
| Example 13 | S | A | A | S | A |
| Example 14 | S | A | A | S | A |
| Example 15 | S | A | A | S | A |
| Example 16 | S | A | S | S | A |
| Example 17 | S | A | S | S | A |
| Example 18 | S | A | A | S | A |
| Example 19 | S | A | S | S | A |
| Example 20 | S | A | S | S | A |
| Example 21 | S | A | S | S | A |

Example 4

Example 4 is an example corresponding to the light guide plate for image display 2006 of the basic example of the second embodiment.

As shown in Table 2A, an acrylic resin (PMMA) is used as the material of the first resin base 2001 and the second resin base 2005 ("resin base" in Table 2A).

The shapes of the first resin base 2001 and the second resin base 2005 are both rectangular plates of 60 mm×60 mm×1 mm.

The first barrier layer 2002 and the second barrier layer 2004 ("barrier layer" in Table 2B) of the present example are DLC films having a layer thickness of 40 nm.

The hologram layer 2003 is common to Examples 4 to 7 and 12 to 21. Regarding the material of the hologram layer 2003, 100 parts by mass of bisphenol-based epoxy resin jER (registered trademark) 1007 (polymerization degree n=10.8, epoxy equivalent: 1750 to 2200, trade name manufactured by Mitsubishi Chemical Corporation), 50 parts by mass of triethyleneglycol diacrylate, 5 parts by mass of 4,4'-bis (t-butylphenyl) iodonium hexafluorophosphate, and 0.5 parts by mass of 3,3'-carbonylbis (7-diethyl amino) coumarin are mixed and dissolved in 100 parts by mass of 2-butanone, and are used as photosensitive materials for a hologram. The thickness of the hologram layer 2003 is 5 μm. The size of the hologram layer 2003 in a plan view is 50 mm×50 mm.

Next, the manufacturing process of the light guide plate for image display 2006 according to Example 4 will be described. The light guide plate for image display 2006 is manufactured by performing the substrate preparation process, the barrier layer forming process, and the light guide plate manufacturing process described below in order.

(Substrate Preparation Process)

In the substrate preparation process, the first resin base 2001 and the second resin base 2005 are washed and dried. Hereinafter, when it is not necessary to distinguish between the first resin base 2001 and the second resin base 2005, the reference numerals are omitted and the term "resin base" is simply used.

The resin base is ultrasonically cleaned for 5 minutes while being immersed in a 5% aqueous surfactant solution of Semiclean (registered trademark) M-LO (trade name; manufactured by Yokohama Oils & Fats Industry Co., Ltd.), which is a neutral cleaning agent.

Thereafter, the resin base is ultrasonically cleaned for 5 minutes while being immersed in ultrapure water. Further, the resin base is rinsed with ultrapure water, and the resin base is air-dried and then dried in an oven at 100° C. under a nitrogen atmosphere. Thereafter, the air-dried evaluation sample 2B is washed with UV ozone for 1 minute with a UV ozone cleaning machine.

Then, the substrate preparation process ends.

(Barrier Layer Forming Process)

In the barrier layer forming process, a DLC film is formed on the surface of the resin base.

The resin base is disposed in a plasma chemical vapor deposition apparatus equipped with a space volume of 350 $cm^3$, a high-frequency power supply (13.56 MHz), and an internal electrode (φ10 mm) (also used as a gas introduction tube, tip pore φ1 mm). With such a configuration, vacuum exhaust is performed. After the pressure of the plasma chemical vapor deposition apparatus reaches 15 Pa, a 2:1 mixed gas of high-purity acetylene and tetramethylsilane is introduced at a flow rate of 45 sccm. Then, a DLC film having a film thickness of 40 nm is formed under conditions of a plasma generation set power of 100 W and a film formation time of 0.8 seconds.

Then, the barrier layer forming process ends.

Hereinafter, the resin base on which the barrier layer is formed is referred to as an intermediate laminate.

(Light Guide Plate Manufacturing Process)

In the light guide plate manufacturing process, the light guide plate for image display 2006 is manufactured by using the two intermediate laminates.

A seal layer having a width of 5 mm and a thickness of 5 μm is applied to the peripheral edge of the barrier layer of one of the intermediate laminates.

The seal layer is not particularly limited as long as the seal layer is made of a transparent material and is able to bond the barrier layers of the intermediate laminates to each other. However, in Example 3, a photoadhesive Hard Rock (registered trademark) OP-1045K (trade name; manufactured by Denka Company Limited) is used.

As a result, an intermediate laminate with a stepped seal layer having an opening portion having a size of 50 mm×50 mm surrounded by the seal layer is prepared.

Thereafter, the above-mentioned photosensitive material is applied onto the intermediate laminate as a photopolymer material for a hologram by spin coating. The photosensitive material is applied to have a thickness of 5 μm after drying.

Thereafter, the other intermediate laminate is laminated on the seal layer and the photosensitive material so that the barrier layer faces the barrier layer of the intermediate laminate with the seal layer, and is press-bonded under reduced pressure. The conditions for press bonding are an absolute pressure of 5 kPa, a temperature of 70° C., and a press pressure of 0.04 MPa.

Thereafter, the diffraction grating is recorded on the photosensitive material of the press-bonded laminate. In this process, the temperature of the laminate is maintained at 20° C. The diffraction grating forms interference fringes so that a required diffraction pattern is formed by irradiating the laminate with two laser beams and adjusting each irradiation angle and each intensity thereof. As a result, the diffraction grating is recorded on the photosensitive material.

As a specific diffraction grating, light in each of the red, green and blue wavelength regions incident as image light incident on the incidence portion is diffracted, and a color display diffraction grating to be emitted from the display portion is formed at a position corresponding to the pixels of the image light.

Thereafter, with the laminate kept at 20° C., ultraviolet light (at a wavelength of 365 nm and an irradiance of 80 W/cm$^2$) is fully irradiated for 30 seconds from the direction of one side of the laminate. A high pressure mercury lamp is used as a light source for ultraviolet light.

As a result, the seal layer is cured, and the light guide plate for image display 2006 of Example 3 is formed.

Example 5

Example 5 has the same configuration as Example 4 except that each DLC film is formed of a silicon oxide having a thickness of 10 nm.

Hereinafter, the substrate manufacturing process of Example 5 will be described focusing on the differences from Example 4.

The light guide plate for image display 2006 of Example 5 is manufactured by performing the same substrate preparation process as in Example 4, the barrier layer forming process described below and the same light guide plate manufacturing process as in Example 4 in that order.
(Barrier Layer Forming Process)

In the barrier layer forming process of the present example, a silicon oxide thin film layer is formed on the surface of the resin base.

After the resin base is placed in the vacuum vapor deposition apparatus, the silicon oxide is vacuum-deposited. The ultimate vacuum degree of the chamber of the vacuum vapor deposition apparatus is 1.0×10$^{-4}$ Torr. Under this vacuum, silicon monoxide having a purity of 99.9% is heated and evaporated by a high-frequency induction heating method to form a silicon oxide thin film having a thickness of 50 nm on the surface of the resin base. As a result, an intermediate laminate in which a silicon oxide thin film layer is formed can be obtained.

Then, the barrier layer forming process ends.

The light guide plate manufacturing process of the present example is the same as the light guide plate manufacturing process of Example 4 except that the intermediate laminate formed in the barrier layer forming process described above is used. Therefore, the description thereof will not be repeated.

Examples 6 and 7

As shown in Table 2A, Examples 6 and 7 are the same as Example 5 except that the placement of the barrier layer is different.

Figure 12:
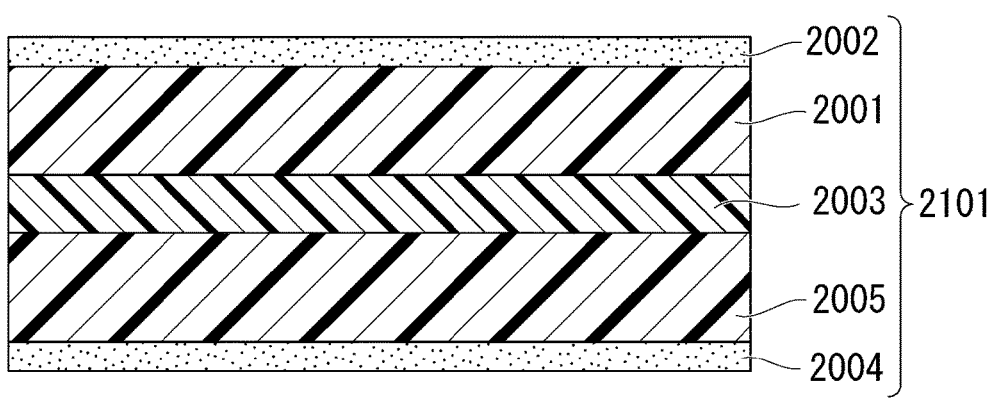
FIG. 12 is a schematic cross-sectional view showing a light guide plate for image display according to Example 5.
Figure 13:
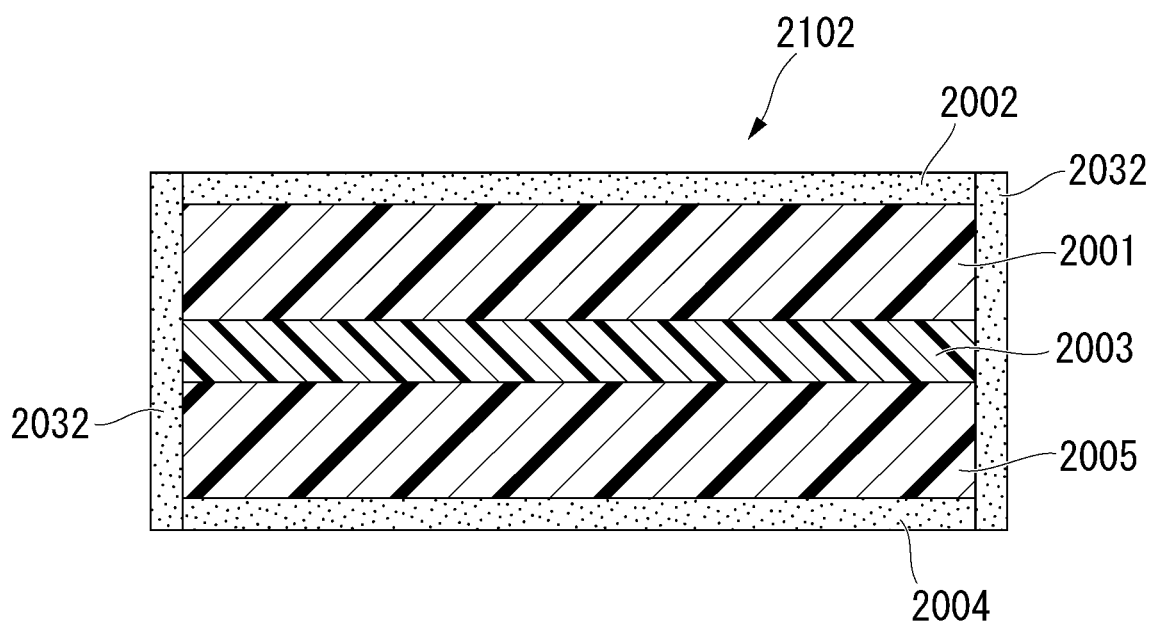
FIG. 13 is a schematic cross-sectional view showing a light guide plate for image display according to Example 6.

FIG. 12 is a schematic cross-sectional view showing the light guide plate for image display of Example 6. FIG. 13 is a schematic cross-sectional view showing the light guide plate for image display of Example 7.

Hereinafter, the points different from those of Example 5 will be mainly described.

As shown in FIG. 12, in the light guide plate for image display 2101 of Example 6, the first barrier layer 2002, the first resin base 2001, the hologram layer 2003, the second resin base 2005 and the second barrier layer 2004 are laminated in that order.

As the first barrier layer 2002 and the second barrier layer 2004, the same silicon oxide thin film layer having a thickness of 50 nm as in Example 5 is used.

In order to manufacture the light guide plate 2101 for image display, an intermediate laminate is formed in the same manner as in Example 5. Thereafter, a seal layer is provided on the resin base of one intermediate laminate, and the photosensitive material is applied. Then, the other intermediate laminate is laminated so that the resin bases face each other. Thereafter, the light guide plate 2101 for image display is manufactured by performing the same decompression press and forming of the diffraction grating as in Example 5.

As shown in FIG. 13, the light guide plate for image display 2102 of Example 7 is the same as in Example 6 except that a third barrier layer 2032 is provided. The third barrier layer 2032 covers the entire side surface (outer peripheral surface in the direction orthogonal to the thickness direction) of the light guide plate for image display 2101 of Example 6.

The third barrier layer 2032 is made of a silicon oxide thin film layer similar to the first barrier layer 2002 of Example 6.

The light guide plate for image display 2102 is manufactured by manufacturing the light guide plate for image display 2101 and then forming a silicon oxide thin film layer on the side surface thereof.

Example 12

Example 12 has the same configuration as Example 4 except that each DLC film is made of alumina having a thickness of 40 nm.

Hereinafter, the substrate manufacturing process of Example 12 will be described focusing on the differences from Example 4.

The light guide plate for image display 2006 of Example 12 is manufactured by performing the same substrate preparation process as in Example 4, the barrier layer forming process described below and the light guide plate manufacturing process of Example 4 in that order.
(Barrier Layer Forming Process)

In the barrier layer forming process of this example, an alumina film is formed on the surface of the resin base.

Vacuum exhaust is performed by arranging an appropriate amount of alpha alumina particles having a purity of 99.999% and a particle size of 2 mm as a resin base and a vapor deposition source in the electron beam vapor deposition apparatus. The distance from the vapor deposition source to the shutter is about 8 cm. The distance from the vapor deposition source to the surface of the resin base is about 35 cm.

After the pressure of the electron beam vapor deposition apparatus reaches 3×10$^{-3}$ Pa, the filament current of the electron beam is raised to about 35 mA, and the shutter is opened. Then, alumina film formation is performed. When the temperature of the wall surface in the device reaches 50° C., the shutter is closed and the filament current of the electron beam is stopped. After cooling to 30° C. or lower, the filament current of the electron beam is raised to about 35 mA, the vapor deposition source is heated, and the shutter is opened. Then, alumina film formation is performed. This procedure is repeated to form an alumina film having a film thickness of 40 nm.

The light guide plate manufacturing process of the present example is the same as the light guide plate manufacturing process of Example 4 except that the intermediate laminate formed in the barrier layer forming process described above is used. Therefore, the description thereof will not be repeated.

Example 13

Example 13 has the same configuration as Example 4 except that each DLC film is formed of a silicon oxide having a thickness of 70 nm.

Hereinafter, the substrate manufacturing process of Example 13 will be described focusing on the differences from Example 4.

The light guide plate for image display 2006 of Example 13 is manufactured by performing the same substrate preparation process as in Example 4, the barrier layer forming process described below and the same light guide plate manufacturing process as in Example 4 in that order.
(Barrier Layer Forming Process)

In the barrier layer forming process of this example, a silicon oxide is formed on the surface of the resin base. The resin base is placed in a plasma chemical vapor deposition apparatus equipped with a high-frequency power supply (13.56 MHz) to perform vacuum exhaust. After the pressure of the plasma chemical vapor deposition apparatus reaches 1 Pa, the tetraethoxysilane (TEOS) gas generated by bubbling of helium gas is introduced at a flow rate of 6 sccm, and oxygen gas is introduced at a flow rate of 95 sccm. Then, under a condition of the plasma generation set power of 250 W, a silicon oxide film having a film thickness of 70 nm is formed.

Then, the barrier layer forming process ends.

The light guide plate manufacturing process of the present example is the same as the light guide plate manufacturing process of Example 4 except that the intermediate laminate formed in the barrier layer forming process described above is used. Therefore, the description thereof will not be repeated.

Example 14

Example 14 has the same configuration as Example 4 except that the silicon oxide film is formed of silicon oxide having a thickness of 140 nm.

Hereinafter, the substrate manufacturing process of Example 14 will be described focusing on the differences from Example 4.

The light guide plate for image display 2006 of Example 14 is manufactured by performing the same substrate preparation process as in Example 4, the barrier layer forming process described below and the same light guide plate manufacturing process as in Example 4 in that order.
(Barrier Layer Forming Process)

In the barrier layer forming process of this example, a silicon oxide is formed on the surface of the resin base. The resin base is placed in a plasma chemical vapor deposition apparatus equipped with a high-frequency power supply (13.56 MHz) to perform vacuum exhaust. After the pressure of the plasma chemical vapor deposition apparatus reaches 1 Pa, the TEOS gas generated by bubbling of helium gas is introduced at a flow rate of 6 sccm, and oxygen gas is introduced at a flow rate of 95 sccm. Then, under a condition of the plasma generation set power of 250 W, a silicon oxide film having a film thickness of 140 nm is formed.

Then, the barrier layer forming process ends.

The light guide plate manufacturing process of the present example is the same as the substrate manufacturing process of Example 4 except that the intermediate laminate formed in the barrier layer forming process described above is used. Therefore, the description thereof will not be repeated.

Example 15

Example 15 has the same configuration as Example 4 except that the silicon oxide film is formed of silicon oxide having a thickness of 170 nm.

Hereinafter, the substrate manufacturing process of Example 15 will be described focusing on the differences from Example 4.

The light guide plate for image display 2006 of Example 15 is manufactured by performing the same substrate preparation process as in Example 4, the barrier layer forming process described below and the same light guide plate manufacturing process as in Example 4 in that order.
(Barrier Layer Forming Process)

In the barrier layer forming process of this example, a silicon oxide is formed on the surface of the resin base. The resin base is placed in a plasma chemical vapor deposition apparatus equipped with a high-frequency power supply (13.56 MHz) to perform vacuum exhaust. After the pressure of the plasma chemical vapor deposition apparatus reaches 1 Pa, the TEOS gas generated by bubbling of helium gas is introduced at a flow rate of 6 sccm, and oxygen gas is introduced at a flow rate of 95 sccm. Then, under a condition of the plasma generation set power of 250 W, a silicon oxide film having a film thickness of 170 nm is formed.

Then, the barrier layer forming process ends.

The light guide plate manufacturing process of the present example is the same as the substrate manufacturing process of Example 4 except that the intermediate laminate formed in the barrier layer forming process described above is used. Therefore, the description thereof will not be repeated.

Example 16

Example 16 has the same configuration as Example 14 except that the barrier layer has an auxiliary layer.

Hereinafter, the substrate manufacturing process of Example 16 will be described focusing on the differences from Example 14.

The light guide plate for image display 2006 of Example 16 is manufactured by performing the same substrate preparation process as in Example 4, the barrier layer forming process described below and the same light guide plate manufacturing process as in Example 4 in that order.
(Barrier Layer Forming Process)

In the barrier layer forming process of this example, an auxiliary layer is formed on the surface of the inorganic material layer produced by the same method as in Example 14. An auxiliary coating agent 1 was prepared by adding N-phenyl-3-aminopropyltrimethoxysilane (KBM-573, Shin-Etsu Chemical Co., Ltd.) to an aqueous solution of an ethylene-vinyl alcohol copolymer so that the solid content concentration is 10% by weight based on the total solid content in the protective coating. The auxiliary coating agent 1 is applied to the surface of the inorganic material layer and dried to form an auxiliary layer having a thickness of 0.5 μm.

Then, the barrier layer forming process ends.

The light guide plate manufacturing process of the present example is the same as the substrate manufacturing process of Example 4 except that the barrier layer having the multilayer structure formed in the barrier layer forming process described above is used. Therefore, the description thereof will not be repeated.

Example 17

Example 17 has the same configuration as Example 14 except that the barrier layer has a fluorine-based waterproof/moisture-proof coat layer as an auxiliary layer.

Hereinafter, the substrate manufacturing process of Example 17 will be described focusing on the differences from Example 14.

The light guide plate for image display 2006 of Example 17 is manufactured by performing the same substrate preparation process as in Example 4, the barrier layer forming process described below and the same light guide plate manufacturing process as in Example 4 in that order.
(Barrier Layer Forming Process)

In the protective layer forming process of this example, a fluorine-based waterproof/moisture-proof coat layer is formed on the surface of the barrier layer produced by the same method as in Example 14.

Then, the barrier layer forming process ends.

The substrate manufacturing process of the present example is the same as the substrate manufacturing process of Example 4 except that the barrier layer having the multilayer structure formed in the barrier layer forming process described above is used, and thus the description thereof will not be repeated.

Example 18

Example 18 has the same configuration as Example 14 except that the anchor coat layer is disposed between the barrier layer and the resin base.

Hereinafter, the substrate manufacturing process of Example 18 will be described focusing on the differences from Example 14.

The light guide plate for image display 2006 of Example 18 is manufactured by performing the same substrate preparation process as in Example 14, an anchor coat layer forming process and the barrier layer forming process described below, and the same light guide plate manufacturing process as in Example 4 in that order.
(Anchor Coat Layer Forming Process)

In the anchor coat layer forming process of the present example, the anchor coat layer is formed on the surface of the resin base. A saturated polyester (Byron 300 manufactured by Toyobo Co., Ltd.) and an isocyanate compound (Coronate L manufactured by Tosoh Corporation) were blended in a mass ratio of 1:1, thereby preparing an anchor coating agent. The anchor coating agent was applied to the corona-treated surface of the resin base and dried to form an anchor coating layer having a thickness of 100 nm.

Then, the anchor coating layer process ends.
(Barrier Layer Forming Process)

A barrier layer is formed on the anchor coat layer in the same manner as in Example 14.

The light guide plate manufacturing process of the present example is the same as the substrate manufacturing process of Example 4 except that the intermediate laminate formed in the anchor coat layer forming process and the barrier layer forming process described above is used. Therefore, the description thereof will not be repeated.

Example 19

Example 19 has the same configuration as Example 16 except that the anchor coat layer is disposed between the barrier layer and the resin base.

Hereinafter, the substrate manufacturing process of Example 19 will be described focusing on the differences from Example 16.

The light guide plate for image display 2006 of Example 19 is manufactured by performing the same substrate preparation process as in Example 4, the anchor coat layer forming process, the inorganic material layer forming process, the barrier layer forming process described below and the same light guide plate manufacturing process as in Example 4 in that order.
(Anchor Coat Layer Forming Process)

An anchor coat layer is formed on the surface of the resin base in the same manner as in Example 18.
(Inorganic Material Layer Forming Process)

An inorganic material layer is prepared on the anchor coat layer in the same manner as in Example 14.
(Barrier Layer Forming Process)

An auxiliary layer is prepared on the surface of the inorganic material layer in the same manner as in Example 16 to form a barrier layer.

The light guide plate manufacturing process of this example is the same as the substrate manufacturing process of Example 4 except that the intermediate laminate formed in the anchor coat layer forming process, the inorganic material layer forming process and the barrier layer forming process described above are used. Therefore, the description thereof will not be repeated.

Example 20

Example 20 has the same configuration as Example 4 except that each silicon oxide film is formed of a silicon oxide having a thickness of 100 nm formed by a sputtering method.

Hereinafter, the substrate manufacturing process of Example 20 will be described focusing on the differences from Example 4.

The light guide plate for image display 2006 of Example 20 is manufactured by performing the same substrate preparation process as in Example 4, the barrier layer forming process described below and the same light guide plate manufacturing process as in Example 4 in that order.
(Barrier Layer Forming Process)

In the barrier layer forming process of the present example, a silicon oxide film is formed on the surface of the resin base. The silicon oxide film having a film thickness of 100 nm is formed under a vacuum pressure of $4.0 \times 10^{-5}$ Torr by the sputtering method.

The light guide plate manufacturing process of the present example is the same as the substrate manufacturing process of Example 4 except that the intermediate laminate formed in the barrier layer forming process described above is used. Therefore, the description thereof will not be repeated.

Example 21

Example 21 has the same configuration as Example 20 except that the anchor coat layer is disposed between the barrier layer and the resin base.

Hereinafter, the substrate manufacturing process of Example 21 will be described focusing on the differences from Example 20.

The light guide plate for image display 2006 of Example 21 is manufactured by performing the same substrate preparation process as in Example 20, the same anchor coat layer forming process as in Example 18, the barrier layer forming process described below and the same light guide plate manufacturing process as in Example 20 in that order.

(Barrier Layer Forming Process)

A barrier layer is formed on the anchor coat layer in the same manner as in Example 20.

The light guide plate manufacturing process of the present example is the same as the substrate manufacturing process of Example 20 except that the intermediate laminate formed in the barrier layer forming process described above is used. Therefore, the description thereof will not be repeated.

<Evaluation Method>

Next, the evaluation method of each example will be described. As the evaluation, the luminance value measurement, the FOV evaluation, and the sharpness evaluation of the display image are performed.

(Luminance Value)

As the measurement samples of the luminance value, three types of the sample subjected to a humidification test ("after humidification" in Table 2C), the sample subjected to a heating test ("after heating" in Table 2C), and the sample not subjected to the humidification test or the heating test ("initial stage" in Table 2C) are prepared.

A small environmental tester SH-241 (trade name; manufactured by ESPEC CORP.) is used for the humidification test and the heating test.

The test conditions for the humidification test are 60° C., 90% RH, and 500 hours.

The test conditions for the heating test are 85° C. and 500 hours.

The luminance value of the measurement sample is determined based on the measurement method described above in the embodiment.

Each measurement sample is assembled in the above-mentioned display device.

As the luminance meter 2014, a luminance meter BM-8 (trade name; manufactured by Topcon Corporation) is used. The measurement angle is 1°. The distance d from the display surface 2003$a$ is 15 mm.

When the luminance value is 3500 nits or more, it is determined that the result is very favorable (very good, described as "S" in Table 2C).

When the luminance value is 3000 nits or more and less than 3500 nits, it is determined that the result is favorable (good, described as "A" in Table 2C).

When the luminance value is 1000 nits or more and less than 3000 nits, it is determined that the result is acceptable (fair, described as "B" in Table 2C).

When the luminance value is less than 1000 nits, it is determined that the result is unacceptable (no good, described as "C" in Table 2C).

(FOV)

The FOV is measured by using a display device assembled from the measurement samples of the luminance value, which are not subjected to the humidification test or the heating test.

The measurement of FOV is performed based on the measurement method described above in the embodiment.

As the luminance meter 2014, a luminance meter BM-8 (trade name; manufactured by Topcon Corporation) is used. The measurement angle is 1°. The distance d from the display surface 2003$a$ is 15 mm.

When the FOV is 45° or more, it is determined that the result is very favorable (very good, described as "S" in Table 2C).

When the FOV is 35° or more and less than 45°, it is determined that the result is favorable (good, described as "A" in Table 2C).

When the FOV is 24° or more and less than 35°, it is determined that the result is acceptable (fair, described as "B" in Table 2C).

When the FOV is less than 24°, it is determined that the result is unacceptable (no good, described as "C" in Table 2C).

(Sharpness)

The sharpness of the display image is evaluated by using the display device used for the FOV measurement.

As the input image used for the evaluation, a white image and a character display image are used.

The evaluation is performed by visually determining the appearance of the white image and the character display image. As a character image, "ABCDE" within 10 mm 100 mm is displayed.

When the rainbow color is not visible in the white image and the characters are clearly visible in the character display image, it is determined that the result is favorable (good, described as "A" in Table 2C).

When a slight rainbow color is visible in the white image but the characters are clearly visible in the character display image, it is determined that the result is acceptable (fair, described as "B" in Table 2C).

When a rainbow color is visible in at least a part of the white image and the outline of the characters is blurred in the character display image, it is determined that the result is unacceptable (no good, described as "C" in Table 2C).

<Evaluation Result>

As shown in Table 2C, the luminance values of Examples 4 and 5 and Examples 12 to 21 are all evaluated as "S" or "A" regardless of the presence or absence of the humidification test and the heating test.

It is considered that the reason for this is as follows. In these examples, the barrier layer prevents the moisture from permeating into the hologram layer and suppresses the hologram layer from eroding the resin base. As a result, the diffraction performance of the hologram layer is favorable. In addition, there is no disturbance of the optical path in the resin substrate.

Further, in these examples, the hologram layer is not in contact with the resin base. Therefore, the material of the hologram layer does not erode the resin base even when heated.

On the other hand, the luminance values of Examples 5 and 6 are inferior to those of Examples 4 and 5 and Examples 12 to 21 in the measurement samples after either the humidification test or the heating test. However, when humidification test and heating test are not performed, the result is evaluated as "B", which is a practical level.

As shown in Table 2C, each of the FOVs of Examples 4 and 5 and Examples 12 to 21 is evaluated as each of "S" or "A".

On the other hand, the FOVs of Examples 6 and 7 were evaluated as "B", which were a practical level.

The reason for this is considered to be the same as the reason for the difference in the luminance value evaluation described above. That is, in Examples 4 and 5 and Examples 12 to 21, the barrier layer prevents permeation of the moisture into the hologram layer and erosion into the resin base at a very high level. As a result, no decrease in FOV is observed.

It is considered that the reason why the FOV of Example 4 is even better than that of the FOV of Example 5 is due to the difference in the material of the barrier layer. The DLC film has a higher refractive index than the silicon oxide thin film layer. Therefore, it is considered that the FOV becomes large and becomes favorable.

Further, sharpness of the display images of each of Examples 4 and 5 and Examples 12 to 21 ("sharpness" in Table 2C) was determined to be "A", which is more favorable than that of Examples 6 and 7.

The reason for this is considered to be the same as the reason for the difference in the luminance value evaluation described above. That is, in Examples 4 and 5 and Examples 12 to 21, the barrier layer prevents the penetration of moisture into the hologram layer and the erosion into the resin base at a very high level. As a result, a clear image is observed.

Example of Third Embodiment

Hereinafter, examples of the third embodiment will be described.

Example 8

(Preparation of First Substrate and Second Substrate)

In a state where two acrylic resin substrates (manufactured by Mitsubishi Chemical Corporation) processed to 60 mm×60 mm×1 mm (thickness) have been immersed in a 5% aqueous surfactant solution of Semiclean M-LO (manufactured by Yokohama Oils & Fats Industry Co., Ltd.), ultrasonic cleaning is performed for 5 minutes. Then, ultrasonic cleaning is performed for 5 minutes while the substrates are immersed in ultrapure water. Further, the substrates are rinsed with ultrapure water, air-dried, and then dried in an oven at 100° C. under a nitrogen atmosphere. Then, the air-dried substrates are subjected to UV ozone cleaning for 1 minute with a UV ozone cleaning machine to obtain a first substrate and a second substrate.

(Formation of Hologram Layer)

The hologram layer is common to each example. Regarding the material of the hologram layer, 100 parts by mass of bisphenol-based epoxy resin (polymerization degree n=10.8, epoxy equivalent: 1750 to 2200, trade name jER 1007 manufactured by Mitsubishi Chemical Corporation), 50 parts by mass of triethyleneglycol diacrylate, 5 parts by mass of 4,4'-bis (t-butylphenyl) iodonium hexafluorophosphate and 0.5 parts by mass of 3,3'-carbonylbis (7-diethylamino) coumarin are mixed and dissolved in 100 parts by mass of 2-butanone, and are used as photosensitive materials for a hologram.

A seal layer having a width of 5 mm and a thickness of 5 µm is applied to the peripheral edge of the second substrate. The photosensitive material serving as a hologram layer is applied to an opening portion of 50 mm×50 mm surrounded by a seal layer by spin coating so that the thickness after drying is 5 µm. After the photosensitive material is dried, the first substrates are laminated and press-bonded under reduced pressure (absolute pressure 5 kPa, temperature 70° C., press pressure 0.04 MPa).

The first substrate and the second substrate in which the photosensitive material is sealed are kept at 20° C. and irradiated with two laser beams. By adjusting the irradiation angle and intensity of each laser beam, interference fringes due to the interference are formed, and a desired diffraction grating is recorded on the photosensitive material to form a hologram layer.

(Preparation of Hard Coat Film)

As a film base, a polyethylene terephthalate biaxially stretched film (product name "Diafoil T612 type", thickness: 50 µm) manufactured by Mitsubishi Chemical Corporation is prepared.

A curable composition for forming a hard coat layer is prepared using an organic/inorganic hybrid UV curable resin composition (UVHC7800G manufactured by MOMENTIVE, inorganic silica content having a reactive functional group: 30% to 40% by mass). The refractive index of the cured resin layer obtained by curing this composition is 1.54.

The curable composition is applied to the second surface of the film base with a bar coater so that the film thickness becomes 3 µm, and the film is dried by heating at 90° C. for 1 minute. Thereafter, a high pressure mercury lamp (80 W/cm$^2$) is used to irradiate ultraviolet rays of 400 mJ/cm$^2$ with an integrated amount of light to form a hard coat layer.

Next, a coating liquid for forming a release layer having the following composition is applied onto the hard coat layer and dried to form a release layer. The thickness of the obtained release layer is 500 nm.

Release agent Long-chain alkyl group-containing alkyd resin (Hitachi Kasei Co., Ltd. "Tessfine" 303) 10 parts by mass (in terms of solid content)

Acid catalyst p-toluenesulfonic acid (Hitachi Kasei Co., Ltd. "Dryer" 900) 0.12 parts by mass (in terms of solid content)

Solvent toluene 45 parts by mass

Next, the adhesive forming composition is applied to the first surface of the film base so that the film thickness becomes 0.5 µm after drying, and dried to form an adhesive layer.

The adhesive forming composition is prepared as follows.

1.85 g of isocyanate-based cross-linking agent (L-45 manufactured by Soken Chemical & Engineering Co., Ltd.) and 0.5 g of epoxy-based cross-linking agent (E-5XM manufactured by Soken Chemical & Engineering Co., Ltd.) are added to 1 kg of an adhesive solution (SK Dyne 1882 manufactured by Soken Chemical & Engineering Co., Ltd., solid content concentration of about 17%) consisting of an acrylic copolymer. Then, the components are uniformly mixed.

The light guide plate for image display of Example 8 is obtained by joining the adhesive layer of the obtained hard coat film to the first substrate and attaching the hard coat film to the first substrate.

Example 9

Example 9 differs only in the composition of the hard coat film. The preparation mode of the hard coat film is shown below.

A release layer, a hard coat layer, and an adhesive layer are formed on a process release film ("MRA100" manufactured by Mitsubishi Chemical Holdings, Inc., thickness 100 µm) in the same manner as described above. Then, the adhesive layer is bonded to the first substrate. After the irradiation with ultraviolet rays, the release film for the process is peeled off to obtain the light guide plate for image display of Example 9.

<Evaluation Method>

The following evaluation is performed for each example.

(Sharpness of Image Display)

Three light guide plates of each example are prepared. A hologram layer is formed on each light guide plate to diffract light in each of the red, green and blue wavelength regions. Then, the three light guide plates are laminated. An image display device, an optical system for inputting displayed information to the light guide plate, and a circuit system for supplying a drive power source, image information, and the like are attached to the laminated light guide plates to assemble the image display device according to each example.

An image in which characters are written on a white background is displayed on the light guide plate. The display image is visually evaluated from the first substrate side, and the sensitivity is evaluated in the following three stages.

A (good): There is no rainbow-colored portion in the image, and the characters are clearly visible.

B (average): There are a few portions of the image that look rainbow-colored, but the characters are clearly visible.

C (bad): There is a clear rainbow-colored portion in the image, and the outline of the characters looks blurry.

The sharpness is evaluated before and after the scratch resistance evaluation shown below. In Examples 8 and 9, the hard coat film is peeled off after the scratch resistance evaluation, and the evaluation is performed after attaching a new hard coat film.

(Scratch Resistance)

A steel wool #0000 attached to the cross section of a cylinder having a diameter of 11 mm is reciprocated 10 times at a load of 400 g and 100 mm/sec with respect to the outermost surface of the hard coat film or hard coat layer in the image display device of each example. Then, the state of the surface of the hard coat film or the hard coat layer is observed within the test range of 100 mm in length and 20 mm in width, and the determination is made in the following three stages.
  A (good): No scratches
  B (average): Fewer than 20 scratches
  C (bad): 20 or more scratches (Drop Resistance)

A hard ball having a diameter of 50 mm and a weight of 230 g is dropped and collides with the outermost surface side of the image display device of each example. Thereafter, the cracks of the first substrate and the second substrate are confirmed. The evaluation is made in the following two stages.
  A (good): No cracks are found on either the first substrate or the second substrate.
  C (bad): Cracks are observed on at least one of the first substrate and the second substrate.

(Pencil Hardness)

The pencil hardness of the surface to be measured is measured with a load of 750 g according to JIS K 5600-5-4: 1999.

The evaluation results are shown in Table 3.

TABLE 3

| | Resin base | | | | | Evaluation | | | | |
| | Material | Plate thickness [mm] | Hard coat | Manufacturer | MC value | Sharpness (before scratch resistance evaluation) | Sharpness (after scratch resistance evaluation) | Scratch resistance evaluation | Drop resistance | Pencil hardness |
| --- | --- | --- | --- | --- | --- | --- | --- | --- | --- | --- |
| Example 8 | Acrylic resin | 1 | No release film used | Mitsubishi Chemical | 0.100 | A | A | A | A | 2H |
| Example 9 | Acrylic resin | 1 | Release film used | Mitsubishi Chemical | 0.101 | A | A | A | A | 2H |

In Examples 8 and 9, the hard coat film or the hard coat layer is scratched in the scratch resistance evaluation. This scratch can be prevented from deteriorating the sharpness by replacing the hard coat film. Since the light guide plate for image display of each example does not crack the resin substrate in the evaluation of drop resistance, the safety when applied to a glasses-type display is enhanced.

In the light guide plate according to the third embodiment of the present invention, the second substrate may be made of glass, for example, instead of a resin. Even with such a configuration, the weight can be reduced and the safety of the wearer can be enhanced by configuring the glasses-type display with the first substrate facing the wearer side.

In the light guide plate according to the present invention, a hard coat film may be attached to the second substrate as well. At this time, the configuration of the hard coat film and the number of stacked sheets may differ between the first substrate and the second substrate.

Example of Fourth Embodiment

Hereinafter, Examples 9 and 10 of the fourth embodiment will be described. The present invention is not limited by these examples.

Table 4 below shows the configurations of the resin base and the absorption layer of each example, and the evaluation results.

TABLE 4

| | Resin base | | | | Absorption layer | | | Sharpness evaluation | | | |
| | | | | | | | | Display image | | External light image | |
| | Material | Plate thickness [mm] | Manufacturer | MC value | Base resin | Coloring material | Layer thickness [μm] | Placement | Before weather resistance test | After weather resistance test | Before weather resistance test | After weather resistance test |
|---|---|---|---|---|---|---|---|---|---|---|---|---|
| Example 10 | Acrylic resin | 1 | Mitsubishi Chemical | 0.100 | Yupimer (registered trademark) UV-HH2100 | Diaresin (registered trademark) Blue | 5 | One surface (display side) | A | A | A | A |
| Example 11 | Acrylic resin | 1 | Mitsubishi Chemical | 0.101 | Yupimer (registered trademark) UV-HH2100 | Diaresin (registered trademark) Blue | 5 | Both surfaces | A | A | S | A |

Example 10

Example 10 is an example corresponding to the light guide plate for image display 4005 of the fourth embodiment.

As shown in Table 4, an acrylic resin (PMMA) is used as the material of the first resin base 4001 and the second resin base 4003 ("resin base" in Table 4).

The shapes of the first resin base 4001 and the second resin base 4003 are both 60 mm×60 mm×1 mm rectangular plates.

The hologram layer 4002 is common to each example. Regarding the material of the hologram layer 4002, 100 parts by mass of bisphenol-based epoxy resin jER (registered trademark) 1007 (polymerization degree n=10.8, epoxy equivalent: 1750 to 2200, trade name manufactured by Mitsubishi Chemical Corporation), 50 parts by mass of triethyleneglycol diacrylate, 5 parts by mass of 4,4'-bis(t-butylphenyl) iodonium hexafluorophosphate and 0.5 parts by mass of 3,3'-carbonylbis (7-diethylamino) coumarin are mixed and dissolved in 100 parts by mass of 2-butanone, and are used as photosensitive materials for a hologram. The thickness of the hologram layer 4002 is 5 μm. The size of the hologram layer 4002 in a plan view is 50 mm×50 mm.

Next, the manufacturing process of the light guide plate for image display 4005 in Example 10 will be described. The light guide plate for image display 4005 is manufactured by performing the substrate preparation process, the absorption layer forming process and the light guide plate manufacturing process described below in that order.

(Substrate Preparation Process)

In the substrate preparation process, the first resin base 4001 and the second resin base 4003 are washed and dried. Hereinafter, when not necessary to distinguish between the first resin base 4001 and the second resin base 4003, the reference numerals are omitted and the term "resin base" is simply used.

The resin base is ultrasonically cleaned for 5 minutes while being immersed in a 5% aqueous surfactant solution of Semiclean (registered trademark) M-LO (trade name; manufactured by Yokohama Oils & Fats Industry Co., Ltd.), which is a neutral cleaning agent.

Thereafter, the resin base is ultrasonically cleaned for 5 minutes while being immersed in ultrapure water. Further, the resin base is rinsed with ultrapure water, and the resin base is air-dried and then dried in an oven at 100° C. under a nitrogen atmosphere. Thereafter, the air-dried evaluation sample B is cleaned with UV ozone for 1 minute with a UV ozone cleaning machine.

Then, the substrate preparation process ends.

(Absorption Layer Forming Process)

In the absorption layer forming process, the first absorption layer 4004 ("absorption layer" in Table 4) is formed on the surface of the first resin base 4001.

5 parts by mass of a photopolymerization initiator are added to 100 parts by mass of acrylate (Yupimer (registered trademark) UV-HH2100 (trade name; manufactured by Mitsubishi Chemical Corporation)), and 0.05 parts by mass of Diaregin (registered trademark) blue are further added thereto as a coloring material, thereby preparing a curable resin composition (coating liquid).

This curable resin composition is applied onto the first resin base 4001 using a metal bar coater, dried at 90° C. for 1 minute, and then exposed to an exposure amount of 500 mJ/cm$^2$ using an ultraviolet light irradiator, thereby obtaining a laminate having an absorption layer having a thickness of 5 μm.

Then, the absorption layer forming process ends.

Hereinafter, the resin base on which the absorption layer is formed is referred to as an intermediate laminate.

(Light Guide Plate Manufacturing Process)

In the light guide plate manufacturing process, the light guide plate for image display 4005 is manufactured by using the intermediate laminate and the second resin base 4003.

A seal layer having a width of 5 mm and a thickness of 5 μm is applied to the peripheral edge of the surface of the intermediate laminate opposite to the absorption layer.

The seal layer is not particularly limited as long as the seal layer is made of a transparent material and is able to bond resin bases to each other. However, in Example 1, the photoadhesive Hard Rock (registered trademark) OP-1045K (trade name; electrochemical) (Manufactured by Denka Company Limited) is used.

As a result, an intermediate laminate with a stepped seal layer having an opening portion having a size of 50 mm×50 mm surrounded by the seal layer is prepared.

Thereafter, the photosensitive material is applied onto the intermediate laminate as a hologram photopolymer material by spin coating. The photosensitive material is applied to have a thickness of 5 μm after drying.

Thereafter, the second resin base 4003 is laminated on the seal layer and the photosensitive material to face the barrier layer of the intermediate laminate with the seal layer, and press-bonded under reduced pressure. The conditions for press bonding are an absolute pressure of 5 kPa, a temperature of 70° C., and a press pressure of 0.04 MPa.

Thereafter, a diffraction grating is recorded on the photosensitive material of the press-bonded laminate. In this process, the temperature of the laminate is maintained at 20° C. The diffraction grating forms interference fringes so that a required diffraction pattern is formed by irradiating the laminate with two laser beams and adjusting each irradiation angle and each intensity thereof. As a result, the diffraction grating is recorded on the photosensitive material.

As a specific diffraction grating, light in each of the red, green, and blue wavelength regions incident as image light incident on the incidence portion is diffracted, and a color display diffraction grating to be emitted from the display portion is formed at a position corresponding to the pixels of the image light.

Thereafter, with the laminate kept at 20° C., ultraviolet light (at a wavelength of 365 nm and an irradiance of 80 W/cm$^2$) is fully irradiated for 30 seconds from the direction of one side of the laminate. A high pressure mercury lamp is used as a light source for ultraviolet light.

As a result, the seal layer is cured, and the light guide plate for image display 4005 of Example 10 is formed.

Example 11

Example 11 is an example corresponding to the light guide plate for image display 4007 of the first modification example of the fourth embodiment.

As shown in Table 4, in Example 11, absorption layers are provided on both sides. Specifically, the second absorption layer 4006 is formed on the surface of the second resin base 4003 opposite to the hologram layer 4002.

In the present example, the second absorption layer 4006 ("absorption layer" in Table 4) is configured in the same manner as the first absorption layer 4004 of Example 10. Therefore, the substrate preparation process of Example 11 is the same as that of Example 10.

The absorption layer shaping process of Example 11 is different from Example 10 in that, in addition to the intermediate laminate having the first absorption layer 4004, an intermediate laminate made of the second resin base 4003, on which the second absorption layer 4006 is formed, is formed.

The light guide plate manufacturing process of Example 11 is different from that of Example 10 in that two intermediate laminates are used.

<Evaluation Method>

Next, the evaluation method of each example will be described. As an evaluation, a sharpness evaluation is performed.

(Sharpness Evaluation)

The sharpness of the display image is performed by using each display device using each light guide plate for image display. Each display device is configured in the same manner as the display device 4010, except that the light guide plate for image display of the corresponding example is used.

As the image used for the evaluation, a display image formed by the image light diffracted by the hologram layer and an external light image transmitted by the external light are used.

As the input image of the display image, a white image and a character image are used.

As the external light image, a view of a room, a city, or a forest at a distance of 0.5 m to 50 m from the display device is used. In the evaluation of the external light image, a white image or a character image is displayed and evaluated.

The evaluation is performed by visually determining the appearance of the white image and the character image and the appearance of the external light image. As the character image, hiragana, katakana, kanji, Arabic numerals, Roman letters, and the like having a size of 0.1 to 2.0 in terms of visual acuity are displayed as the size.

(Criteria for Evaluating Sharpness of Display Image)

The sharpness evaluation of the display image is performed in three stages.

When the rainbow color is not visible in the white image and the characters are clearly visible in the character image, it is determined that the result is favorable (good, described as "A" in Table 4).

When a slight rainbow color is visible in the white image but the characters are clearly visible in the character image, it is determined that the result is acceptable (fair, described as "B" in Table 4).

When a rainbow color is visible in at least a part of the white image and the outline of the characters is blurred in the character image, it is determined that the result is unacceptable (no good, described as "C" in Table 4).

(Criteria for Evaluating Sharpness of External Light Image)

The sharpness evaluation of the external light image is performed in four stages.

The result is very favorable (good, described as "S" in Table 4) when the color of the scenery in the external light image can be seen clearly without any discomfort.

When the scenery in the external light image looks slightly dark, it is determined that the result is favorable (good, described as "A" in Table 4).

When the scenery in the external light image is dark and there is a slight sense of discomfort in color, it is determined that the result is acceptable (fair, described as "B" in Table 4).

When the scenery in the external light image looks blurry, it is determined that the result is unacceptable (no good, described as "C" in Table 4).

(Weather Resistance Test)

As the light guide plate for image display used for the sharpness evaluation, a sample subjected to the weather resistance test ("after the weather resistance test" in Table 4) and a sample not subjected to the weather resistance test ("before the weather resistance test" in Table 4) are prepared.

The weather resistance test is performed using an ultraviolet fade meter U48AU (trade name; manufactured by Suga Test Instruments Co., Ltd.). The test conditions are that the BP temperature is 63° C.±3° C. The test time is 500 hours.

<Evaluation Result>

As shown in Table 4, the sharpness of Example 10 is evaluated as "A" in both the display image and the external light image before and after the weather resistance test. The sharpness of Example 11 is evaluated as "A" except for the weather resistance test of the external light image, which is "S".

From this evaluation result, it can be seen that in Examples 10 and 11, the sharpness of both the display image and the external light image is favorable because the absorption layer is provided. In particular, in Example 10, the absorption layer to the incident side of the external light is provided, and before the weather resistance test, sharpness of external light images than Example 10 is improved.

Although preferred embodiments and examples of the present invention have been described above, the present invention is not limited to these embodiments and examples.

Configurations can be added, omitted, replaced and otherwise modified without departing from the spirit of the present invention.

Further, the present invention is not limited by the above description, but is limited only by the appended claims.

INDUSTRIAL APPLICABILITY

The light guide plate for image display of the present invention is able to display a clear image even when a resin base is used and is able to suppress deterioration of the hologram layer. Thus, the light guide plate for image display is useful for display devices in VR and AR applications, for example. For example, the light guide plate for image display of the present invention is useful for display device applications such as entertainment using a head-up display, a wearable display, and a head-mounted display, remote operation, work support, and guidance support.

REFERENCE SIGNS LIST

1001: First resin base
1001a: First surface
1001b: Second surface
1002: Hologram layer
1003: Second resin base
1004, 1014: Light guide plate for image display
1011A: First hard coat layer
1011B: Second hard coat layer
1100: Continuous polymerization device
1101, 1102: Endless belt
1103, 1104, 1105, 1106: Main pulley
1107: Carrier roll
1108: First polymerization zone
1109: Hot water spray
1110: Second polymerization zone
1111: Downstream cooling zone
1112: Gasket
1113: Plate-like polymer
1114: Raw material injection device
1200: Evaluation device
1201: Light source
1202: Screen
1203: Camera
1204: Arithmetic processing unit
1210: Curve
2001: First resin base
2002: First barrier layer
2003: Hologram layer
2003a: Display surface
2003b: Waveguide diffraction grating portion
2003c: Display diffraction grating portion
2004: Second barrier layer
2005: Second resin base
2006, 2016: Light guide plate for image display
2006a: Incidence portion
2006d: Display portion
2010: Display device
2012: Incident optical system
2013: Image light projection unit
2014: Luminance meter
2015: Measurement device
2022: First barrier film
2022A: Barrier layer
2022B: Resin film
2024: Second barrier film
2024A: Barrier layer
2024B: Resin film
2026: First adhesive layer
2027: Second adhesive layer
2032: Third barrier layer
2101, 2102: Light guide plate for image display
3001: Light guide plate for image display (light guide plate)
3010: Hologram layer
3021: First substrate
3022: Second substrate
3030, 3130: Hard coat film
3030A, 3130A: First hard coat film
3030B, 3130B: Second hard coat film
3031: Film base
3031a: First surface
3031b: Second surface
3032: Adhesive layer
3033: Hard coat layer
3034: Release layer
4001: First resin base
4002: Hologram layer
4002b: Display diffraction grating portion
4003: Second resin base
4003a: Waveguide diffraction grating portion
4004: First absorption layer
4005, 4007, 4020, 4024: Light guide plate for image display
4005a: Incidence portion
4005b: Display image emission portion
4006: Second absorption layer
4008: First barrier layer
4009: Second barrier layer
4010: Display device
4011: Incident optical system
4012: Image light projection unit
4021: First resin base (absorption layer)
4023: Second resin base (absorption layer)
I: Transmitted projection image
Ib: High brightness portion
Is: Low brightness portion
Ld: Image light
Ld': Image light
Ld": Image light
Li: Image light
Lo: External light
Lo': External light
Lo": External light
Lo'": External light
O: Optical axis
P1: First intermediate laminate
P2: Second intermediate laminate
S: Measurement sample

What is claimed is:

1. A light guide plate configured for image display, comprising:
a first resin base;
a hologram layer formed on one side of the first resin base in a thickness direction:
an incidence portion formed on another side of the first resin base in a thickness direction, an image light being incident on the incidence portion;
a display image emission portion formed on the another side of the first resin base at a position separated from the incidence portion in the plane direction which is a direction orthogonal to the thickness direction;
a second resin base; and an external light incidence portion is provided on a side of the second resin base opposite to the hologram layer in the thickness direction, wherein an arithmetic average roughness Ra of the surface of the first resin base is 2.6 nm or more but 5 nm or less, wherein the hologram layer comprises a waveguide diffraction grating portion and a display diffraction grating portion, wherein the display image emission portion comprises the display diffraction grating portion and a region of the first resin base facing the display diffraction grating portion in the thickness direction, wherein the image light incident on the incidence portion is guided to the display diffraction grating portion through the waveguide diffraction grating portion and emitted to the outside of the light guide plate through the first resin base in the display image emission portion, wherein at least a portion of an external light incident on the external light incidence portion is emitted to the outside of the light guide plate through the display image emission portion, and wherein a first image on which a second image based on the image light and a third image based on the external light are superimposed is displayed, wherein the first resin base has a maximum MC value in a range of from 0.020 to 0.110, wherein the MC values are obtained by evaluation using shadow contrast according to Expression (1):

$$MC = \frac{Lmax - Lmin}{Lmax + Lmin}, \quad (1)$$

wherein Lmax is a maximum value of brightness from a brightness distribution, Lmin is a minimum value of the brightness from the brightness distribution, and MC is an evaluated MC value that objectively represents a magnitude of a dip in low brightness portions in the brightness distribution, wherein a measurement area of the evaluated MC value is provided at each of 41 points, which are shifted by 2 mm in a lateral direction in a rectangular region having a width of 180 mm in a vertical direction and a width of 80 mm in a horizontal direction, wherein a measurement line is selected to divide the measurement area laterally into 40 equal parts in each measurement area, and wherein each of the evaluated MC values is measured from the measurement line.

2. The light guide plate of claim 1, further comprising: a first barrier layer.

3. The light guide plate of claim 2, wherein the first resin base, the first barrier layer, and the hologram layer are arranged in that order in a thickness direction.

4. The light guide plate of claim 3, further comprising: a second barrier layer,
wherein the first resin base, the first barrier layer, the hologram layer, the second barrier layer, and the second resin base are arranged in that order in the thickness direction.

5. The light guide plate of claim 3, wherein a refractive index of the first barrier layer is higher than a refractive index of the first resin base.

6. The light guide plate of claim 3, wherein a refractive index of the first barrier layer is 1.48 or more.

7. The light guide plate of claim 3, wherein the first barrier layer comprises an inorganic material.

8. The light guide plate of claim 3, wherein the first barrier layer is disposed on a resin film.

9. The light guide plate of claim 3, wherein a steam barrier material is used as a material of the first barrier layer.

10. The light guide plate of claim 2, wherein a refractive index of the first barrier layer is higher than a refractive index of the first resin base.

11. The light guide plate of claim 2, wherein a refractive index of the first barrier layer is 1.48 or more.

12. The light guide plate of claim 2, wherein the first barrier layer comprises an inorganic material.

13. The light guide plate of claim 12, wherein the first barrier layer comprises silicon oxide, silicon nitrogen oxide, diamond-like carbon, aluminum oxide, and/or glass.

14. The light guide plate of claim 2, wherein a steam barrier material is used as a material of the first barrier layer.

15. The light guide plate of claim 2, wherein the first barrier layer is disposed on the hologram layer.

16. The light guide plate of claim 1, wherein a refractive index of the first resin base is in a range of from 1.48 to 1.70.

17. The light guide plate of claim 1, wherein the first resin base comprises a poly(meth)acrylic resin.

18. The light guide plate of claim 1, wherein a heat shrinkage rate measured based on annex A of JIS K 6718-1:2015 of the first resin base is less than 3%.

19. The light guide plate of claim 1, wherein an arithmetic average roughness Ra of a surface of the first resin base is 10 nm or less.

20. An AR glass, comprising:
the light guide plate of claim 1.

21. The light guide plate of claim 1, wherein the MC value of the first resin base is in a range of from 0.020 to 0.070.

* * * * *